US012799657B2

(12) United States Patent
Kishi et al.

(10) Patent No.: US 12,799,657 B2
(45) Date of Patent: Nov. 17, 2026

(54) DRIVE APPARATUS, DRIVE METHOD, AND RECORDING MEDIUM

(71) Applicant: Panasonic Intellectual Property Corporation of America, Torrance, CA (US)

(72) Inventors: Tatsuhiro Kishi, Kanagawa (JP); Kenta Murakami, Osaka (JP); Satoshi Suemasu, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 238 days.

(21) Appl. No.: 18/208,499

(22) Filed: Jun. 12, 2023

(65) Prior Publication Data

US 2023/0323581 A1 Oct. 12, 2023

Related U.S. Application Data

(63) Continuation of application No. PCT/JP2021/026468, filed on Jul. 14, 2021.

(30) Foreign Application Priority Data

Dec. 25, 2020 (JP) ................................ 2020-217471

(51) Int. Cl.
*D06F 33/32* (2020.01)
*D06F 34/22* (2020.01)
(Continued)

(52) U.S. Cl.
CPC .............. *D06F 33/32* (2020.02); *D06F 34/22* (2020.02); *A47J 27/004* (2013.01); *D06F 2105/42* (2020.02)

(58) Field of Classification Search
CPC ................................ D06F 33/32; D06F 34/22
See application file for complete search history.

(56) References Cited

U.S. PATENT DOCUMENTS 4,241,400 A * 12/1980 Kiefer ................ G05B 19/0428 68/12.26
5,543,698 A * 8/1996 Tao ........................ D06F 34/16 73/462

(Continued)

FOREIGN PATENT DOCUMENTS

JP 2003-284889 10/2003
JP 2020-000802 1/2020

OTHER PUBLICATIONS

International Search Report (ISR) issued on Sep. 28, 2021 in International (PCT) Application No. PCT/JP2021/026468.

*Primary Examiner* — Michael E Barr
*Assistant Examiner* — Kevin G Lee
(74) *Attorney, Agent, or Firm* — Wenderoth, Lind & Ponack, L.L.P.

(57) ABSTRACT

An apparatus, which is a drive apparatus, includes: a drive unit; a controller that obtains an application including a plurality of blocks, and executes the application to control the drive unit in accordance with the plurality of blocks; a first sensor; and a second sensor. Each of the plurality of blocks includes an end condition. When, during execution of a first block, the first driving state detected by the first sensor meets the end condition of the first block and the second driving state detected by the second sensor meets a block insertion condition, the controller: inserts a new block before one or more subsequent blocks after the first block; and controls the drive unit in accordance with the one or more subsequent blocks and the new block.

13 Claims, 47 Drawing Sheets

(51) Int. Cl.

| | |
|---|---|
| *A47J 27/00* | (2006.01) |
| *D06F 105/42* | (2020.01) |

(56) References Cited

U.S. PATENT DOCUMENTS

| | | | | |
|---|---|---|---|---|
| 5,859,778 | A * | 1/1999 | Kuroda | G05B 19/0421 700/169 |
| 2016/0359325 | A1* | 12/2016 | Kawata | H04L 12/2829 |
| 2018/0313014 | A1* | 11/2018 | Kim | D06F 23/04 |
| 2020/0141040 | A1* | 5/2020 | Cha | D06F 34/22 |

* cited by examiner

FIG. 9

1100

1101

| Device ID | Address | Type | Manufacturer name | Model number | Actuator / heater | Degradation level |
|---|---|---|---|---|---|---|
| DEV001 | xxx.xxx.xxx.xxx | Washing machine | Company A | WM-0001 | Motor MM0001<br>Motor MM0002 | 0 |
| DEV002 | xxx.xxx.xxx.xxx | Microwave oven | Company A | MO-0001 | ... | 1 |
| DEV003 | xxx.xxx.xxx.xxx | Rice cooker | Company B | RC-0001 | ... | 2 |
| ... | ... | ... | ... | ... | ... | ... |

FIG. 12

1300

| Type | Manufacturer name | Model number | First block | Second block | |
|---|---|---|---|---|---|
| Washing machine | Company A | WM-0001 | Spin | Agitate | 1301 |
| Washing machine | Company A | WM-0001 | Supply water | Detect laundry amount | 1302 |
| Washing machine | Company A | WM-0001 | Agitate | Drain | 1303 |
| ... | ... | ... | ... | ... | |

DRIVE APPARATUS, DRIVE METHOD, AND RECORDING MEDIUM

CROSS REFERENCE TO RELATED APPLICATIONS

This is a continuation application of PCT International Application No. PCT/JP2021/026468 filed on Jul. 14, 2021, designating the United States of America, which is based on and claims priority of Japanese Patent Application No. 2020-217471 filed on Dec. 25, 2020. The entire disclosures of the above-identified applications, including the specifications, drawings, and claims are incorporated herein by reference in their entirety.

FIELD

The present disclosure relates to, for example, a drive apparatus including an actuator and/or a heater.

BACKGROUND

Conventionally, drive apparatuses, such as home appliances and housing equipment, are controlled according to operating conditions (a control program) prepared in advance by, for example, the manufacturer. Patent literature (PTL) 1 discloses, as a drive apparatus, a washing machine that allows the user to set operating conditions for a washing operation that he/she wishes to perform.

CITATION LIST

Patent Literature

PTL 1: Japanese Unexamined Patent Application Publication No. 2003-284889

SUMMARY

Technical Problem

However, with the above conventional technique, a control program developed in advance by the manufacturer of the product, i.e., the drive apparatus, must be stored in that product in advance, making it difficult to realize a diverse and safe drive apparatus.

In view of this, present disclosure provides a wide variety of drive apparatuses and the like that can improve safety.

Solution to Problem

A drive apparatus according to one aspect of the present disclosure includes: a drive unit including at least one of an actuator or a heater; a controller that obtains an application including a plurality of blocks, and executes the application to control the drive unit in accordance with the plurality of blocks; a first sensor that detects a first driving state of the drive unit; and a second sensor that detects a second driving state of the drive unit. Each of the plurality of blocks includes an end condition for ending driving of the drive unit by the block. When, during execution of a first block among the plurality of blocks, the first driving state detected by the first sensor meets the end condition of the first block and the second driving state detected by the second sensor meets a block insertion condition, the controller: inserts a new block so that an order relative to one or more subsequent blocks after the first block in the application is a given order; and after the first block ends, controls the drive unit in accordance with the one or more subsequent blocks and the new block arranged in the given order.

General or specific aspects of the present disclosure may be realized as a system, a method, an integrated circuit, a computer program, a computer-readable recording medium such as a CD-ROM, or any given combination thereof.

Advantageous Effects

The drive apparatus according to one aspect of the present disclosure is wide in variety and can improve safety.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 9 illustrates one example of a device database according to Embodiment 1.

FIG. 12 illustrates one example of a rule database according to Embodiment 1.

DESCRIPTION OF EMBODIMENTS

Figure 1:
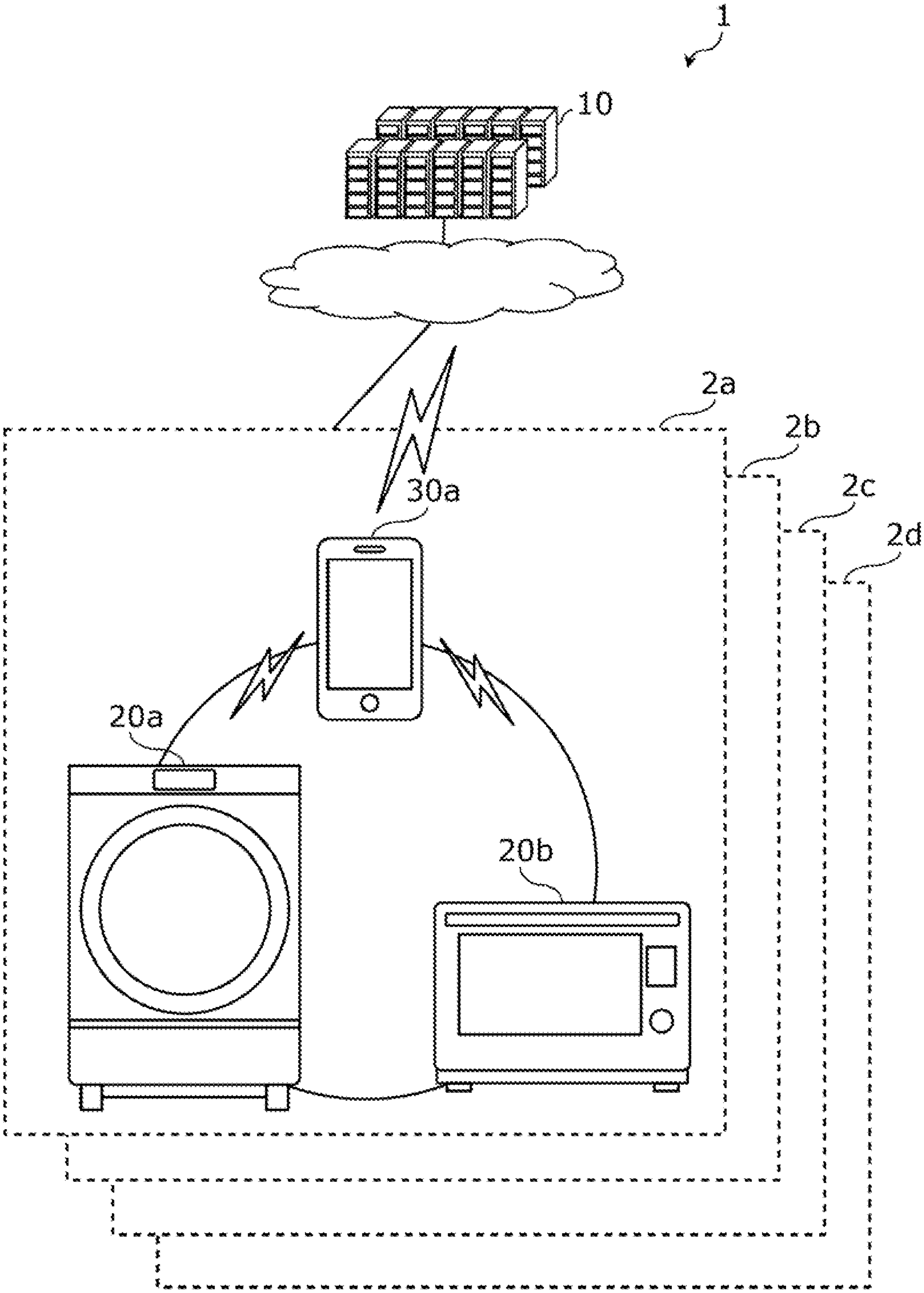
FIG. 1 illustrates the hardware configuration of a system according to Embodiment 1.

Underlying Knowledge Forming the Basis of the Present Disclosure

First, the process by which the inventors arrived at the present disclosure will be described. For home appliances or other products that include an actuator and/or a heater, there is a need for an open development environment to develop control programs that meet the desires of a variety of users. Stated differently, there is a need for an environment in which the difficulty of developing control programs is reduced and third parties can easily participate in the development of control programs. In such an environment, it would be possible, for example, for an apparel company to develop a control program for a washing machine to launder the clothes it sells.

In view of this, the inventors considered the creation of an environment in which control programs can be developed while maintaining safety assurance by using function blocks that abstract the control of actuators and/or heaters included in the product, and a system in which a control program consisting of a combination of a plurality of function blocks can be packaged and distributed as an application. This enables the distribution of a wide variety of applications and allows products to be customized and updated to meet the desires of a wider range of users. Unfortunately, in such an environment, dangerous applications (i.e., applications that cannot be safely controlled by the product) may be distributed, diminishing the safety of the product.

For example, it is envisioned that programs included in home appliances or other products would be incorporated into devices for direct control of actuators and/or heaters and would include a mixture of programs developed by the manufacturer and programs developed by third parties. In such cases, the manufacturer will likely not disclose to third parties all information on the home appliances or other products, including privy knowledge. For example, the parameters or timing of driving actuators and/or heaters is privy knowledge related to the performance of home appliances or other products made by the manufacturer. Manufacturers are therefore unlikely to divulge their privy knowledge to third parties so that they can freely drive their home appliances or other products, as this could cause them to lose their competitive edge.

The third parties may therefore create an application that includes a combination of controls or parameter ranges not anticipated by the manufacturer, i.e., an application with which safety cannot be guaranteed, due to lack of information about the home appliance or other product. From the perspective of the user, it is undesirable for such applications to be provided to users.

Manufacturers of home appliances or other products may attempt to improve users' lives by providing new control programs. However, the development of a wide variety of new control programs requires a great amount of man-hours to adjust parameters or evaluate hardware performance. Since the hardware of home appliances or other products is physically driven by actuators and/or heaters, one can easily expect that programs for home appliances or other products will require more man-hours for performance evaluation, etc., than programs for smartphones. However, in an age when on-demand development, rather than mass production, is required to meet the needs of each individual user's life, there is a need to develop a wide variety of control programs for home appliances or other products, similar to programs for smartphones. Manufacturers must therefore create a wide variety of applications that ensure the safety of their products with a reduction in the great amount of man-hours.

In addition, manufacturers may wish to ensure that their home appliances or other products operate safely even when operated using applications provided by third parties. In such cases, it is desirable to reduce the amount of work required to verify safety by actually driving home appliances or other products with a wide variety of applications. Note that home appliances, etc., are one example of the drive apparatus.

In view of the above, the present disclosure provides a wide variety of drive apparatuses and the like defined by a plurality of function blocks that drive an actuator and/or a heater that can improve safety.

Hereinafter, embodiments are specifically described with reference to the drawings.

Each of the exemplary embodiments described below shows a general or specific example. The numerical values, shapes, materials, elements, the arrangement and connection of the elements, steps, the processing order of the steps, etc., shown in the following exemplary embodiments are mere examples, and do not intend to limit the scope of claims.

The appended drawings are not necessarily precise depictions. In the drawings, elements that are essentially the same share like reference signs. Accordingly, duplicate description is omitted or simplified.

Embodiment 1

1.1 Hardware Configuration

Figure 2A:
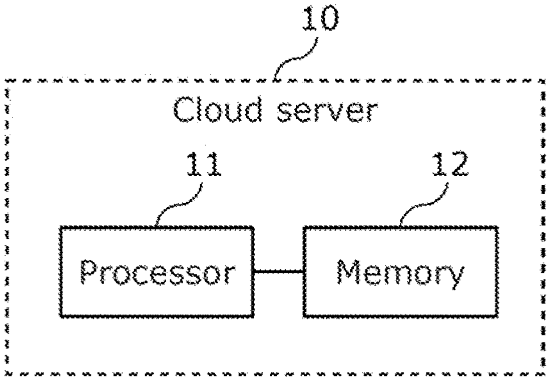
FIG. 2A illustrates the hardware configuration of a cloud server according to Embodiment 1.
Figure 2B:
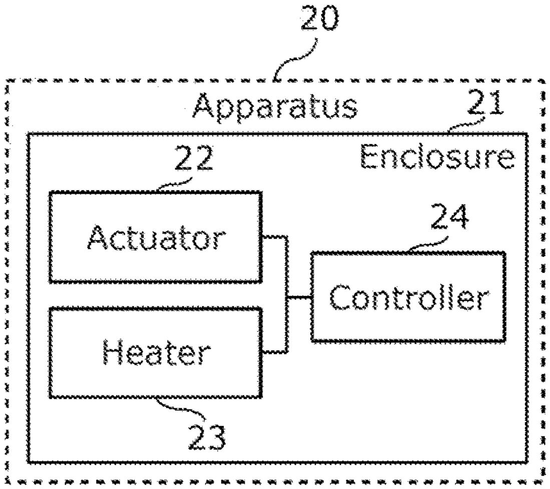
FIG. 2B illustrates the hardware configuration of an apparatus according to Embodiment 1.
Figure 2C:
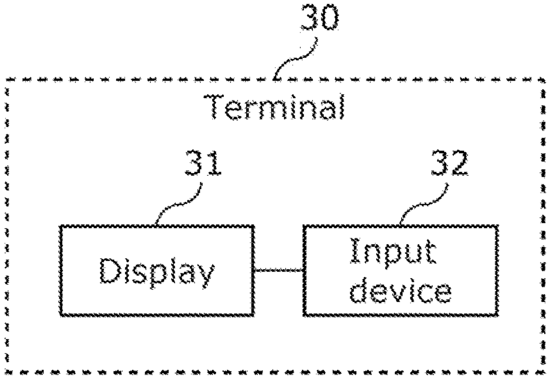
FIG. 2C illustrates the hardware configuration of a terminal according to Embodiment 1.

The hardware configuration of system 1 according to the present embodiment will be described with reference to FIG. 1 through FIG. 2C. FIG. 1 illustrates the hardware configuration of system 1 according to Embodiment 1. FIG. 2A illustrates the hardware configuration of cloud server 10 according to Embodiment 1. FIG. 2B illustrates the hardware configuration of apparatus 20 according to Embodiment 1. FIG. 2C illustrates the hardware configuration of terminal 30 according to Embodiment 1.

As illustrated in FIG. 1, system 1 according to the present embodiment includes cloud server 10, and apparatuses 20*a* through 20*h* and terminals 30*a* through 30*d* used in facilities 2*a* through 2*d*. For example, facilities 2*a* through 2*d* are, but not limited to, residences. For example, facilities 2*a* through 2*d* may be apartments, stores, offices, etc.

Cloud server 10 is a virtual server provided via a computer network (for example, the internet). Cloud server 10 is connected to apparatuses 20*a* through 20*h* and terminals 30*a* through 30*d* via the computer network. A physical server may be used instead of cloud server 10.

As illustrated in FIG. 2A, cloud server 10 includes, virtually, processor 11 and memory 12 connected to processor 11. Processor 11 functions as a sequence manager and a device manager, which will be described below, when instructions or a software program stored in memory 12 are executed.

Apparatuses 20*a* through 20*h* are electromechanical devices used in facilities 2*a* through 2*d*. Note that FIG. 1 omits the illustration of apparatuses 20*c* through 20*h* used in facilities 2*b* through 2*d*. Hereinafter, when it is not necessary to distinguish between apparatuses 20*a* through 20*h*, they will be referred to as apparatuses 20 or in the singular as apparatus 20.

Home appliances and housing equipment can be used as apparatuses 20. Home appliances and housing equipment are not limited to devices used in residences, and also include devices used in businesses. In the present disclosure, "home appliances and housing equipment or other products" may be shortened to "home appliances or other products". Home appliances include, for example, microwave ovens, rice cookers, blenders, electric ovens, electric toasters, electric hot water servers, hot plates, induction heating (IH) cookers, roasters, bread makers, electric pressure cookers, electric waterless cookers, multicookers, coffee makers, refrigerators, washing machines, dishwashers, vacuum cleaners, air conditioners, air purifiers, humidifiers, hair dryers, electric fans, and ion generators. Housing equipment include, for example, electric shutters, electronic locks, and electric water heaters for bathtubs. However, apparatuses 20 are not limited to these examples.

As illustrated in FIG. 2B, apparatus 20 includes enclosure 21, actuator 22, heater 23, and controller 24. Apparatus 20 need only include at least one of actuator 22 or heater 23, and need not include both actuator 22 and heater 23.

Enclosure 21 houses actuator 22, heater 23, and controller 24. Enclosure 21 may include an interior space for processing a target. For example, the drum of a washing machine, the cooking compartment of a microwave oven, and the inner pot of a rice cooker correspond to the interior space for processing a target.

Actuator 22 is a mechanical element that converts input energy into physical motion based on electrical signals. For example, electric motors, hydraulic cylinders, and pneumatic actuators can be used as actuator 22, but examples are not limited thereto.

Heater 23 is an electric heater that converts electrical energy into thermal energy. Heater 23 heats the target by, for example, Joule heating, induction heating, and/or dielectric heating. For example, nichrome wires, coils, and magnetrons can be used as heater 23.

Next, one example of why apparatus 20 according to the present disclosure includes actuator 22 and/or heater 23 will be given. Consider a case in which a manufacturer of home appliances or other products provides a third party with a development environment that allows free control of all parameters and combinations of drives for actuator 22 and heater 23. In such a case, the third party would be able to create a program to control actuator 22 and/or heater 23 so as to operate outside of the range of parameters anticipated by the manufacturer at which actuator 22 and/or heater 23 can be safely driven or outside the drive limits of actuator 22 and/or heater 23. In particular, the driving of actuator 22, which physically moves, or heater 23, which outputs thermal energy, in a manner unanticipated by the manufacturer poses significant safety assurance issues. Examples of driving in a manner unanticipated by the manufacturer include the high-speed rotation of an electric motor, which is one example of the actuator, and the supply of excessive current to heater 23. The inventors of the present application aimed to ensure that excessive safety considerations would not inhibit the creation of an environment that could provide users with a wide variety of applications. Apparatus 20 according to the present disclosure therefore is specific to actuators 22, which physically move, or heaters 23, output thermal energy, with an eye to ensuring safety.

Controller 24 is a controller that controls actuator 22 and/or heater 23 and functions as a device, which will be described later. Controller 24 is configured as, for example, an integrated circuit.

Terminals 30*a* through 30*d* are used at facilities 2*a* through 2*d*, respectively, and function as user interfaces. Note that FIG. 1 omits the illustration of terminals 30*b* through 30*d* used in facilities 2*b* through 2*d*. Hereinafter, when it is not necessary to distinguish between terminals 30*a* through 30*d*, they will be referred to as terminals 30 or in the singular as terminal 30.

Terminals 30 are connected to cloud server 10 and apparatuses 20 via the computer network and function as a user interface (UI), which will be described later. Portable information terminals such as smartphones and tablet computers can be used as terminals 30. Terminals 30 may be fixed to the wall, floor, or ceiling of facilities 2*a* through 2*d*. Terminals 30 may be included in apparatuses 20. For example, terminals 30 may be realized as a display terminal including a display built into apparatuses 20*a* through 20*h*.

As illustrated in FIG. 2C, terminal 30 includes display 31 and input device 32. For example, a liquid crystal display and an organic electroluminescent display can be used as display 31. For example, a touch panel, a keyboard, a mouse, and a mechanical button can be used as input device 32. A voice input device may be used as input device 32. Display 31 and input device 32 may be integrally implemented as a touch screen. Alternatively, a gesture input device may be used as input device 32. A gesture input device includes, for example, a camera and a recognition unit. The camera captures images containing gestures, and the recognition unit recognizes the gestures using the images.

1.2 Functional Configuration

Figure 3:
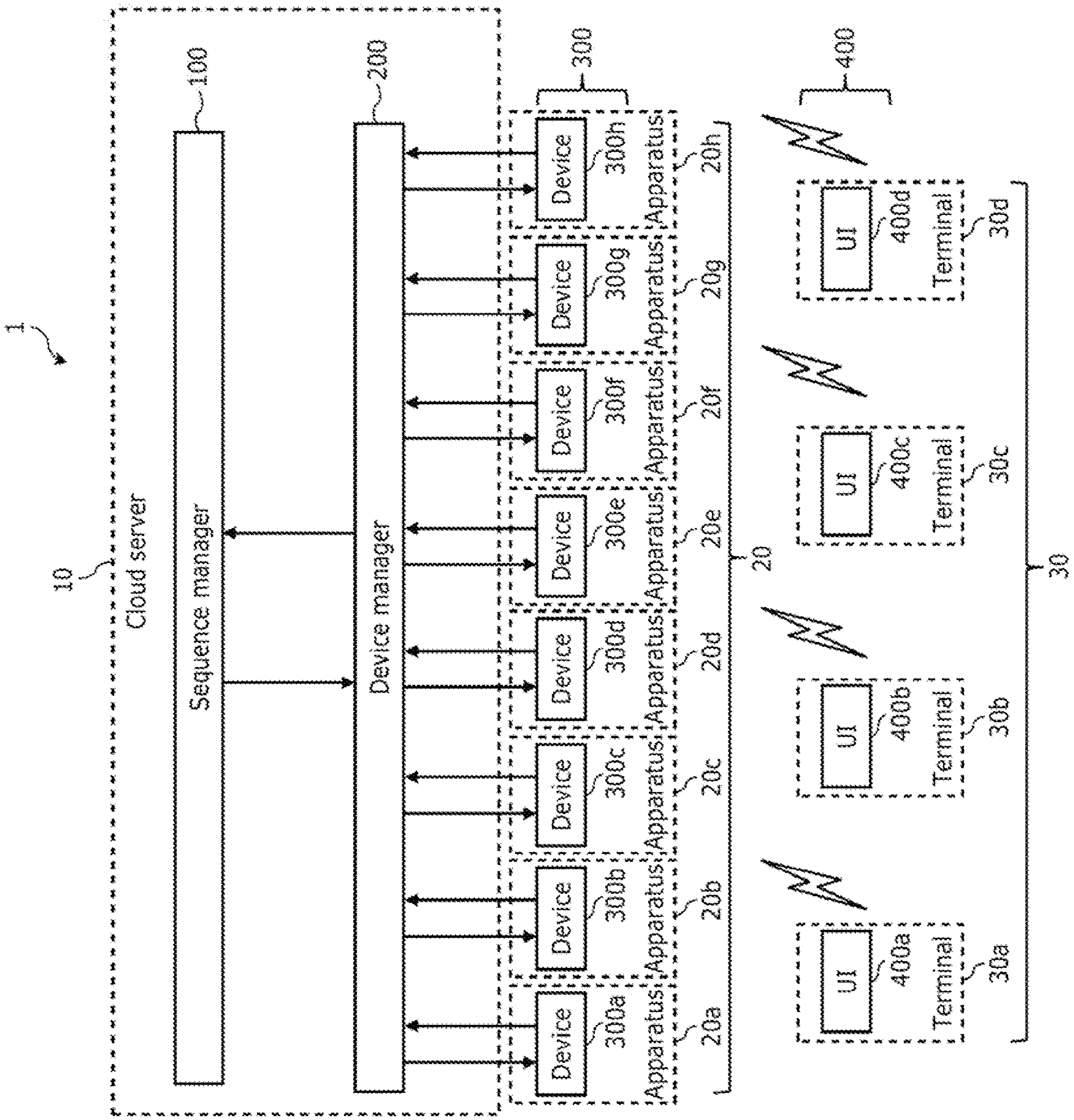
FIG. 3 illustrates the functional configuration of a system according to Embodiment 1.

Next, the functional configuration of system 1 according to the present embodiment will be described with reference to FIG. 3. FIG. 3 illustrates the functional configuration of system 1 according to Embodiment 1.

Cloud server 10 includes sequence manager 100 and device manager 200. Apparatuses 20*a* through 20*h* include devices 300*a* through 300*h*, respectively. Terminals 30*a* through 30*d* include UIs 400*a* through 400*d*, respectively.

Hereinafter, when it is not necessary to distinguish between devices 300*a* through 300*h*, they will be referred to as devices 300 or in the singular as device 300. Similarly, when it is not necessary to distinguish between UIs 400*a* through 400*d*, they will be referred to as UIs 400 or in the singular as UI 400.

Sequence Manager 100 manages a plurality of applications. The plurality of applications are downloaded to sequence manager 100 from an application delivery platform by, for example, user interaction. Alternatively, applications included in the application delivery platform may not be downloaded to sequence manager 100. In such cases, information indicating that the applications included in the application delivery platform are associated with it may be recorded in the database of sequence manager 100. The applications will be described in greater detail later.

Device Manager 200 includes a database for managing facilities 2*a* through 2*d*, as well as devices 300 and UIs 400 used at the respective facilities 2*a* through 2*d*. Device Manager 200 manages devices 300 and UIs 400 by recording device information and UI information associated with facilities 2*a* through 2*d* in a database. Device information and UI information includes, for example, control functions and drive functions, as well as operating status. For example, device manager 200 can manage the operating statuses of devices 300 and keep track of the operating schedules of devices 300. Device Manager 200 may manage log information for devices 300.

Such a database may be included in sequence manager 100 instead of device manager 200, or included in both sequence manager 100 and device manager 200.

Device 300 includes control functions and drive functions for apparatus 20. Device 300 can drive apparatus 20 according to instructions from device manager 200.

UI 400 provides information to the user and accepts inputs from the user.

Next, the applications will be described. In the present embodiment, an application (hereinafter sometimes abbreviated as "app") means a control program defined by a plurality of function blocks (hereinafter abbreviated as "blocks") that drive actuator 22 and/or heater 23. Each of the blocks can include a parameter for driving actuator 22 or heater 23. More specifically, each of the blocks is an abstraction of the control of actuator 22 or heater 23. In addition to the blocks that drive actuator 22 and/or heater 23, the application may include blocks that do not drive actuator 22 and/or heater 23. Examples of blocks that do not drive actuator 22 and/or heater 23 include the displaying of information using an interface included in device 300, the outputting of sound using a buzzer included in device 300, and the turning on or off of a lamp included in device 300. The block may include a condition to start driving actuator 22 or heater 23. For example, assume an application includes a first block and a second block. Here, when switching to the second block during the execution of the first block, when the start condition included in the second block is met, the second block is switched to from the first block. The block may also contain an end condition rather than a start condition. Here, when switching to the second block during the execution of the first block, when the end condition included in the first block is met, the second block is switched to from the first block.

Figure 4:
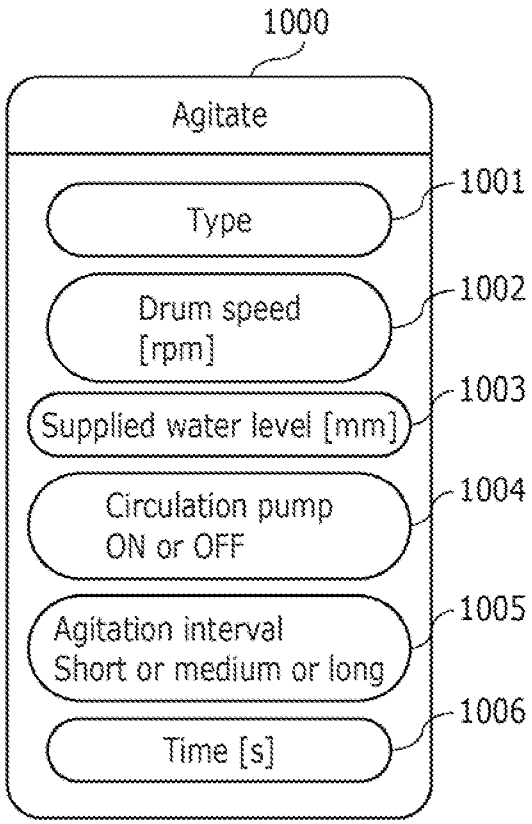
FIG. 4 illustrates one example of a block that defines an application according to Embodiment 1.

FIG. 4 illustrates one example of a block that defines an application according to Embodiment 1. Block 1000 illustrated in FIG. 4 controls the agitation operation of a washing machine and includes parameters 1001 through 1006. Parameter 1001 includes information indicating the type of agitation (for example, normal, "dancing", or rocking). In other words, parameter 1001 can be said to indicate the type of function. Parameter 1002 includes a value indicating the drum speed. In other words, parameter 1002 can be said to indicate the intensity of the driving of actuator 22 and/or heater 23. Parameter 1003 includes a value indicating the amount of water supplied to the drum in terms of the water level after the water has been supplied. In other words, parameter 1003 can be said to indicate the state after the driving of actuator 22 and/or heater 23. Parameter 1004 includes a value indicating whether the circulation pump is on or off. In other words, parameter 1004 can be said to indicate whether to drive actuator 22 and/or heater 23. Parameter 1005 includes information indicating the agitation interval in terms of stages (for example, short, medium, long). Parameter 1006 includes a value indicating the agitation time.

Figure 6:
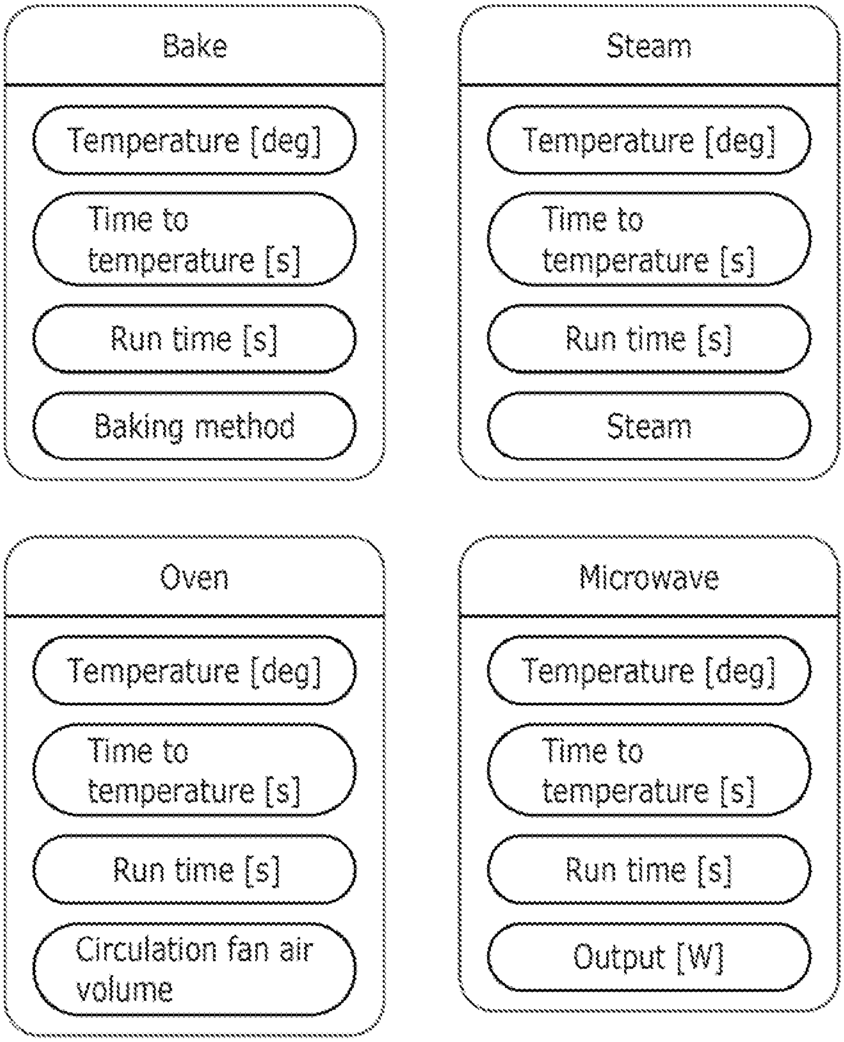
FIG. 6 illustrates a plurality of blocks for a microwave oven according to Embodiment 1.
Figure 7:
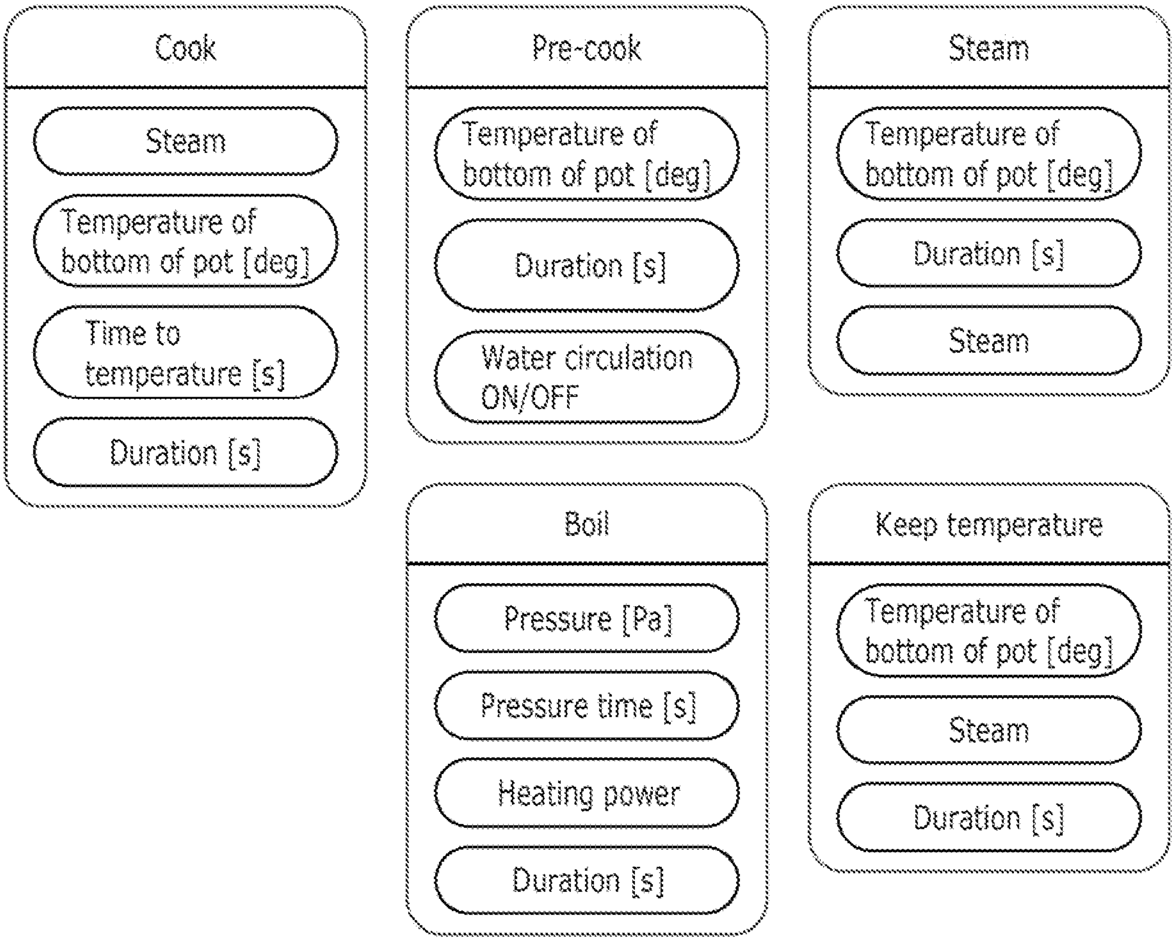
FIG. 7 illustrates a plurality of blocks for a rice cooker according to Embodiment 1.

A plurality of such blocks are used to define the application. For example, a plurality of blocks such as those illustrated in FIG. 5 through FIG. 7 are used.

Figure 5:
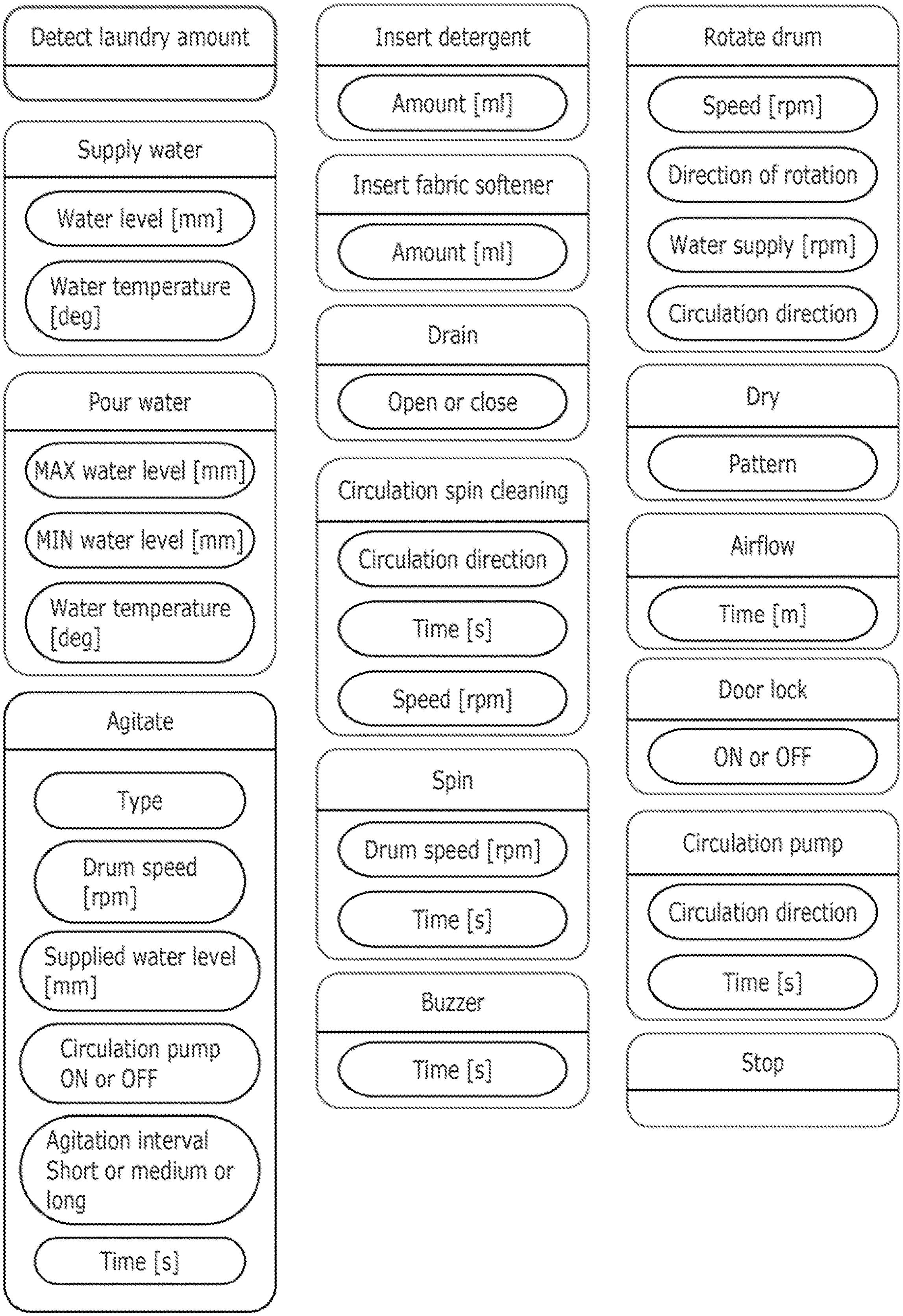
FIG. 5 illustrates a plurality of blocks for a washing machine according to Embodiment 1.

FIG. 5 illustrates a plurality of blocks for a washing machine according to Embodiment 1. FIG. 6 illustrates a plurality of blocks for a microwave oven according to Embodiment 1. FIG. 7 illustrates a plurality of blocks for a rice cooker according to Embodiment 1. The plurality of blocks illustrated in FIG. 5 through FIG. 7 are merely examples; blocks for a washing machine, a microwave oven, and a rice cooker are not limited to these examples. For example, the plurality of blocks may be hierarchized by abstraction level.

For example, the abstraction level may be changed between a level for manufacturers and a level for non-manufacturers. Examples of a level for non-manufacturers include a level for other manufacturers and a level for third parties.

Here, the level for manufacturers is less abstract than the level for non-manufacturers. A low level of abstraction means that the control content is close to the parameters that drive the actuator and the heater.

On the other hand, for non-manufacturers, the manufacturer provides blocks with the minimum level of abstraction that ensures privy knowledge stays privy and guarantees safety, thereby enabling non-manufacturers to develop applications. The manufacturer can provide blocks with an even higher level of abstraction to ordinary users to enable even more people to develop applications. For example, a higher level of abstraction corresponds to blocks defined in terms that can be understood by ordinary users without specialized knowledge. Terms that can be understood without specialized knowledge are those that correspond to the functionality of the home appliance or other product, for example. More specifically, if "plenty" is selected as the parameter for water amount in the "wash" block in a washing machine, in one low-abstraction layer, the water level parameter in the water supply block is increased from 60 mm to 100 mm, the rotation amount parameter in the agitate block is decreased from 120 rpm to 100 rpm, and so on. With this, rearranging blocks and changing parameters at a higher level of abstraction can be achieved with lower level of abstraction blocks. A plurality of blocks may be defined just like in FIG. 5 through FIG. 7 for apparatuses other than washing machines, microwave ovens, and rice cookers as well. These blocks allow for free development of applications by reconfiguring and adjusting parameters while ensuring the safety and confidentiality of the driving of the actuator and the heater drive.

In addition, by a manufacturer providing other manufacturers with blocks with the minimum level of abstraction that ensures privy knowledge stays privy and guarantees safety, the other manufacturers can define and implement their own blocks with an even lower level of abstraction in order to realize the provided blocks. This allows each manufacturer to freely develop apps for driving their actuators and heaters for third parties who only develop apps, while ensuring privy knowledge stays privy and guaranteeing safety.

At this time, the other manufacturers may, instead of developing blocks with an even lower level of abstraction corresponding to the blocks provided by the manufacturer that have the minimum level of abstraction that ensures privy knowledge stays privy and guarantees safety, return an error indicating to the app developer, and user, that the blocks provided by the manufacturer cannot be used or will operate within a restricted parameter range. More specifically, when "high speed" is selected as a parameter related to motor rotation in the "agitate" block in a washing machine, if the parameter of 150 rpm to achieve "high speed" is feasible in the manufacturer's washing machine, while the motor of the washing machine of another manufacturer can only rotate up to 120 rpm, the app developer or user is presented with an error or notification of a limit of 120 rpm.

1.3 Processes

Figure 8:
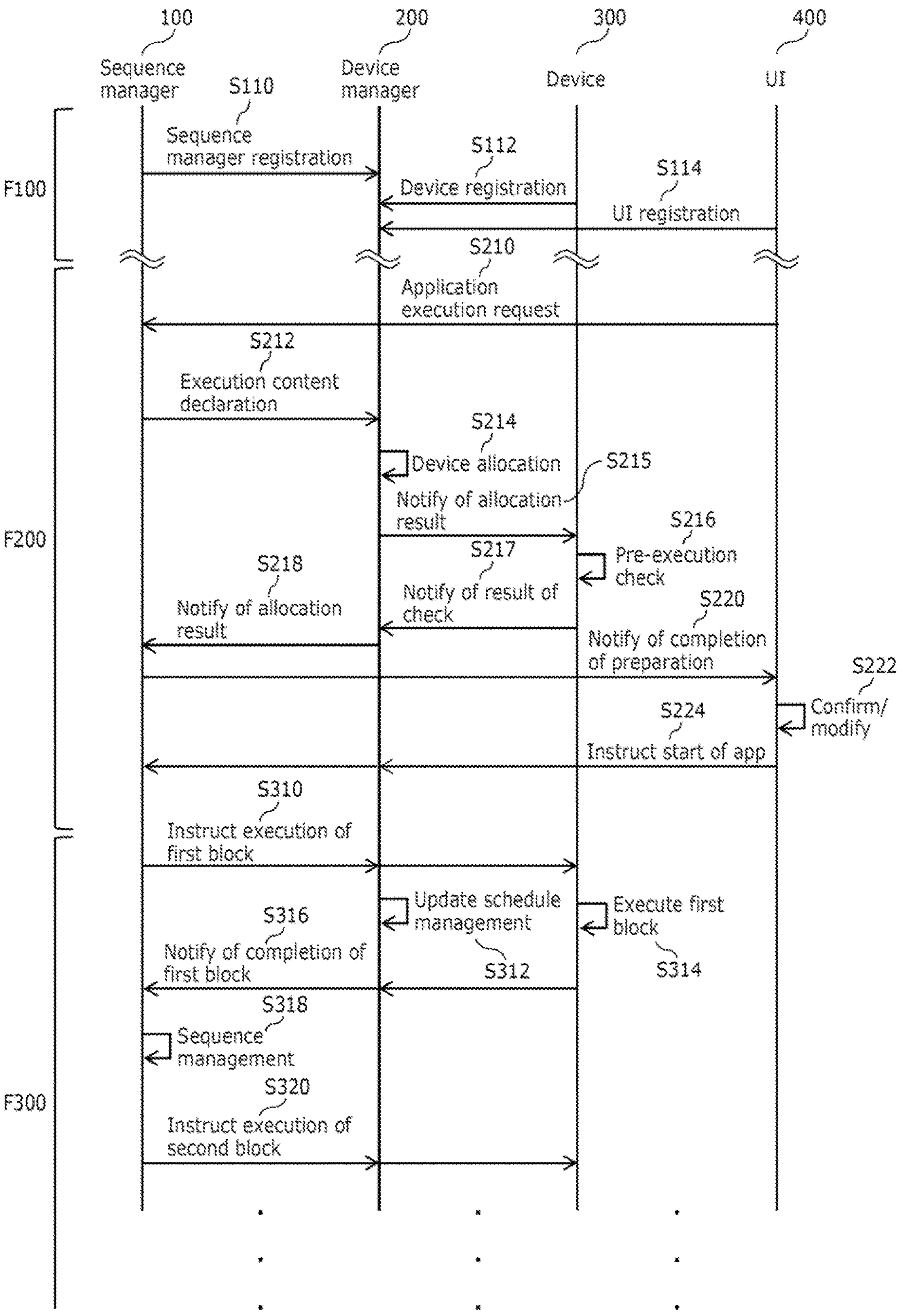
FIG. 8 is a sequence diagram of a system according to Embodiment 1.

Next, processes performed by system 1 configured as described above will be described with reference to FIG. 8. FIG. 8 is a sequence diagram of system 1 according to Embodiment 1.

1.3.1 Preparation Phase F100

First, preparation phase F100 will be described.

Step S110

Sequence manager 100 transmits sequence manager information to device manager 200. This transmission of sequence manager information is performed, for example, by instruction of the system administrator. Device manager 200 registers the received sequence manager information in a sequence manager database, for example. This step may be skipped if the sequence manager information is already registered in the sequence manager database.

The sequence manager information includes, for example, an identifier and/or an address of sequence manager 100 (for example, the uniform resource locator (URL) or internet protocol (IP) address or the like). Sequence manager information may further include any sort of information.

Step S112

Device 300 transmits device information 1101 to device manager 200. This transmission of device information 1101 is done, for example, when device 300 is connected to a computer network. Device Manager 200 registers the received device information 1101 in device database 1100. This step may be skipped if device information 1101 is already registered in device database 1100.

Device information 1101 may be sent to UI 400 and then registered in device manager 200 via UI 400.

Device information 1101 includes an identifier and/or an address of device 300. Device information 1101 may further include any sort of information. FIG. 9 illustrates one example of a device database according to Embodiment 1. A plurality of items of device information, including device information 1101, are registered in device database 1100 in FIG. 9. Each item of device information includes a device ID, an address, a type, a manufacturer name, a model number, actuator/heater, and a degradation level. Actuator/heater is information identifying actuator 22 and/or heater 23 included in device 300. The degradation level is one example of degradation information that indicates whether actuator 22 and/or heater 23 included in device 300 has degraded or not. Here, a higher degradation level indicates more degradation. Device information 1101 may include information about executable blocks. Information about executable blocks may be information that specifies blocks in the database as executable or non-executable, or it may be information about executable blocks only. Whether a block is executable or not can be prepared in advance based on information such as the actuator/heater information included in device information 1101.

Device information 1101 may include information that can identify facilities 2*a* through 2*d*.

Step S114

UI 400 transmits UI information to device manager 200. This UI information is transmitted, for example, by user instruction. Device manager 200 registers the received UI information in a UI database, for example. This step may be skipped if the UI information is already registered in the UI database.

The UI information includes an identifier and/or an address of UI 400, for example. The UI information may further include any sort of information.

The UI information may include information that can identify facilities 2*a* through 2*d*.

Through the above processes, sequence manager 100, device manager 200, device 300, and UI 400 can be associated with each other and establish a connection with each other. This completes preparation phase F100.

1.3.2 App Pre-Execution Phase F200

Next, app pre-execution phase F200 will be described. Prior to app pre-execution phase F200, the application is downloaded from the application delivery platform to sequence manager 100 in accordance with instructions from the user received via UI 400. With the application downloaded to sequence manager 100, the following processes are performed.

Step S210

UI 400 accepts an app execution request from the user and transmits the app execution request including information identifying the application to sequence manager 100. For example, the user selects an application from among several applications downloaded to sequence manager 100 via UI 400, and instructs the execution of the selected application.

The app execution request transmitted from UI 400 to sequence manager 100 is transmitted as a set with information that can identify facilities 2*a* through 2*d.*

The app execution request does not have to be explicitly accepted from the user. For example, the user's behavior or state may be detected and an app execution request may be automatically transmitted to sequence manager 100 based on the detection results.

Step S212

Sequence manager 100 transmits the execution content declaration of the application identified by the app execution request to device manager 200. The execution content declaration includes information on the plurality of blocks that define the application to be executed and information that can identify facilities 2*a* through 2*d.*

Figure 10:
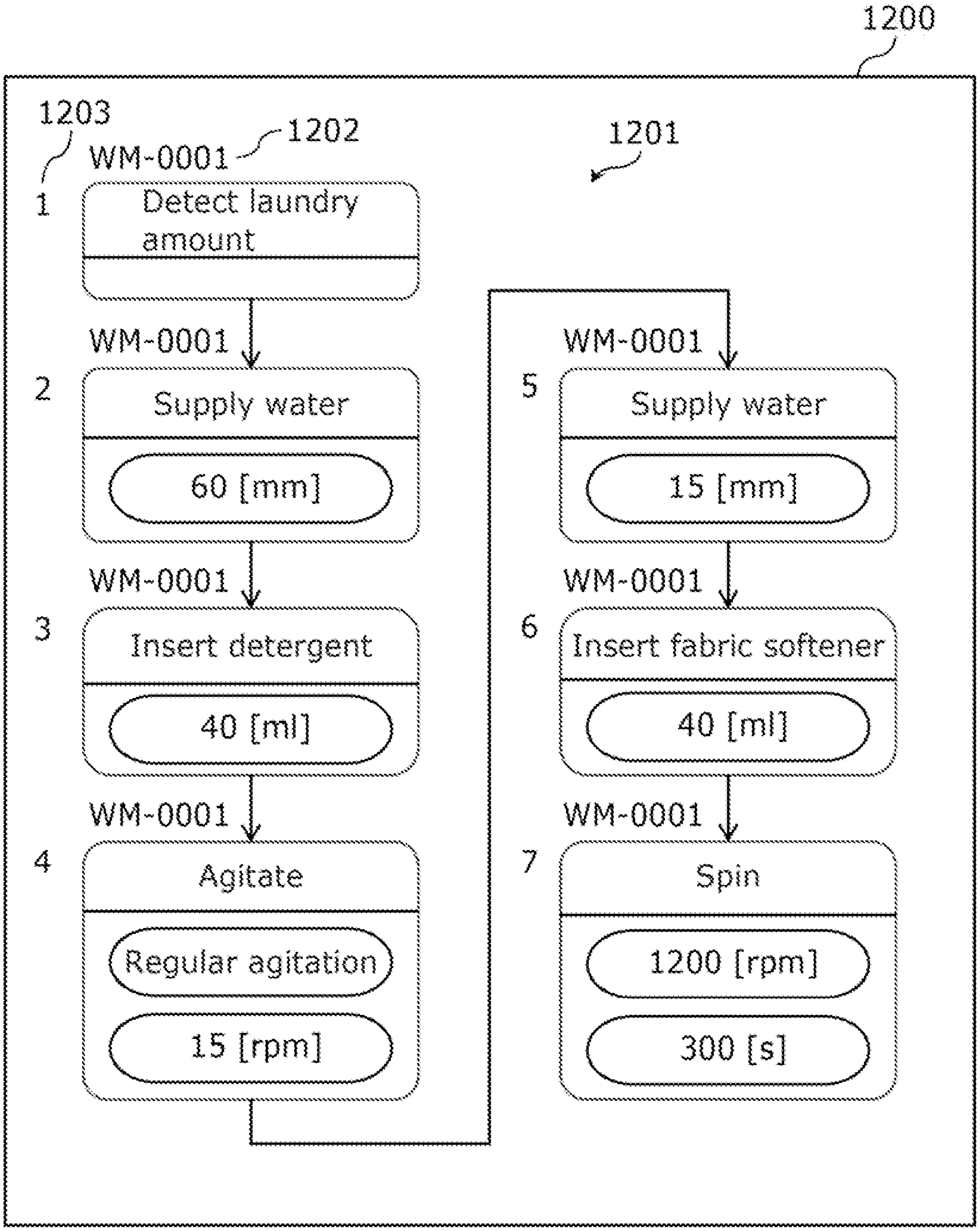
FIG. 10 illustrates one example of an execution content declaration according to Embodiment 1.

FIG. 10 illustrates one example of an execution content declaration according to Embodiment 1. FIG. 10 illustrates execution content declaration 1200 for the application defined by combining a plurality of blocks for the washing machine illustrated in FIG. 5. Execution content declaration 1200 includes a plurality of blocks 1201, information 1202 about the device required to execute each block 1201, and information 1203 on the order in which blocks 1201 are to be executed.

Execution content declaration 1200 does not need to include information 1202 about the device. In such cases, device manager 200 needs to search for a device that can execute the relevant block at the facility indicated by the received facility information from information about the plurality of blocks 1201 and perform device allocation.

In FIG. 10, information 1202 about the device indicates the model number of device 300, but information 1202 is not limited to this example. Information 1202 about the device may be any information that can indicate a condition for device 300 that can be assigned to the block. For example, information 1202 about the device may include a plurality of model numbers, or may include only the type of device, intended use, device location, or any combination of these.

Step S214

Device manager 200 allocates device 300 associated with device manager 200 to each block in the execution content declaration, based on information that can identify facilities 2*a* through 2*d*. For example, device manager 200 allocates, to each of the plurality of blocks 1201 illustrated in FIG. 10, device DEV001 having a model number of WM-0001, which is registered in device database 1100 in FIG. 9 as being connected to the facility indicated by the received facility information. If the operational status of device 300 or its connection to the cloud is managed, the allocation of a device 300 that is in operation may be prohibited.

For example, if the plurality of blocks illustrated in FIG. 10 are not registered as being connected to the facility indicated by the received facility information, i.e., if the target device does not exist at this facility, device manager 200 notifies sequence manager 100 of whether the application corresponding to the execution content declaration is executable or not.

Step S215

Device manager 200 notifies devices 300 of the result of the device allocation. This transmits the respective blocks included in the application to the respective allocated devices 300.

Step S216

Device 300 checks a block before it is executed. Stated differently, before executing a block, device 300 checks to see if any problems will arise in device 300 if the block is executed. For example, device 300 checks for safety and/or efficiency issues.

Device 300 then changes the block based on the result of the check. This corrects the blocks so that problems do not arise.

Figure 11:
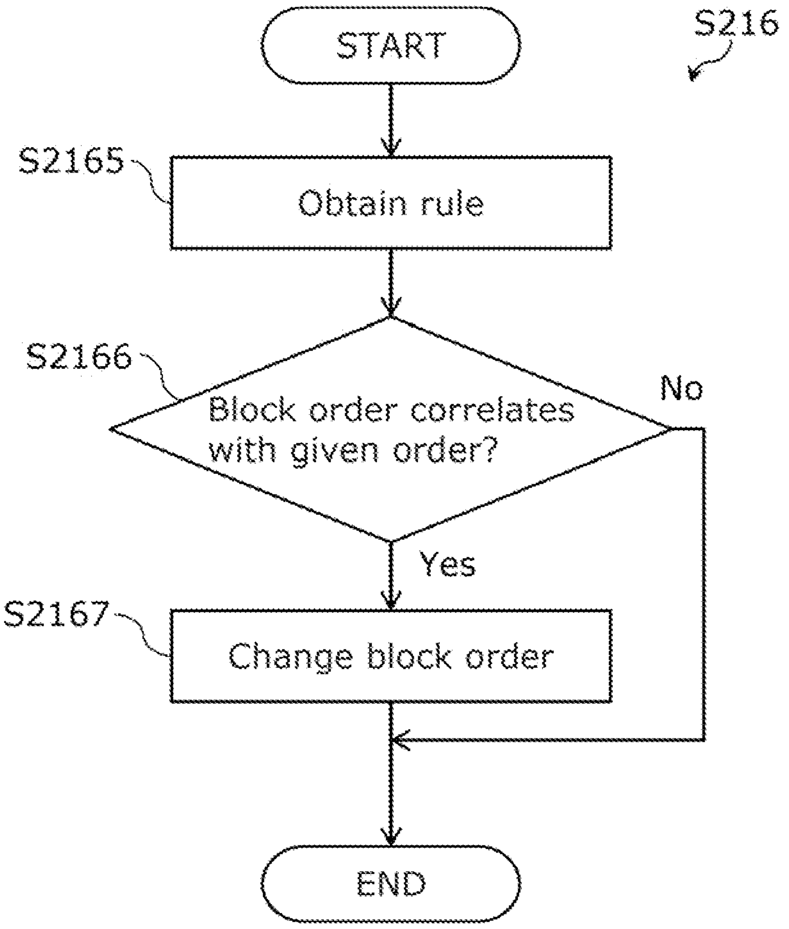
FIG. 11 illustrates a flowchart of the pre-execution check process according to Embodiment 1.

This pre-execution check process will be described in greater detail with reference to FIG. 11. FIG. 11 illustrates a flowchart of the pre-execution check process according to Embodiment 1.

Step S2165

Device 300 obtains a rule corresponding to the application. Here, the rule prohibits two or more given blocks from being executed in a given order. For example, device 300 consults the rule database and obtains two or more blocks that are prohibited from being executed in a given order. For example, the rule database may be included in device 300, and may be included in sequence manager 100 or device manager 200.

The given order can be, for example, an order in which the second block comes after the first block. More restrictively, the given order may be an order in which the second block comes immediately after the first block, i.e., an order in which the first and second blocks are consecutive.

FIG. 12 illustrates one example of a rule database according to Embodiment 1. Rules 1301 through 1303 are registered in rule database 1300 in FIG. 12. Each of rules 1301 through 1303 includes information on the first and second blocks that are prohibited from being executed consecutively. For example, rule 1301 indicates that the agitate block is prohibited from being executed immediately after the spin block. For example, rule 1302 indicates that the detect laundry amount block is prohibited from being executed immediately after the supply water block. For example, rule 1303 indicates that the drain block is prohibited from being executed immediately after the agitate block.

For example, two or more blocks that allow the interior space of enclosure 21, that allow actuator 22, or that allow heater 23 to reach its maximum withstand temperature are predetermined as the two or more blocks that are prohibited from being executed in such a given order. A maximum withstand temperature refers to the rated temperature and indicates the maximum tolerable temperature. Therefore, if actuator 22 or heater 23 is driven with the two or more given blocks in the given order, the temperature of the interior space of enclosure 21, the temperature of actuator 22, or the temperature of heater 23 will reach an unacceptable temperature.

In FIG. 12, each of rules 1301 through 1303 indicates a first block and a second block that are prohibited from being executed consecutively, but the rules are not limited to this example. For example, a rule may indicate a first block and a second block that are prohibited from being executed discontinuously. For example, a rule may indicate three or more blocks that are prohibited from being executed consecutively. For example, a rule may further indicate a range of parameters for the first and/or second block. Furthermore, the rules are defined such that a wide range of blocks can be used for the development of a wide variety of applications.

For example, the rules by which actuator 22 or heater 23 can be safely driven may vary depending on the environment of device 300, such as the interior space of enclosure 21, and the rules may not depend solely on the performance of actuator 22 or heater 23 itself. Therefore, in order to ensure safe driving in any environment, the rules are heavily weighted in favor of safety, which reduces the freedom for development of a wide variety of applications. The rules may therefore be independent of the application and may be associated with information on, for example, device 300. The use of such rules allows for both safety and the development of a wide variety of applications.

The rules relate to the range within which actuator 22 or heater 23 can be safely driven. The range within which actuator 22 or heater 23 can be safely driven may be a range that takes into account the start condition or the end condition of the block. Consider an example including a first block and a second block that is executed after the first block. A rule could be set for a case in which the first block is to be executed until the start condition of the second block is reached, whereby actuator 22 or heater 23 is loaded with a load that affects safety. Stated differently, the rules depend on the performance of actuator 22 or heater 23, the start condition or the end condition of the block, etc.

Each of rules 1301 through 1303 further includes the type and the manufacturer name. This allows device 300 to obtain, from rule database 1300, rules corresponding to actuator 22 or heater 23 that is driven by the block. For example, device 300 consults rule database 1300 in FIG. 12, and obtains rules 1301 through 1303 for WM-0001.

Step S2166

Device 300 determines whether the order of the plurality of blocks included in the application corresponds to the given order of two or more blocks indicated in the rule. For example, device 300 determines whether the second block is executed after the first block in the application.

If it is determined that the order of the plurality of blocks does not correspond to the given order (No in S2166), device 300 skips the subsequent step S2167 and ends the pre-execution check process. However, if it is determined that the order of the plurality of blocks does correspond to the given order (Yes in S2166), device 300 proceeds to the next step S2167.

Step S2167

Device 300 changes the order in which each of the plurality of blocks in the application is executed and ends the pre-execution check process. Changing the order of the blocks means (i) adding a new block between the first and second blocks, (ii) removing the first or second block, (iii) changing the order of the first or second block to achieve an order in which the first block comes after the second block or an order in which another block is between the first and second blocks, or (iv) any combination thereof. The method used to change the order of these blocks may be defined in the rules.

Figure 13:
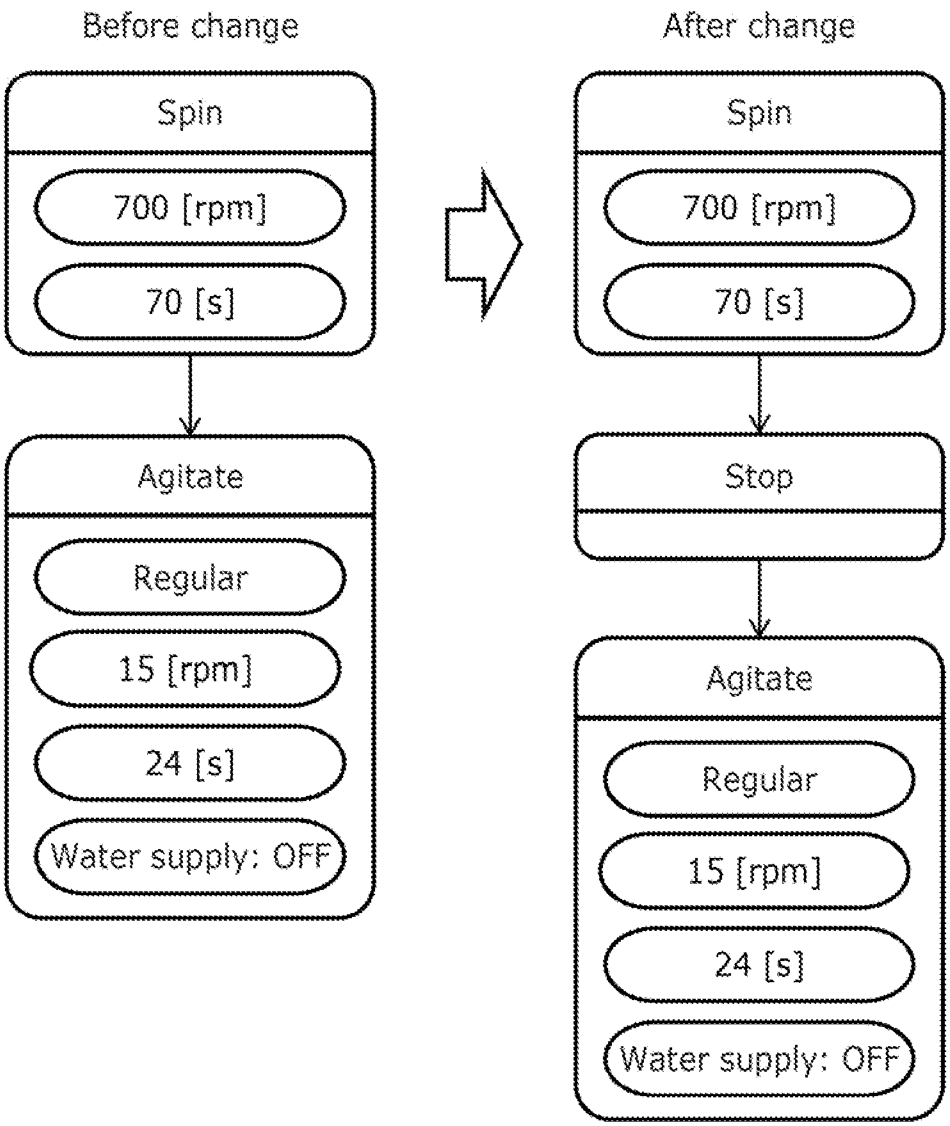
FIG. 13 illustrates one example of changing the order of blocks according to Embodiment 1.

Specific examples of such changes in the order of the blocks will be described with reference to FIG. 13, FIG. 14A, and FIG. 14B. FIG. 13 illustrates one example of changing the order of blocks (i) according to Embodiment 1. In FIG. 13, when a spin block (the first block) is followed by an agitate block (the second block), a stop block is added as a new block between the spin block and the agitate block. This allows for safe driving of actuator 22 by inhibiting an increase in the load on the motor due to the difference in drum speed between the spin block and the agitate block.

Figure 14A:
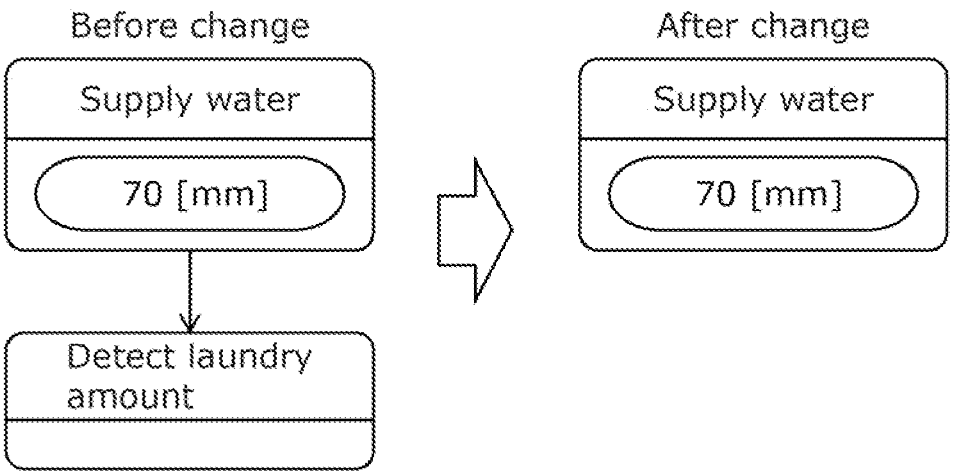
FIG. 14A illustrates one example of changing the order of blocks according to Embodiment 1.

FIG. 14A illustrates one example of changing the order of blocks (ii) according to Embodiment 1. In FIG. 14A, when the detect laundry amount block (the second block) is executed after the supply water block (the first block), the detect laundry amount block is removed. This can inhibit false detection of the laundry amount due to the laundry amount being detected while the laundry is wet, thereby ensuring safe driving of actuator 22.

Figure 14B:
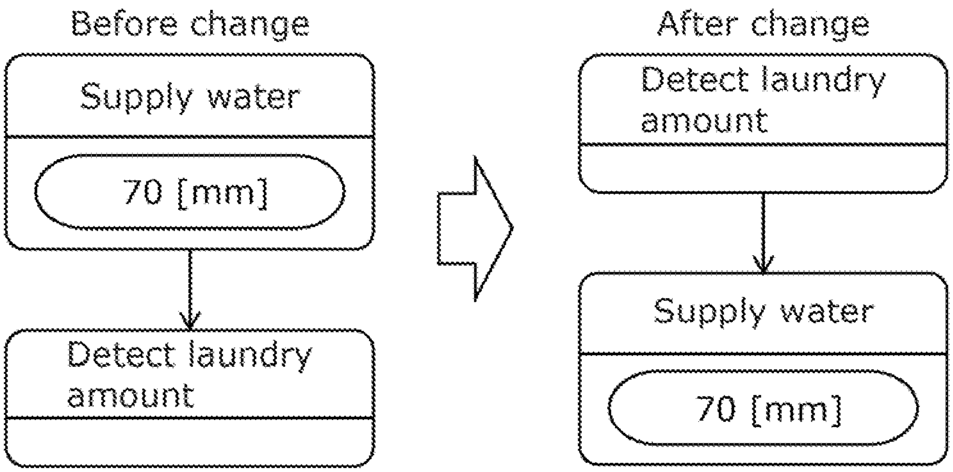
FIG. 14B illustrates one example of changing the order of blocks according to Embodiment 1.

FIG. 14B illustrates one example of changing the order of blocks (iii) according to Embodiment 1. In FIG. 14B, when the detect laundry amount block (the second block) is executed after the supply water block (the first block), the order of the supply water block and the detect laundry amount block is changed to an order in which the supply water block comes after the detect laundry amount block. This can inhibit false detection of the laundry amount due to the laundry amount being detected while the laundry is wet, thereby ensuring safe driving of actuator 22.

Although the change in the order of blocks for a washing machine is described here, the order of blocks can be changed for other apparatuses in the same manner as well.

For example, if an application for a rice cooker includes a steam block (the first block) with a steam parameter (for example, the maximum amount) and a duration parameter (for example, 20 minutes or more) that meet a given condition and another consecutive steam block (the second block) after the first steam block, a display block may be inserted as a new block between the two steam blocks. This makes it possible to notify the user to add water to the water container for steam, which can inhibit the steam heater from burning out during execution of the steam block, allowing for continuous steam to be provided. Alternatively, when two steam blocks are included consecutively as described above, the later steam block may be removed. This can inhibit the steam heater from burning out.

For example, if an application for a microwave oven includes an oven block (the first block) with a temperature parameter (for example, 200° C. or higher) and a run time parameter (for example, 10 minutes or longer) that meet a given condition and another consecutive oven block (the second block) after the first oven block, a stop block may be inserted as a new block between the two oven blocks. This will inhibit breakdowns and deterioration due to overuse of the heater. If the application for a microwave oven includes an oven block and a microwave block consecutively after the oven block, the microwave block may be removed. This improves safety by preventing sparking caused by microwave irradiation to oven trays. If the application for a microwave oven includes a bake block (the first block) and a steam block (the second block) consecutively after the bake block, the order of the bake and steam blocks may be swapped. This allows the steam heater to be warmed up before the bake block is executed, enabling the food to be baked while being given steam from the early stages of the baking process by the bake block.

Step S217

Device 300 transmits the result of the pre-execution check to device manager 200. If a block has been modified, the modified block may be transmitted to device manager 200.

Step S218

Device manager 200 responds to sequence manager 100 with the result of the device allocation. If the block has been modified in the pre-execution check, the application including the modified block may be transmitted to sequence manager 100.

Step S220

Sequence manager 100 receives a notification of the allocation result from device manager 200 and notifies the user that execution preparation is complete via UI 400.

Step S222

UI 400 displays a list of devices on which the application will be executed and a graphical user interface (GUI) for accepting input from the user to confirm execution of the application. UI 400 may accept device allocation changes from the user. Moreover, UI 400 does not need to display a list of devices.

Step S224

UI 400 receives execution confirmation input from the user and transmits an instruction to start the app to device manager 200. Device manager 200 forwards the instruction to start the app to sequence manager 100.

Steps S220, S222, and S224, which again provide information to the user before the application is executed, may be omitted because they may increase the user's workload.

This completes app pre-execution phase F200.

1.3.3 App Execution Phase F300

Next, app execution phase F300 will be described.

Step S310

Sequence manager 100 receives the instruction to start the app and selects the initial block (the first block) from among the plurality of blocks included in the application. Sequence manager 100 then transmits an instruction to execute the selected first block to device manager 200.

When a plurality of blocks operate consecutively, sequence manager 100 may send instructions to execute the plurality of blocks together to device manager 200.

Device manager 200 transmits the instruction to execute the first block to device 300 allocated to the first block, based on the instruction to execute the first block received from sequence manager 100.

Step S312

Device manager 200 receives the instruction to execute the first block, and updates the schedule (scheduled time of use) for each device.

Step S314

Device 300 receives the instruction to execute the first block, and executes the first block.

Step S316

Device 300 transmits a notification of completion to device manager 200 when the execution of the first block is complete. If an error occurs during the execution of the first block, device 300 may send error information to device manager 200. Device 300 may send event information to device manager 200 during the execution of the first block. For example, sensor output values or device operations can be used as event information, but examples are not limited thereto. Device manager 200 forwards the notification of completion and/or the various information received from device 300 to sequence manager 100.

Step S318

Upon receiving the notification of completion of the first block, sequence manager 100 updates the application progress, and selects the next block (the second block). If sequence manager 100 receives error information, it executes a process corresponding to the error information (for example, return to the previous block, return to the first block, wait, etc.). Information on the process corresponding to the error information, for example, may be held in advance in sequence manager 100 or accepted from the user via UI 400. If sequence manager 100 receives event information, it executes a process corresponding to the event information. For example, if the event information includes the output value of the water level sensor, sequence manager 100 updates the water level parameter for indicating water level in the block being executed.

Step S320

Sequence manager 100 then transmits an instruction to execute the selected second block to device manager 200.

The instruction to execute the second block may be an instruction to the same device as the instruction to execute the first block (S310), or to a different device.

The instruction to execute the second block may be transmitted to device manager 200 in the same manner as the execution instructions for the first block—by transmitting instructions to execute a plurality of blocks together.

Subsequent processing is the same as for the first block (S312 through S318), so repeated illustration in the figures and explanation in the description are omitted. The blocks included in the application are executed in sequence, and when the execution of the last block is completed, app execution phase F300 ends.

Although the execution of blocks is exemplified as being instructed one by one in sequence, the execution of blocks is not limited to this example. For example, the execution of a plurality of blocks allocated with the same device may be instructed together. In such cases, it may be checked in advance whether each block satisfies the parameter range for executing its function, or a block corresponding to the change may be downloaded to the device before execution. For example, instructions to execute each of the blocks may be given to a plurality of devices.

1.4 Advantageous Effects, Etc.

As described above, the application including one or more blocks and the rule database provide an environment in which a wide variety of applications can be developed, and for applications freely developed in that environment, actuator 22 that physically moves or heater 23 that outputs thermal energy can be safely driven. Stated differently, the application including one or more blocks and the rule database can provide an environment in which applications can be freely developed, while at the same time providing functions to ensure safety independent of the application. As a result, for example, the development of a wide variety of applications with a high degree of freedom and the development of a rule database to ensure safety can be created in parallel, enabling the early development of a wide variety of applications.

Even after the application is provided, the rule database can be modified to make the application more secure. In addition, even if a manufacturer needs to improve a situation that was not anticipated beforehand, the rule database is defined independently from the applications, so all applications can be supported by updating the rule database, without having to change a wide variety of applications themselves.

One conceivable measure is to store a rule base for error handling by detecting the state of the application when it is executed, without modifying the application itself. However, this measure invariably means dealing with the error condition after it has occurred, allowing a situation where the home appliance is overloaded or a situation where safety cannot be guaranteed. It is therefore possible to include a rule database independent of the applications, and to guarantee safety by modifying the application content by consulting the rule data.

Apparatus 20 according to the present embodiment includes: at least one of actuator 22 or heater 23; and controller 24 that controls the at least one of actuator 22 or heater 23. Controller 24: obtains an application. The application is defined by a plurality of blocks that drive the at least one of actuator 22 or heater 23. The application includes information on an order in which each of the plurality of blocks is executed. Controller 24 consults a first rule that prohibits two or more given blocks from being executed in a given order, and when the information on the order correlates with the given order, modifies the application by changing the order in which each of the plurality of blocks is executed. Controller 24 drives the at least one of actuator 22 or heater 23 based on the modified application.

This allows actuator 22 and/or heater 23 to be driven based on an application defined by a plurality of blocks. It is therefore possible to develop applications using blocks that abstract the control of apparatus 20, allowing a wide variety of applications to be developed not only by the manufacturer but also by third parties, and these applications can be easily executed on apparatus 20. Furthermore, if the application includes two or more given blocks in a given order, the order in which each of the plurality of blocks is executed can be changed before actuator 22 and/or heater 23 is driven based on the application. Accordingly, it is possible to prohibit the two or more given blocks from being executed in the given order. Stated differently, if an application developer mistakenly instructs the execution of the two or more given blocks in an unacceptable order, it is still possible to inhibit the execution of an application that cannot safely control apparatus 20. Thus, the application developer can improve the safety of apparatus 20 controlled by the application, even if the application is created with an emphasis on suitability for the user rather than ensuring the safety of actuator 22 and/or heater 23.

For example, in apparatus 20 according to the present embodiment, the two or more given blocks may include a first block and a second block, the given order may indicate that the second block comes after the first block, and in modifying the application, when the information on the order correlates with the given order, controller 24 may change the order in which each of the plurality of blocks is executed by adding a new block between the first block and the second block.

For example, in apparatus 20 according to the present embodiment, the two or more given blocks may include a first block and a second block, the given order may indicate that the second block comes after the first block, and in modifying the application, when the information on the order correlates with the given order, controller 24 may change the order in which each of the plurality of blocks is executed by removing the first block or the second block.

For example, in apparatus 20 according to the present embodiment, the two or more given blocks may include a first block and a second block, the given order may indicate that the second block comes after the first block, and in modifying the application, when the information on the order correlates with the given order, controller 24 may change the order in which each of the plurality of blocks is executed by changing an order of the first block or the second block to achieve an order in which the first block comes after the second block or an order in which another block is between the first block and the second block.

For example, in apparatus 20 according to the present embodiment, the application may include information on the plurality of blocks and information on the order in which each of the plurality of blocks is executed, and when the rule includes information indicating at least one block among the plurality of blocks cannot be executed, the rule may present, to a developer as error information, that the application cannot be developed or information on the block that cannot be executed.

With these, before the application is executed, a new block can be added, the first or second block can be removed, or the order of the first or second block can be changed to prevent the second block from being executed after the first block. Accordingly, the application developer can lower the priority that takes into consideration the safe driving of actuator 22 and heater 23 to more freely develop the application. Furthermore, the developer of the software that is incorporated in apparatus 20 that controls actuator 22 and heater 23 can allow the execution of blocks without having to check the safety of each and every application every time, and can prevent the execution of a plurality of blocks in an unacceptable order.

For example, in apparatus 20 according to the present embodiment, the first rule may prohibit the at least one of actuator 22 or heater 23 from reaching a maximum withstand temperature as a result of the two or more given blocks being executed in the given order.

This makes it possible to inhibit actuator 22 and/or heater 23 from reaching its maximum withstand temperature when the application is executed, which makes it possible to improve the safety of apparatus 20 controlled by the application.

For example, apparatus 20 according to the present embodiment may further include enclosure 21 including an interior space. The first rule may prohibit the interior space from reaching a maximum withstand temperature as a result of the two or more given blocks being executed in the given order.

This makes it possible to inhibit the interior space of enclosure 21 from reaching its maximum withstand temperature when the application is executed, which makes it possible to improve the safety of apparatus 20 controlled by the application.

Variation of Embodiment 1

In Embodiment 1, processes performed by system 1 are described with reference to FIG. 8, but the flow of processes is not limited to this example. In particular, regarding the pre-execution check (S216) described in detail, the timing and the main module in which the pre-execution check are performed are not limited to this example. Next, a number of variations of the sequence diagram for system 1 will be described in detail with reference to FIG. 15A through FIG. 15E.

Figure 15A:
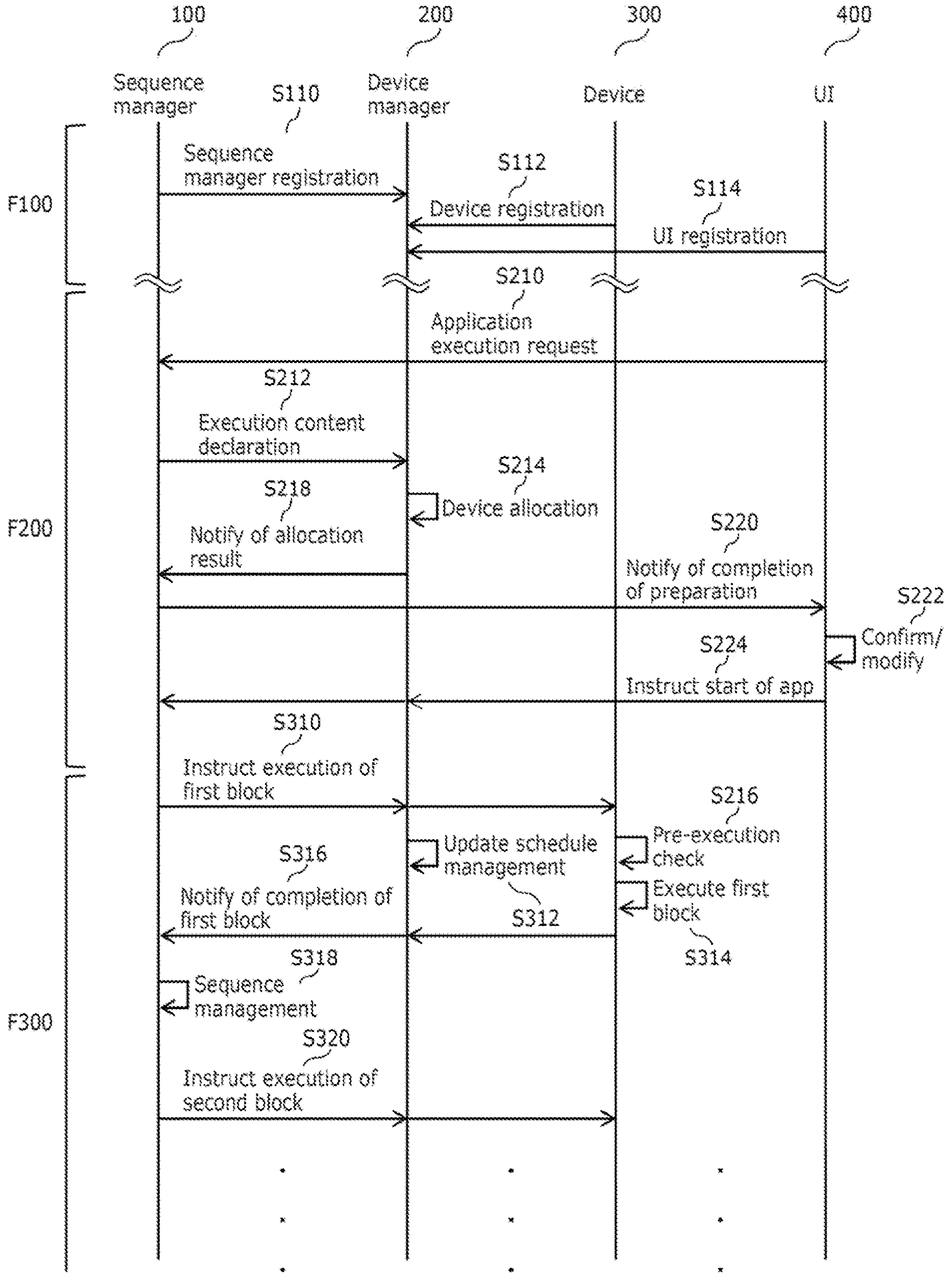
FIG. 15A illustrates a sequence diagram for a system according to Variation 1 of Embodiment 1.

FIG. 15A illustrates a sequence diagram for system 1 according to Variation 1 of Embodiment 1. In FIG. 15A, the pre-execution check (S216) is performed by device 300 just before device 300 receives the execution instruction (S310) to execute the block (S314).

This allows the software incorporated in device 300 to be simply configured to perform a pre-execution check just before the execution of a block. Stated differently, steps S215 and S217 can be omitted. As a result, it is no longer necessary to incorporate functions and a communication API for these processes into device 300, and it is therefore possible to reduce memory used by the microcontroller in device 300.

The result of the pre-execution check may be notified to device manager 200 and/or UI 400. For example, device manager 200 or UI 400 may be notified of the result of the check when a parameter change or an instruction to stop execution of a block is made as a result of the pre-execution check.

Figure 15B:
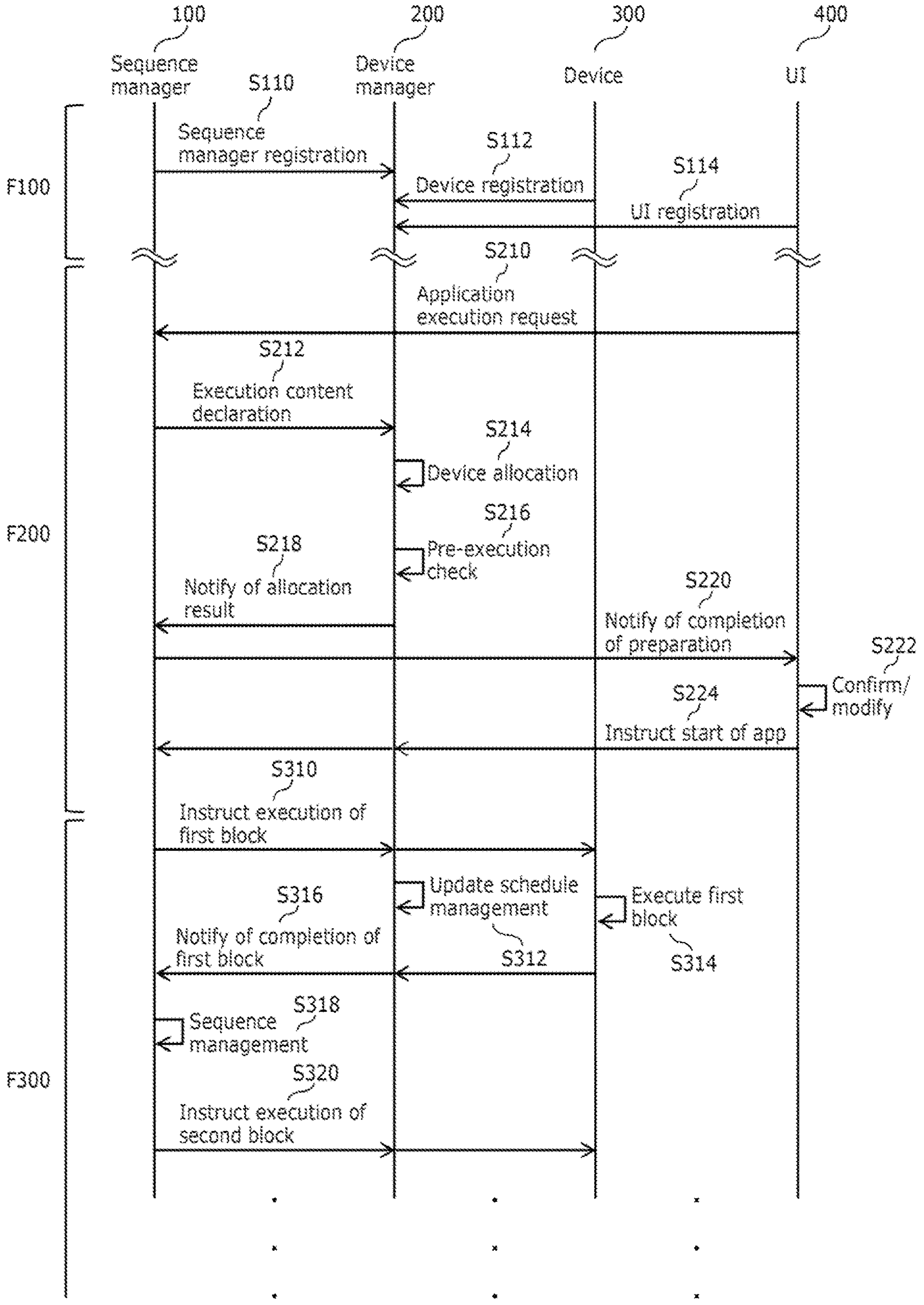
FIG. 15B illustrates a sequence diagram for a system according to Variation 2 of Embodiment 1.

FIG. 15B illustrates a sequence diagram for system 1 according to Variation 2 of Embodiment 1. In FIG. 15B, the pre-execution check (S216) is performed by device manager 200 as it performs the allocation result notification (S218).

With this, the software incorporated in device 300 does not need to include the function for performing the pre-execution check (S216). Thus, the use of memory included in device 300 can be reduced, leading to a cost reduction of device 300.

In Embodiment 1, regarding the block execution (S314) by device 300, the flow of processes performed by instructions from sequence manager 100 implemented in cloud server 10 is described, but the aspect in which the block execution (S314) is performed is also not limited to this example.

For example, the content of the notification from sequence manager 100 may be stored in memory in device 300, and the block may be executed by direct instruction from the user through the UI included in apparatus 20 or UI 400 included in terminal 30. Stated differently, the application may be downloaded to the device and the user may execute the application at any time.

Figure 15C:
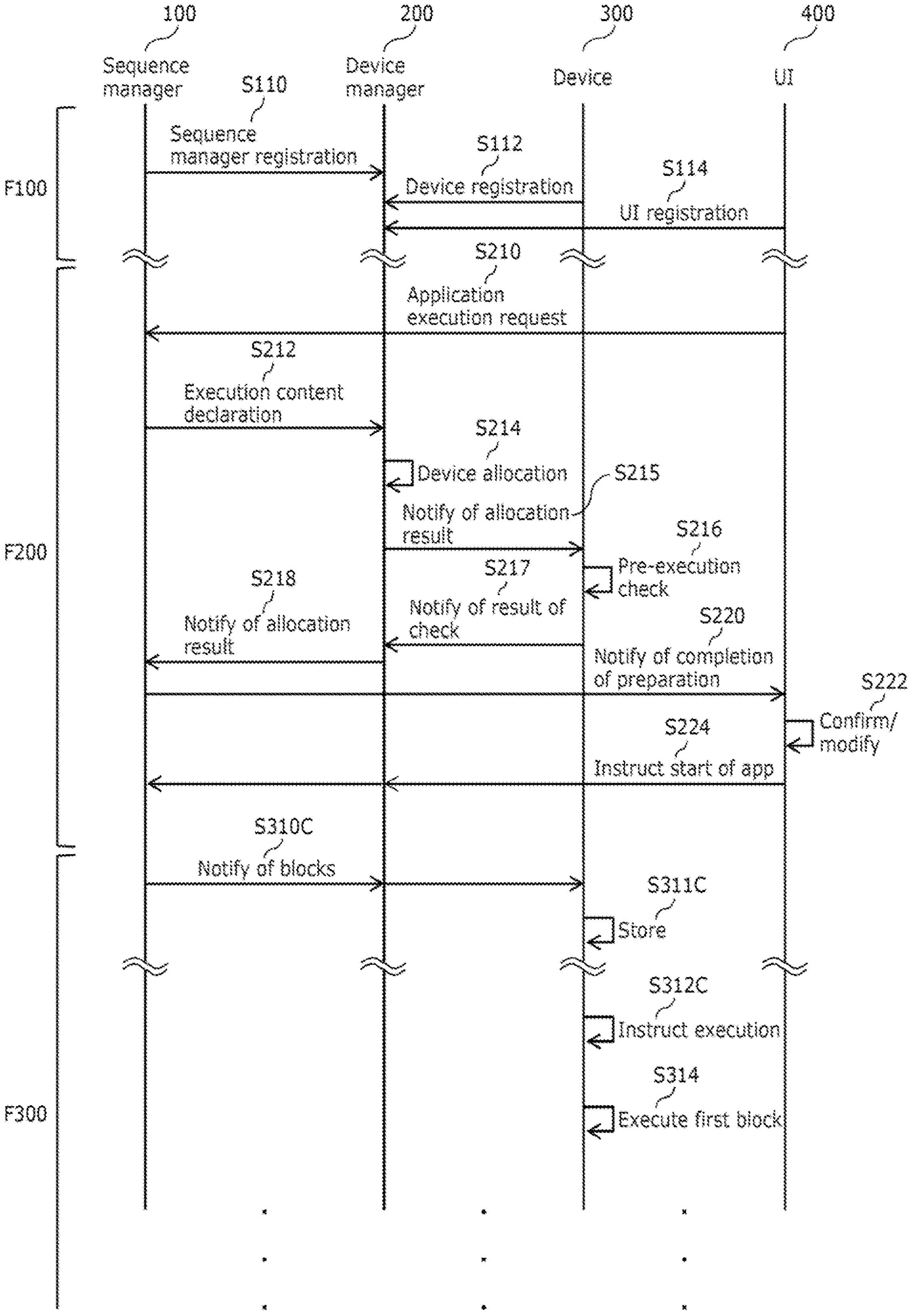
FIG. 15C illustrates a sequence diagram for a system according to Variation 3 of Embodiment 1.

FIG. 15C illustrates a sequence diagram for system 1 according to Variation 3 of Embodiment 1. In FIG. 15C, in app execution phase F300, sequence manager 100 notifies device 300 of one or more blocks to be executed on device 300 (S310C). Device 300 then stores the notified one or more blocks in memory (S311C).

Device 300 then accepts instructions from the user to execute the stored one or more blocks (S312C) and executes the one or more blocks in order starting with the first block (S314).

As described above, by storing the one or more blocks in device 300, device 300 can be controlled without communication between device manager 200 and device 300, thus reducing the risk of device 300 outage or delay due to unstable communication between cloud server 10 and apparatus 20. Therefore, this variation is more effective in environments where communication with cloud server 10 is unreliable and/or in device 300 where device outages or delays during application execution are not tolerated.

In Variation 3, as in Embodiment 1, the pre-execution check (S216) is also important, but the timing and the main module in which the pre-execution check (S216) is performed are not limited to FIG. 15C. In other words, Variation 3 may be combined with Variation 1 or 2.

Figure 15D:
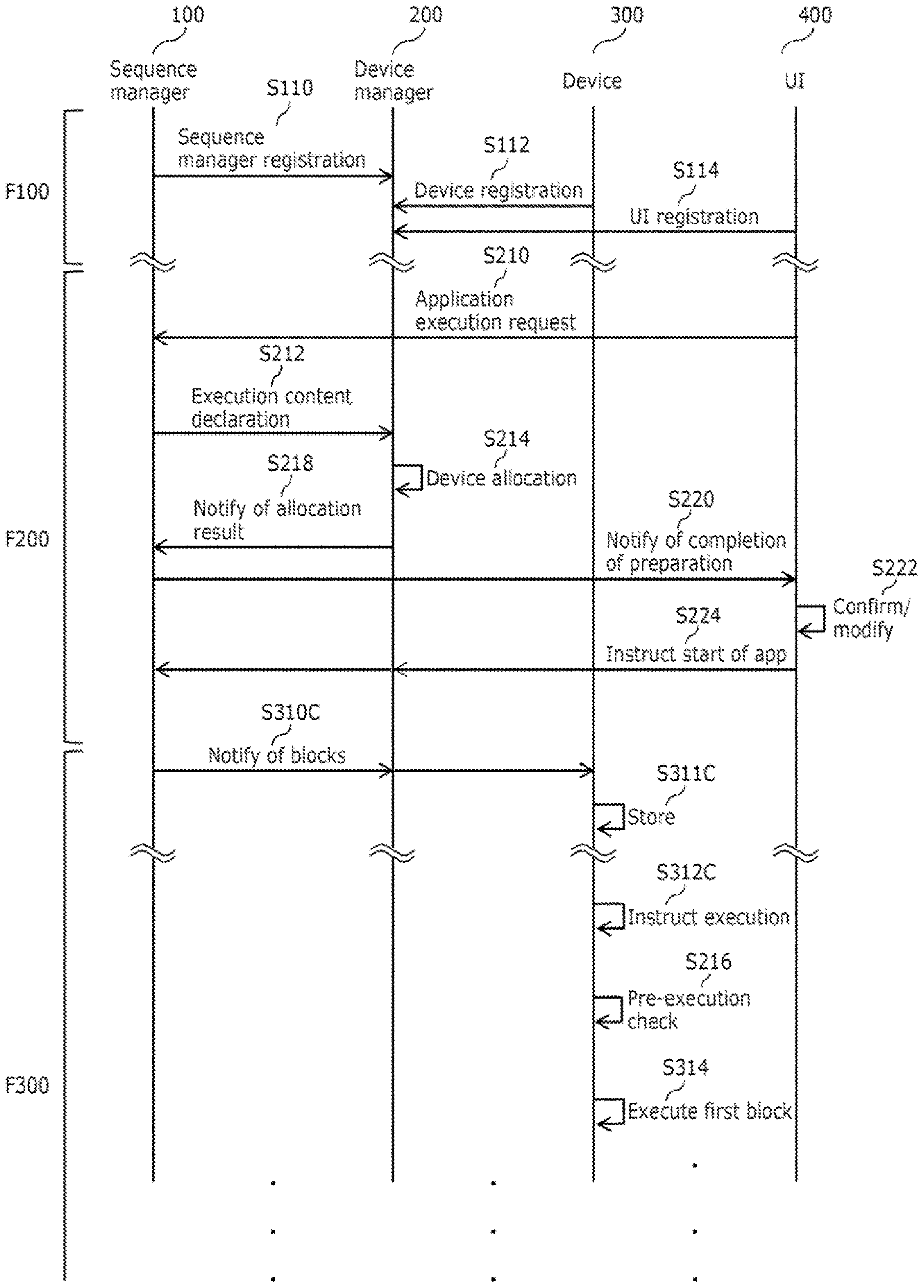
FIG. 15D illustrates a sequence diagram for a system according to Variation 4 of Embodiment 1.

FIG. 15D illustrates a sequence diagram for system 1 according to Variation 4 of Embodiment 1. Variation 4 corresponds to a combination of Variation 1 and Variation 3. In Variation 4, as illustrated in FIG. 15D, the pre-execution check (S216) is performed by device 300 just after device 300 receives the execution instruction (S312C) and just before device 300 executes the block (S314).

If a block is downloaded to device 300 and the user executes the block at any given time, the possibility of a significant discrepancy between when the block is downloaded and when it is executed increases. Stated differently, the block may be executed, for example, days, months, or years after the block is downloaded to device 300. In such cases, the degradation level, etc., of device 300 may change between the time the block is downloaded and the time the block is executed. Therefore, in device 300—the degradation level of which affects the execution of a block—a pre-execution check is performed by device 300 just before the block is executed, which allows for pre-execution check that is dependent on degradation level.

Figure 15E:
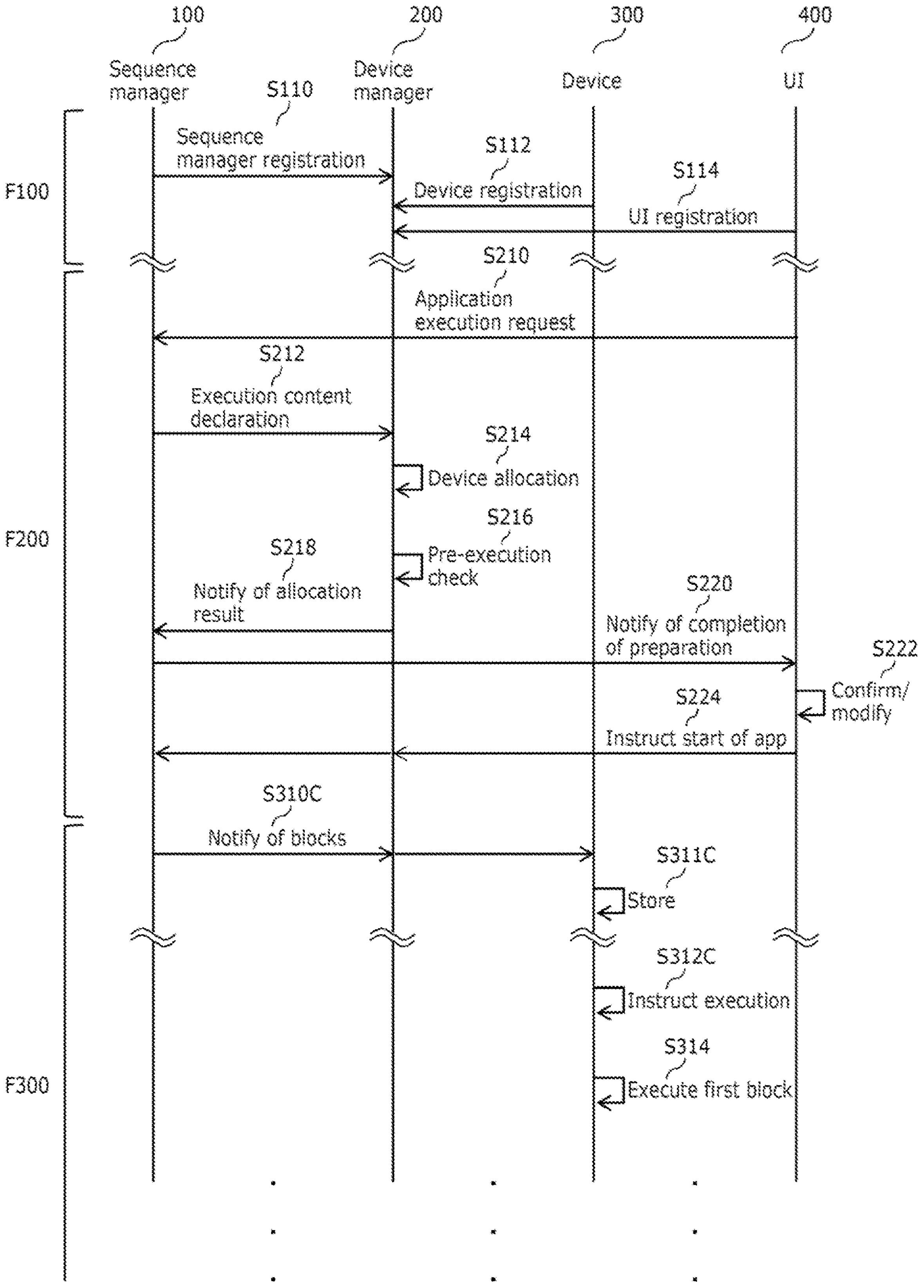
FIG. 15E illustrates a sequence diagram for a system according to Variation 5 of Embodiment 1.

FIG. 15E illustrates a sequence diagram for system 1 according to Variation 5 of Embodiment 1. Variation 5 corresponds to a combination of Variation 2 and Variation 3. In Variation 5, as illustrated in FIG. 15E, the pre-execution check (S216) is performed by device manager 200 as it performs the allocation result notification (S218).

Embodiment 2

Next, Embodiment 2 will be described. The present embodiment differs from Embodiment 1 primarily in that the pre-execution check is skipped when the application is authenticated. Hereinafter, the present embodiment will be described with a focus on the points of difference from Embodiment 1.

The hardware and functional configurations of system 1 according to the present embodiment are the same as in Embodiment 1. Accordingly, repeated illustration in the figures and explanation in the description are omitted.

2.1 Processes

In the present embodiment, the processes are the same as in Embodiment 1 except that step S216 of the pre-execution check in Embodiment 1 is replaced with step S216A. Step S216A of the pre-execution check process will therefore be described with reference to FIG. 16.

Figure 16:
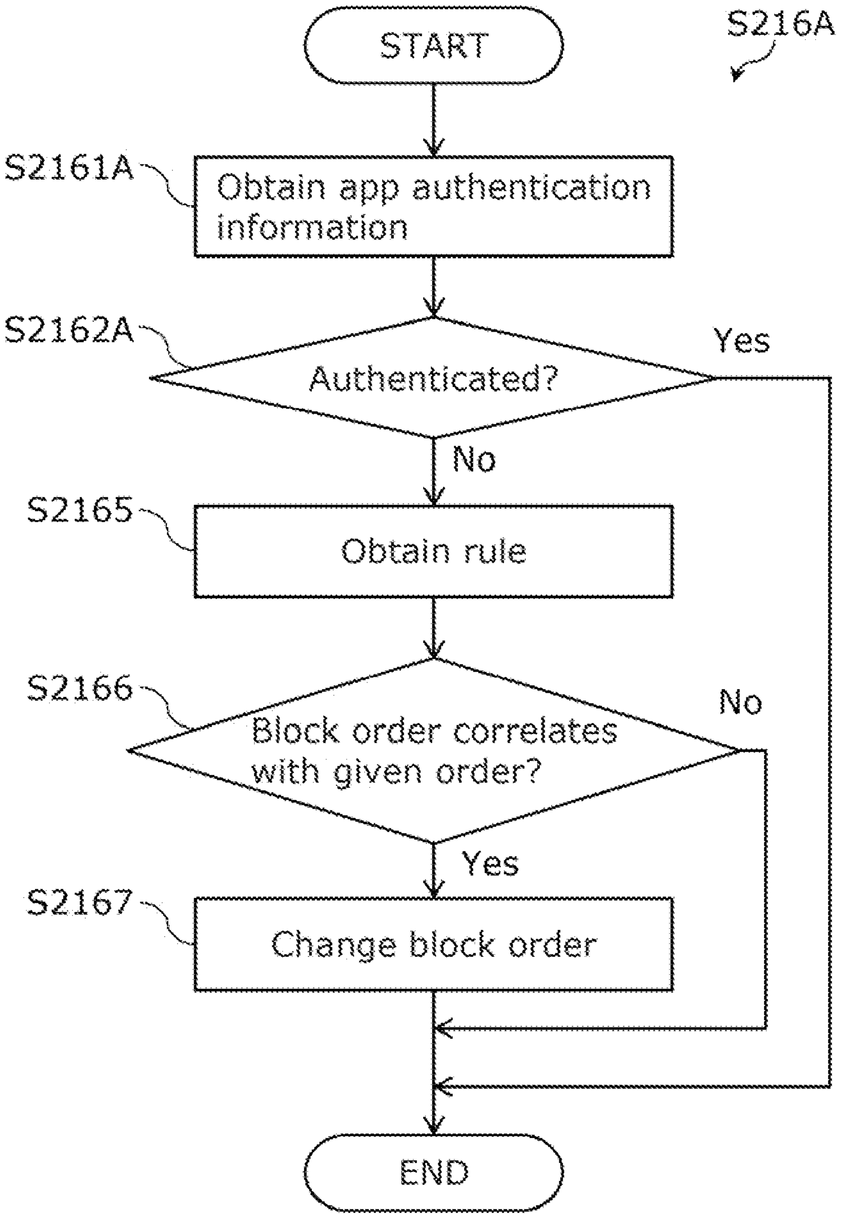
FIG. 16 illustrates a flowchart of the pre-execution check process according to Embodiment 2.

FIG. 16 illustrates a flowchart of the pre-execution check process according to Embodiment 2.

Step S2161A

Device 300 obtains app authentication information. If the application has been authenticated, the app authentication information includes information indicating that the application has been authenticated.

Application authentication is a mechanism for guaranteeing the quality of an application, for example, by enabling confirmation of the application's security and/or identity (i.e., that it has not been tampered with). Next, one example of an application granted with authentication information will be given. If the change history of the application's code indicates that no changes were made to parameter ranges, information indicating that the application has been authenticated is associated with the application.

Step S2162A

Device 300 determines whether the application is authenticated or not based on the retrieved app information. Here, if the application is determined to be authenticated (Yes in S2162A), device 300 skips the subsequent steps S2165 to S2167 and terminates the pre-execution check process. If, however, it is determined that the application is not authenticated (No in S2162A), device 300 proceeds to the next step S2165.

2.2 Advantageous Effects, Etc.

As described above, apparatus 20 according to the present embodiment includes: at least one of actuator 22 or heater 23; and controller 24 that controls the at least one of actuator 22 or heater 23. Controller 24: obtains an application. The application is defined by a plurality of blocks that drive the at least one of actuator 22 or heater 23. The application includes information on an order in which each of the plurality of blocks is executed and information indicating whether the application has been authenticated. When the application does not include information indicating that the application has been authenticated, controller 24 consults a first rule that prohibits two or more given blocks from being executed in a given order, and when the information on the order correlates with the given order, modifies the application by changing the order in which each of the plurality of blocks is executed. Controller 24 drives the at least one of actuator 22 or heater 23 based on the modified application.

This achieves the same advantageous effects as Embodiment 1. Furthermore, when the application is not authenticated, processes that involve application modifications can be performed, which reduces the processing load when the application is authenticated. It is therefore not necessary to perform the determination process for the order of blocks for all applications, and management through authentication reduces the processing load and facilitates design standards for the order of blocks, making it easier and safer for application developers to design.

For example, in apparatus 20 according to the present embodiment, when the application includes information indicating that the application has been authenticated, controller 24 may not consult the first rule and may not modify the application.

This allows the process for changing the blocks to be skipped if the application has already been authenticated, thus reducing the processing load.

Embodiment 3

Next, Embodiment 3 will be described. The present embodiment differs from Embodiment 1 above primarily in that the pre-execution check is skipped when the creator of the application and the producer of the apparatus are the same. Hereinafter, the present embodiment will be described with a focus on the points of difference from Embodiment 1.

The hardware and functional configurations of system 1 according to the present embodiment are the same as in Embodiment 1. Accordingly, repeated illustration in the figures and explanation in the description are omitted.

3.1 Processes

In the present embodiment, the processes are the same as in Embodiment 1 except that step S216 of the pre-execution check in Embodiment 1 above is replaced with step S216B. Step S216B of the pre-execution check process will therefore be described with reference to FIG. 17.

Figure 17:
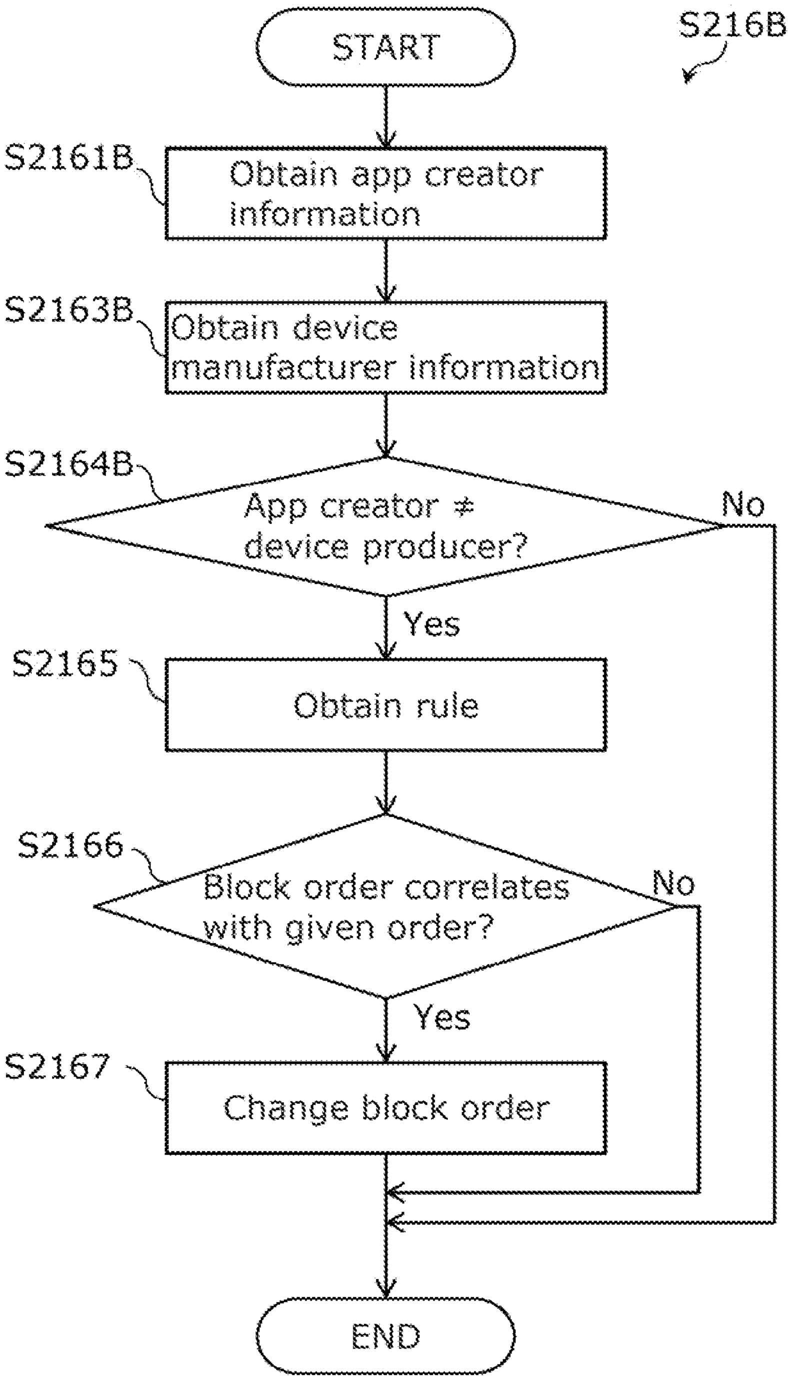
FIG. 17 illustrates a flowchart of the pre-execution check process according to Embodiment 3.

FIG. 17 illustrates a flowchart of the pre-execution check process according to Embodiment 3.

Step S2161B

Device 300 obtains app creator information. The app creator information indicates the creator of the application. Here, "creator" means, for example, the company, individual, or organization that created the application, and may also be referred to as "developer" or "author".

Step S2163B

Device 300 obtains device manufacturer information. The device manufacturer information indicates the producer of the device. Here, "producer" means, for example, the company, individual, or organization that produced device 300 (i.e., apparatus 20), and may also be referred to as "manufacturer".

Step S2164B

Device 300 determines whether the creator of the application is different from the producer of device 300. If the creator of the application is an individual and the producer of device 300 is a company, device 300 may determine that the creator of the application and the producer of device 300 are the same if the company to which the creator of the application belongs and the producer of device 300 match. Device 300 may also determine that the creator of the application and the producer of device 300 are the same if the creator of the application is a development contractor contracted by the producer of device 300.

Here, if the creator of the application and the producer of device 300 are the same (No in S2164B), device 300 skips the subsequent steps S2165 to S2167 and ends the pre-execution check process. If, however, the creator of the application and the producer of device 300 are different (Yes in S2164B), device 300 proceeds to the next step S2165.

3.2 Advantageous Effects, Etc.

As described above, apparatus 20 according to the present embodiment includes: at least one of actuator 22 or heater 23; and controller 24 that controls the at least one of actuator 22 or heater 23. Controller 24 obtains an application. The application is defined by a plurality of blocks that drive the at least one of actuator 22 or heater 23. The application includes information on an order in which each of the plurality of blocks is executed and information indicating a creator of the application. Controller 24 obtains information indicating a producer of apparatus 20. When the creator of the application and the producer of apparatus 20 are different, controller 24 consults a first rule that prohibits two or more given blocks from being executed in a given order, and when the information on the order correlates with the given order, modifies the application by changing the order in which each of the plurality of blocks is executed. Controller 24 drives the at least one of actuator 22 or heater 23 based on the modified application.

This achieves the same advantageous effects as Embodiment 1. Furthermore, when the creator of the application and the manufacturer of apparatus 20 are different, processes that involve application modifications can be performed, which reduces the processing load when the creator of the application and the manufacturer of apparatus 20 are the same.

Embodiment 4

Next, Embodiment 4 will be described. The present embodiment differs from Embodiment 1 primarily in that pre-execution check is performed using a rule corresponding to the degradation level of the apparatus. Hereinafter, the present embodiment will be described with a focus on the points of difference from Embodiment 1.

The hardware and functional configurations of system 1 according to the present embodiment are the same as in Embodiment 1. Accordingly, repeated illustration in the figures and explanation in the description are omitted.

4.1 Processes

In the present embodiment, the processes are the same as in Embodiment 1 except that step S216 of the pre-execution check in Embodiment 1 above is replaced with step S216C. Step S216C of the pre-execution check process will therefore be described with reference to FIG. 18.

Figure 18:
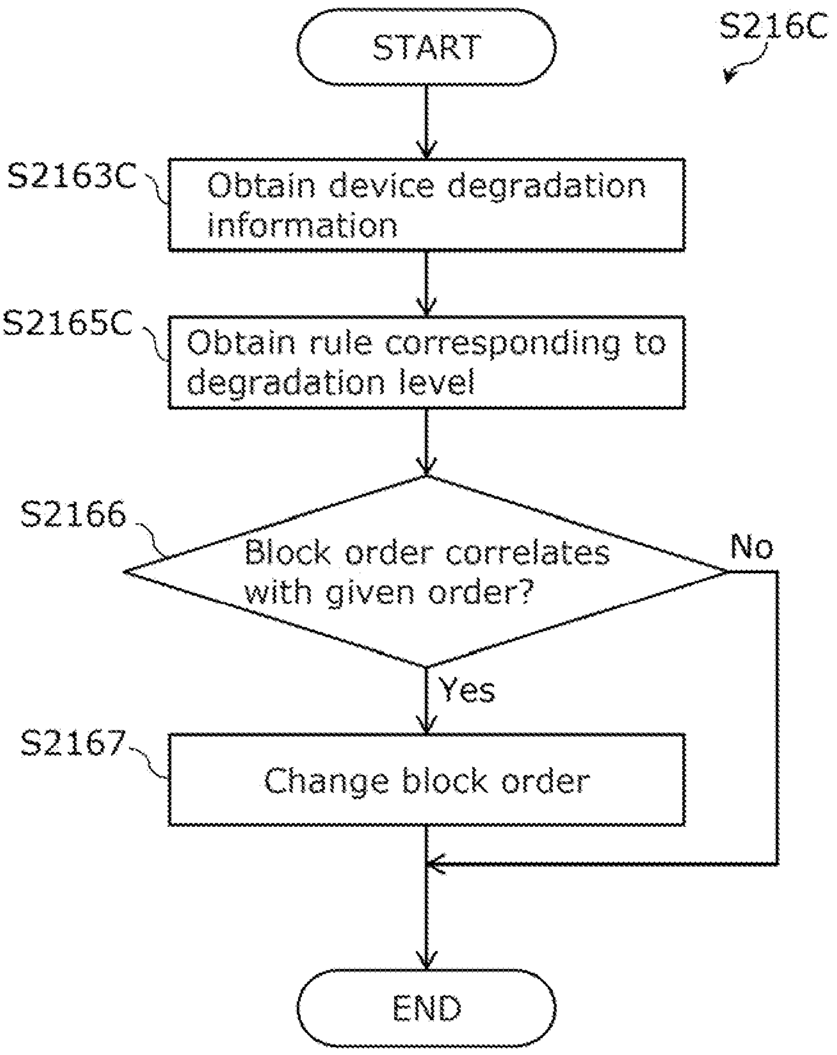
FIG. 18 illustrates a flowchart of the pre-execution check process according to Embodiment 4.

FIG. 18 illustrates a flowchart of the pre-execution check process according to Embodiment 4.

Step S2163C

Device 300 obtains device degradation information. The device degradation information indicates the degradation level of actuator 22 and/or heater 23 included in apparatus 20. The method of detecting the degradation level is not limited, and can be detected using a sensor, for example.

Step S2165C

Device 300 obtains a rule corresponding to the degradation level. For example, device 300 consults the rule database to obtain a rule corresponding to the degradation level of actuator 22 or heater 23 that the block drives.

An item that determines the degradation level is, for example, the number of times actuator 22 and/or heater 23 included in device 300 has been used, the hours of use, or the number of days used from the start of operation to the present. These items are assumed to increase in an approximately proportional relationship to use by a user. Thus, the rule is defined so that the degradation level increases with each increase in the value corresponding to the item.

Another item that determines the degradation level is, for example, an added value of the temperature of heater 23 or the degree of reproducibility of the input and output of actuator 22 and/or heater 23. The added value of the temperature of heater 23 is the added value of the temperature when heater 23 is driven. For example, the average, intermediate, or maximum temperature of heater 23 during execution of the block is used. The temperature of heater 23 may be the ratio of the execution temperature to the temperature limit of heater 23, or the difference of the execution temperature to the temperature limit of heater 23.

The degree of reproducibility of the input and output of actuator 22 and/or heater 23 is calculated with reference to the relationship between the input value to drive actuator 22 and/or heater 23 and the output of actuator 22 and/or heater 23. The ratio of the actual output value for a given input to the output value specified by the relationship is used.

4.2 Advantageous Effects, Etc.

In this way, apparatus 20 according to the present embodiment includes: at least one of actuator 22 or heater 23; and controller 24 that controls the at least one of actuator 22 or heater 23. Controller 24 obtains an application. The application is defined by a plurality of blocks that drive the at least one of actuator 22 or heater 23. The application includes information on an order in which each of the plurality of blocks is executed. Controller 24 obtains degradation information indicating whether the at least one of actuator 22 or heater 23 has degraded. Controller 24 consults a first rule that corresponds to the degradation information and prohibits two or more given blocks from being executed in a given order, and when the information on the order correlates with the given order, modifies the application by changing the order in which each of the plurality of blocks is executed. Controller 24 drives the at least one of actuator 22 or heater 23 based on the modified application.

This achieves the same advantageous effects as Embodiment 1. Furthermore, a rule corresponding to the degradation information of apparatus 20 can be used, and the block can be used to execute drive instructions from the application side to actuator 22 and/or heater 23 while taking into account the performance of the device as it degrades over time, and apparatus 20 controlled by the application can therefore be made more secure.

Embodiment 5

In Embodiments 1 through 4, a block included in an application that has already been delivered is changed before the application is executed. In the present embodiment, the application is modified is before the application is delivered, i.e., in the development or production stage of the application. In this respect to timing, the present embodiment differs from Embodiments 1 through 4. Hereinafter, the present embodiment will be described in detail with a focus on the points of difference from Embodiments 1 through 4. Excluding the timing of the modification of the application, the present embodiment may be the same as Embodiments 1 through 4. Elements in the present embodiment that are the same as those in Embodiments 1 through 4 are given the same reference signs as in Embodiments 1 through 4, and repeated detailed description thereof will be omitted.

5.1 Configuration

Figure 19:
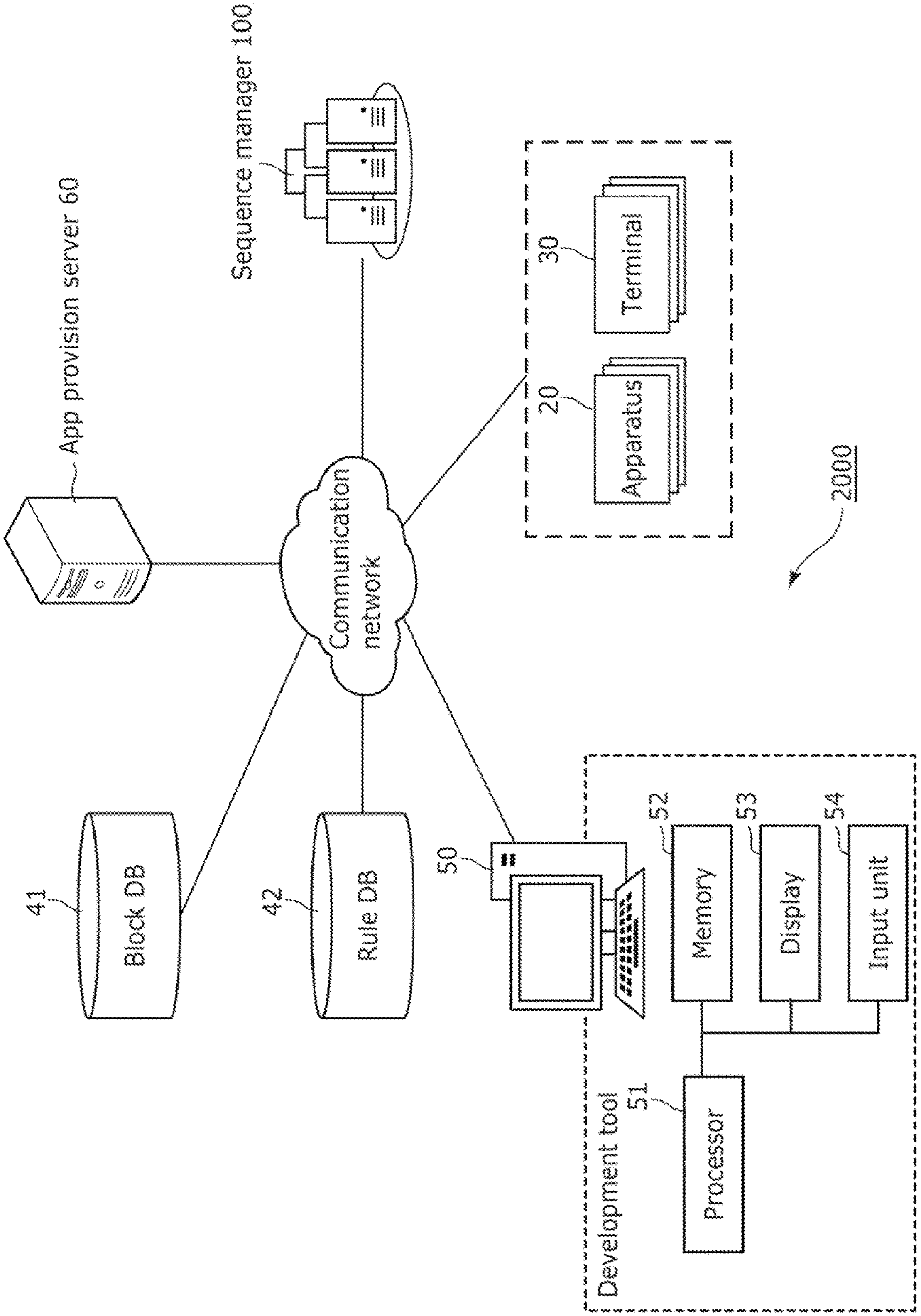
FIG. 19 illustrates a configuration example of an information processing system according to Embodiment 5.

FIG. 19 illustrates a configuration example of an information processing system used in the development of an application.

Information processing system 2000 includes block database 41, rule database 42, development tool 50, a plurality of apparatuses 20 and a plurality of terminals 30, app provision server 60, and sequence manager 100. For example, these components included in information processing system 2000 are connected via a communication network such as the internet.

Block database 41, also referred to as a "block DB", is a recording medium that stores block lists of a plurality of function blocks. These function blocks are also referred to as "blocks", just as in Embodiments 1 through 4. Rule database 42, also referred to as a "rule DB", is a recording medium that stores a plurality of rules. Rule database 42 may be the same as rule database 1300 illustrated in FIG. 12, for example. These recording media can be hard disks, random access memory (RAM), read only memory (ROM), or semiconductor memory. The recording media may be volatile or non-volatile.

Development tool 50 is, for example, a computer system including processor 51, memory 52, display 53, and input unit 54. Processor 51 executes each of the processes described below by executing instructions or a software program stored in memory 52, for example, and displays text or images on display 53. Display 53 is, for example, but not limited to, a liquid crystal display, a plasma display, or an electroluminescent (EL) display. Input unit 54 is configured as, for example, a keyboard, a touch sensor, a touch pad, or a mouse. Such development tool 50 is used, for example, by a developer of the application to generate a sequence or application including a plurality of function blocks. Note that in the present embodiment, development tool 50 is one example of the information processing apparatus.

App provision server 60 obtains and holds applications generated by development tool 50, from that development tool 50 via a communication network. App provision server 60 then downloads the applications it holds to sequence manager 100 in accordance with an instruction from UI 400 included in terminal 30.

Figure 20:
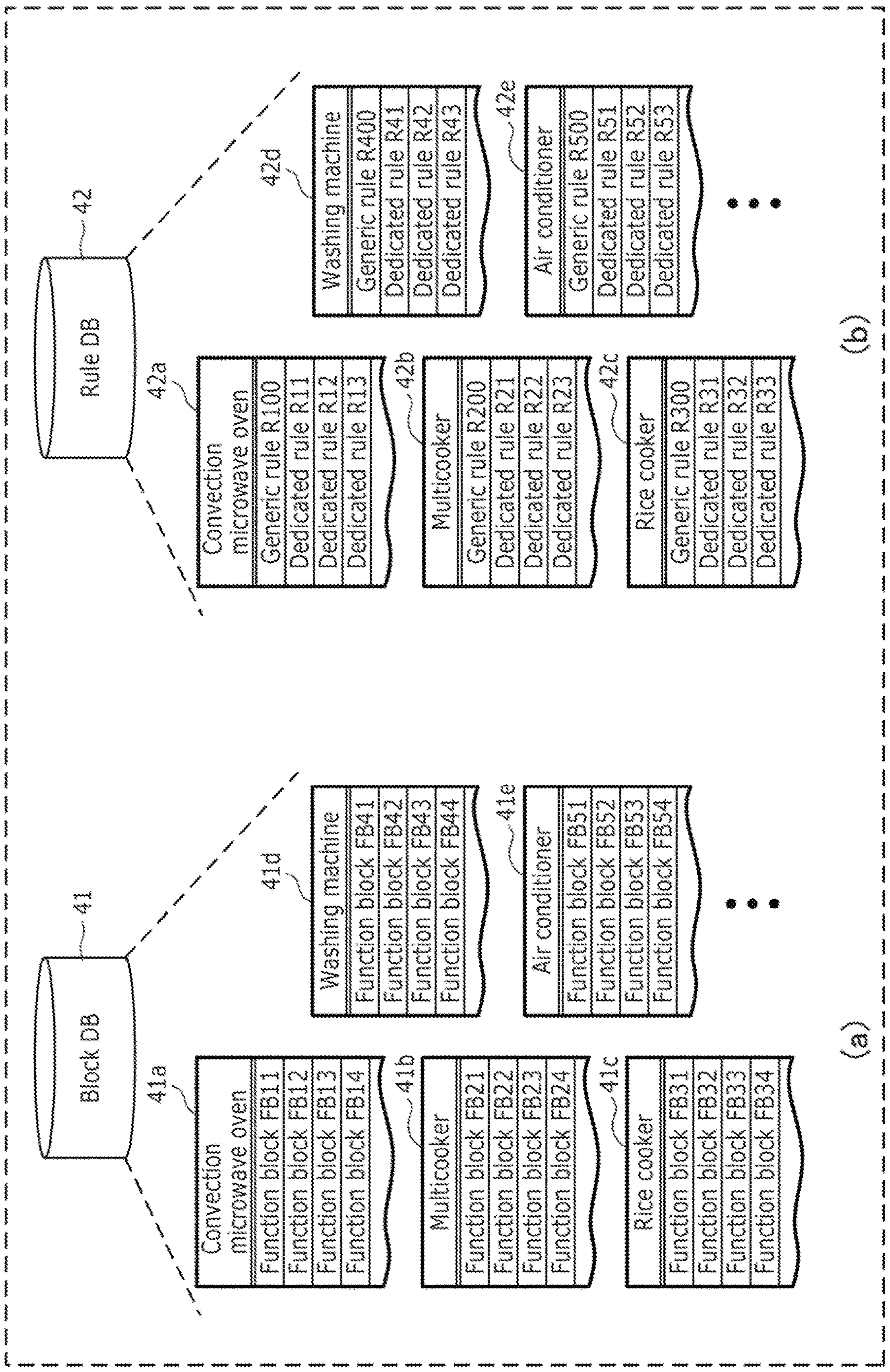
FIG. 20 illustrates one example of information stored in each of a block database and a rule database according to Embodiment 5.

FIG. 20 illustrates one example of the information stored in each of block database 41 and rule database 42.

As illustrated in (a) in FIG. 20, block database 41 stores, for each of a plurality of types of apparatuses 20, a list of function blocks for driving that type of apparatus 20, as the above-described block list. For example, block lists 41*a* through 41*e* are stored. Block list 41*a* includes function blocks FB11 through FB14, etc., for driving a convection microwave oven. Block list 41*b* includes function blocks FB21 through FB24, etc., for driving a multicooker. These function blocks may be identical or similar to the blocks in Embodiments 1 through 4.

As illustrated in (b) in FIG. 20, rule database 42 stores, for each type of apparatus 20, a rule group consisting of at least one rule applicable to that type of apparatus 20. For example, rule groups 42*a* through 42*e* are stored. Rule group 42*a* includes rules R100 and R11 through R13, which apply to convection microwave ovens. Rule group 42*b* includes rules R200 and R21 through R23, which apply to multicookers. Rule group 42*d* includes rules R400 and R41 through R43, which apply to washing machines. These rules may be identical or similar to the rules in Embodiments 1 through 4.

Here, each of the convection microwave oven rules R11 through R13 is a dedicated rule that applies, for example, to a given model of convection microwave oven manufactured by a given manufacturer. Similarly, each of the multicooker rules R21 through R23 is a dedicated rule that applies, for example, to a given model of multicooker manufactured by a given manufacturer. Similarly, each of the washing machine rules R41 through R43 is a dedicated rule that applies to a given model of washing machine manufactured by a given manufacturer. More specifically, each of dedicated rules R41 through R43 may be, for example, rule 1301, 1302, or 1303 illustrated in FIG. 12.

On the other hand, convection microwave oven rule R100 is a generic rule for convection microwave ovens, applicable to each of a plurality of types of convection microwave ovens, for example. Similarly, multicooker rule R200 is a generic rule for multicookers, applicable to each of a plurality of types of multicookers, for example.

Figure 21:
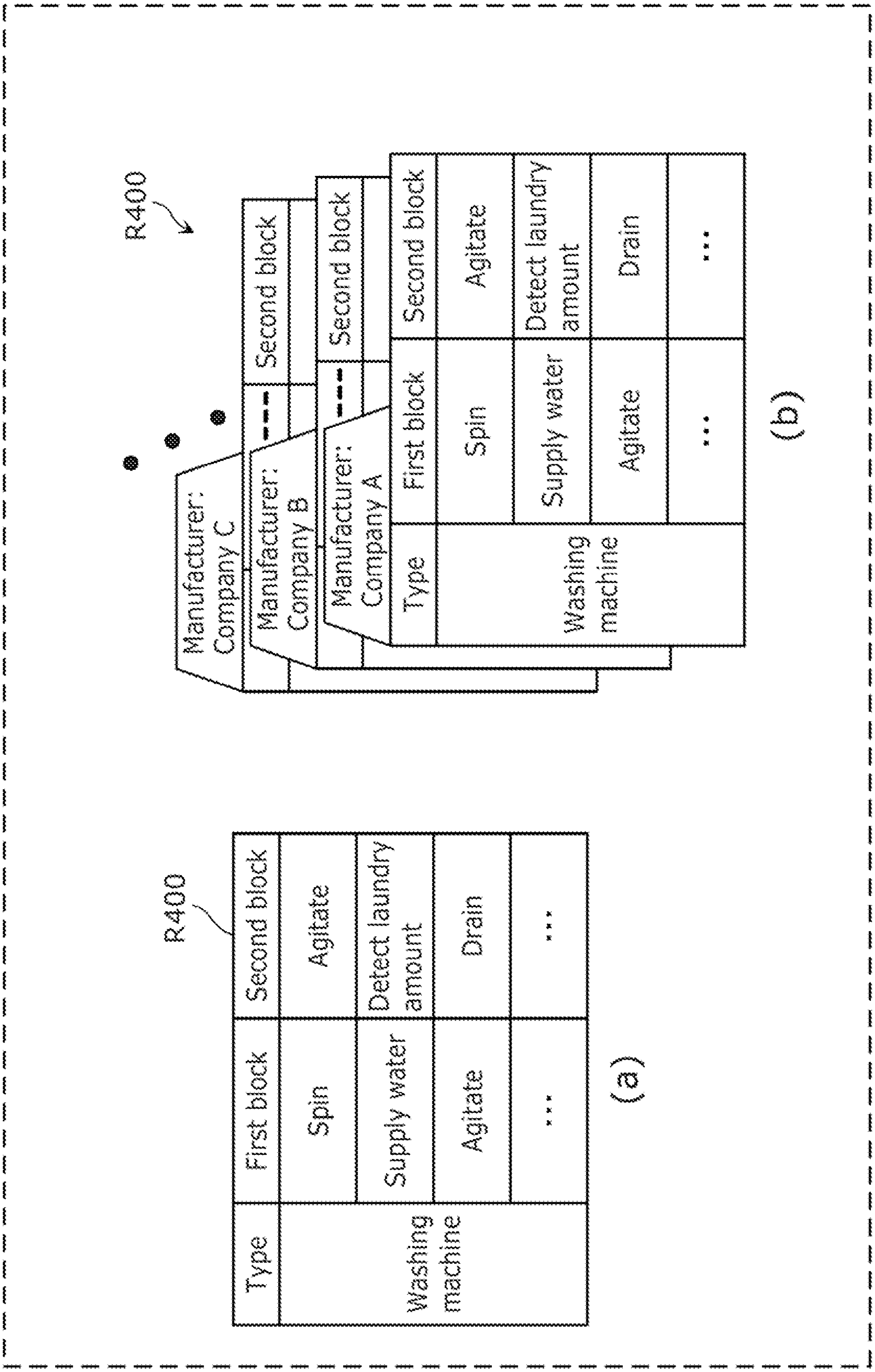
FIG. 21 illustrates examples of a generic rule included in the rule database according to Embodiment 5.

FIG. 21 illustrates examples of a generic rule included in rule database 42.

Rule group 42*d* for washing machines stored in rule database 42 includes, for example, generic rule R400 shown in (a) of FIG. 21. This generic rule R400 is applicable to each of a plurality of types of washing machines and includes information on the first and second blocks that are prohibited from being executed consecutively. The order in which the first and second blocks are prohibited is hereinafter also referred to as a non-permissible block order. Generic rule R400 may indicate a plurality of non-permissible block orders. For example, as a non-permissible block order, generic rule R400 indicates that the execution of an "agitate" function block immediately after a "spin" function block is prohibited. For example, as a non-permissible block order, generic rule R400 indicates that the execution of a "detect laundry amount" block immediately after a "supply water" block is prohibited. For example, as a non-permissible block order, the rule also indicates that execution of a "drain" block immediately after an "agitate" block is prohibited.

The "spin" block is a function block that causes the washing machine to perform a spin operation as a function, and the "agitate" block is a function block that causes the washing machine to perform an agitate operation as a function. Similarly, the "supply water block" is a function block that causes the washing machine to supply water as a function, and the "detect laundry amount block" is a function block that causes the washing machine to detect the amount of laundry as a function. Similarly, the "drain" block is a function block that causes the washing machine to perform a drain operation as a function.

The plurality of types of washing machines to which generic rule R400 applies include washing machines from a plurality of manufacturers. If each manufacturer offers more than one model of washing machine, the plurality of types of washing machines include those plurality of models of washing machines. Stated differently, the non-permissible block order indicated in generic rule R400 applies to any washing machine, regardless of manufacturer and model.

Generic rule R400 for washing machines may also indicate a non-permissible block order that applies to each washing machine from a plurality of manufacturers, as illustrated in (b) of FIG. 21. For example, generic rule R400 indicates the non-permissible block order applicable to the plurality of models of washing machines provided by the manufacturer "company A", the non-permissible block order applicable to the plurality of models of washing machines provided by the manufacturer "company B", and so on.

Thus, just like in Embodiments 1 through 4, the rule according to the present embodiment prohibits two or more given blocks from being executed in a given order. The two or more given blocks include a first block and a second block, and the given order indicates that the second block comes after the first block. More specifically, the given order indicates that the second block comes immediately after the first block. Note that just as in Embodiments 1 through 4, the rule according to the present embodiment can be said to prohibit at least one of actuator 22 or heater 23, or the interior space of enclosure 21 from reaching its maximum withstand temperature as a result of the two or more given blocks being executed in the given order.

5.2 Processes

Figure 22:
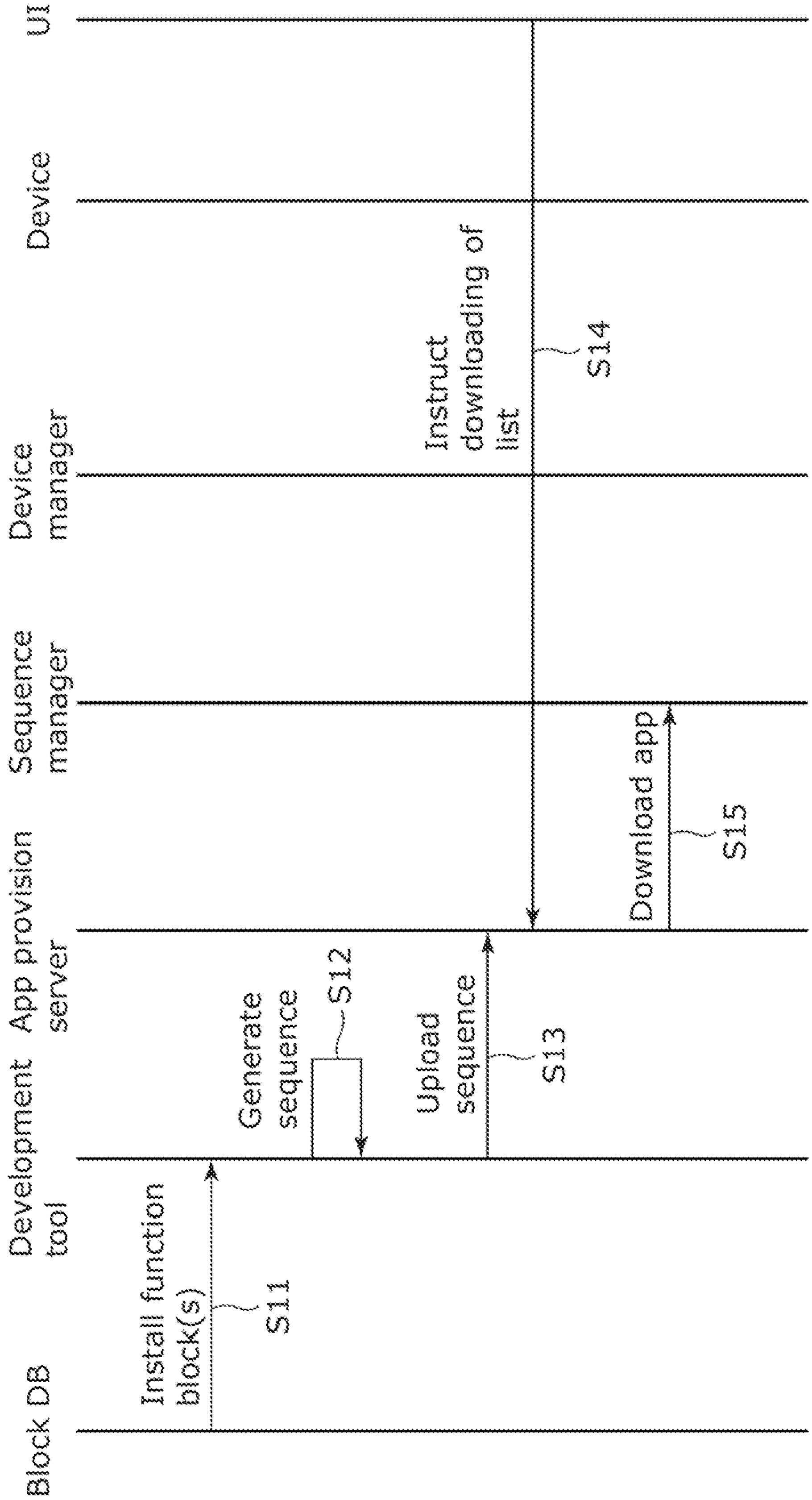
FIG. 22 is a sequence diagram of the information processing system according to Embodiment 5.

FIG. 22 is a sequence diagram of information processing system 2000.

Step S11

First, development tool 50 installs one or more function blocks. More specifically, development tool 50 downloads and obtains one or more function blocks from block database 41. For example, development tool 50 may retrieve block list 41*a* for the convection microwave oven, or only some function blocks from block list 41*a*. Development tool 50 then makes the obtained one or more function blocks available for sequence generation.

Here, each function block stored in block database 41 may be appended with device information corresponding to that function block. This device information indicates the manufacturer, type, model, or model number of, for example, apparatuses 20 driven according to the function block corresponding to that device information. Accordingly, development tool 50 may download one or more function blocks based on the device information. For example, development tool 50 may download one or more function blocks to drive each of apparatuses 20 provided by the same manufacturer, and may download one or more function blocks to drive each of apparatuses 20 used for warming food.

Step S12

Next, development tool 50 generates the sequence. More specifically, development tool 50 generates a sequence using one or more downloaded function blocks in accordance with an input operation performed on input unit 54 by the operator. The operator may be a developer of the application defined by the sequence. In the present embodiment, in this step S12, development tool 50 consults a rule described above and modifies the application based on the rule.

Step S13

Next, development tool 50 uploads the generated sequence. More specifically, development tool 50 generates transmission information for transmitting the generated sequence to app provision server 60 in accordance with an input operation performed on input unit 54 by the operator, based on the content of that sequence, and transmits the generated transmission information to app provision server 60. The transmission information may be, for example, a JavaScript Object Notation (JSON) object. This transmits the sequence to app provision server 60, where it is stored as an application on app provision server 60.

Step S14

Next, the user of terminal 30 accesses app provision server 60 by operating UI 400 of that terminal 30 and browses the list of applications stored in app provision server 60. UI 400 then selects an application from the list in accordance with the user operation, and requests app provision server 60 to download that application.

Step S15

When app provision server 60 receives a download request from UI 400, it downloads the selected application to sequence manager 100 associated with that user.

Figure 23:
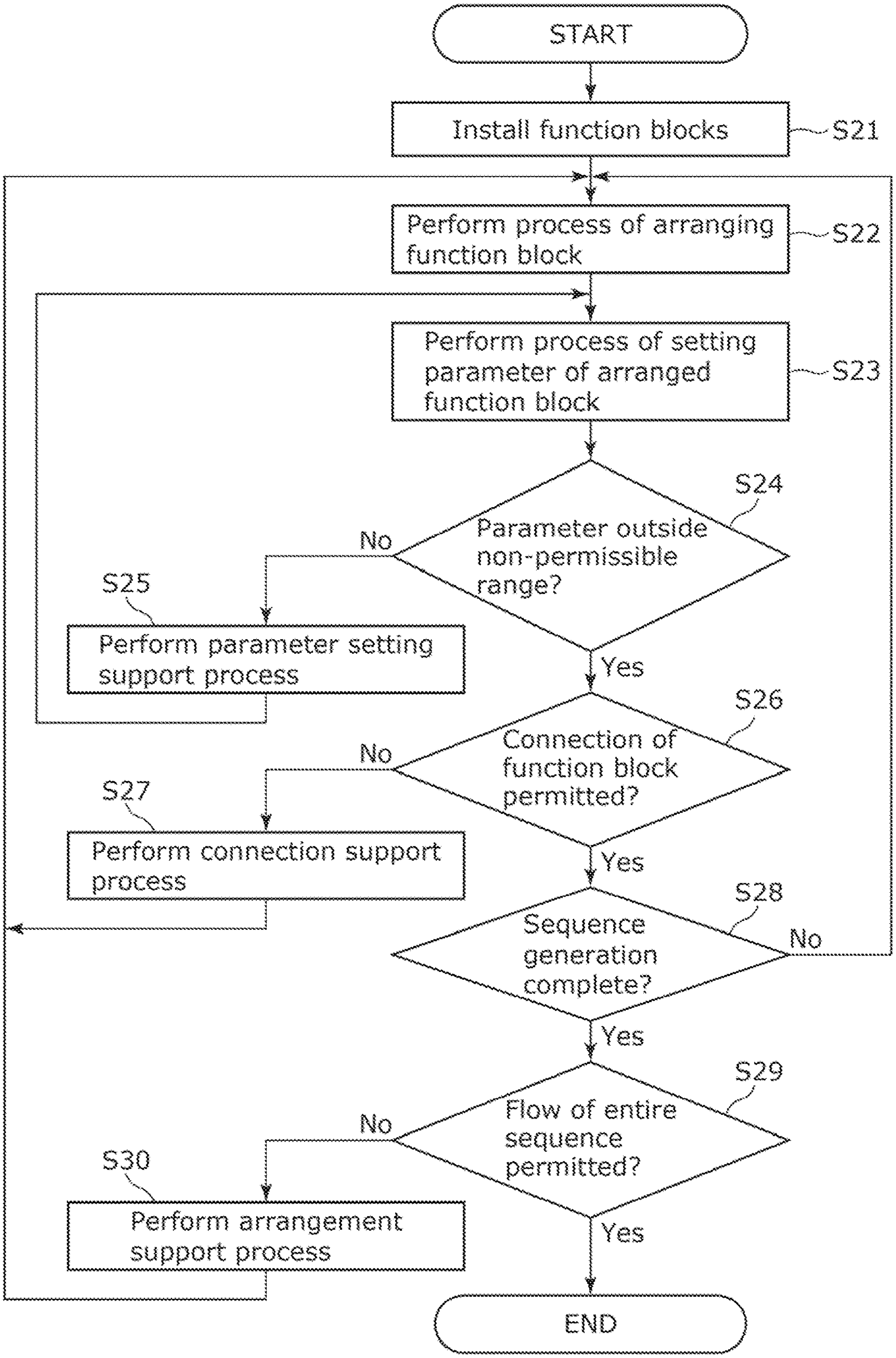
FIG. 23 is a flowchart illustrating the overall processing operations of a development tool according to Embodiment 5.

FIG. 23 is a flowchart illustrating the overall processing operations of development tool 50. More specifically, the flowchart in FIG. 23 illustrates the processing operations of steps S11 and S12 in the sequence in FIG. 22 in greater detail.

Step S21

Development tool 50 first installs a plurality of function blocks to drive apparatus 20, such as a washing machine.

Step S22

Next, development tool 50 performs a process of arranging a function block in accordance with an input operation performed on input unit 54 by the operator. Stated differently, development tool 50 displays on display 53 the plurality of function blocks installed in step S21, and selects one function block from the displayed plurality of function blocks in accordance with an input operation performed on input unit 54 by the operator. Development tool 50 then arranges the function block in the selected block area in the sequence generation screen on display 53 in accordance with the input operation performed on input unit 54 by the operator. The sequence generation screen will be described below with reference to FIG. 26. Simply stated, the operator drags and drops one of the plurality of function blocks into the selected block area.

Step S23

Next, development tool 50 performs a process of setting a parameter of the function block arranged in step S22 in accordance with an input operation performed on input unit 54 by the operator. Stated differently, development tool 50 displays, in the parameter setting area of the sequence generation screen described above, a reception image for accepting the parameter content to be used for that function block. Development tool 50 then accepts the parameter content in accordance with an input operation performed on input unit 54 by the operator, and displays the parameter content in the parameter setting area. This sets a parameter for that function block.

Step S24

Next, development tool 50 consults a parameter rule applicable to apparatus 20, such as a washing machine, and determines whether the parameter set in step S23 is outside the parameter range indicated in that parameter rule, i.e., outside the non-permissible range.

Step S25

If development tool 50 determines in step S24 that the parameter is not outside the non-permissible range (No in step S24), it performs a parameter setting support process. In this parameter setting support process, development tool 50 performs an error presentation process to present an error to the operator or performs an automatic parameter correction process. In the automatic parameter correction process, development tool 50 changes a function block by changing the parameter in a non-permissible range to a parameter in a permissible range. In the error presentation process, development tool 50, for example, displays, on display 53 as an error, a message indicating that the parameter set in the previous step S23 is within the non-permissible range, and prompts the operator to change that parameter. Then, after the process of step S25 is performed, development tool 50 repeats the processes from step S23.

If the processing of step S23 is performed after automatic parameter correction processing is performed in step S25, in step S23, development tool 50 displays the parameter after it has been changed by the automatic parameter correction process in the parameter setting area. On the other hand, if the processing of step S23 is performed after error presentation processing is performed in step S25, in step S23, development tool 50 again accepts the parameter content in accordance with an input operation performed on input unit 54 by the operator, as described above. This changes a parameter for that function block. In other words, this changes the function block.

Step S26

If development tool 50 determines in step S24 that the parameter is outside the non-permissible range (Yes in step S24), it further determines whether the connection of the function block arranged in step S22 is permitted. Stated differently, development tool 50 refers to a rule applicable to apparatus 20, such as a washing machine, and determines whether the order of the function block arranged in step S22 and the order of a function block already arranged correlates with a non-permissible block order indicated in the rule. For example, in step S22, a function block is arranged immediately before or immediately after an existing block, which is another function block already arranged in the selected block area. As a result, a function blocks is arranged connected to an existing block. Stated differently, the function block is arranged so that the process performed by apparatus 20 according to the function block and the process performed apparatus 20 according to the existing block are executed consecutively. In this case, development tool 50 determines whether the connection between that function block and that existing block is permitted by consulting a rule applicable to apparatus 20, such as a washing machine. More specifically, development tool 50 determines that the connection of those blocks is not permitted if the order of that function block and that existing block correlates with a non-permissible block order indicated in the rule. If, however, the order of that function block and that existing block does not correlate with any of the non-permissible block orders shown in the rule, development tool 50 determines that the connection of those blocks is permitted.

Step S27

If development tool 50 determines that the connection is not permitted in step S26 (No in step S26), it performs a connection support process. In this connection support process, development tool 50 performs a connection error presentation process to present an error to the operator or perform an automatic connection correction process. Then, development tool 50 repeats the processes from step S22.

If the processing of step S22 is performed after automatic connection correction processing is performed in step S27, in step S22, development tool 50 displays the two or more function blocks that have been reconnected by the automatic connection correction processing in the selected block area. On the other hand, if the processing of step S22 is performed after error presentation processing is performed in step S27, in step S22, development tool 50 again rearranges the function blocks in accordance with an input operation performed on input unit 54 by the operator, as described above. If the process of step S22 is repeated from step S27, development tool 50 may skip the processes of steps S23 through S25 after step S22 because the parameters of the function block have already been set within the permissible range.

Step S28

When development tool 50 determines that the connection is permitted in step S26 (Yes in step S26), it further determines whether or not the generation of the sequence has completed in accordance with an input operation performed on input unit 54 by the operator. Here, if development tool 50 determines that the generation of the sequence has not completed (No in step S28), processing from step S22 is repeated. At this time, development tool 50 selects a new block from the plurality of blocks installed in step S21 in accordance with an input operation performed on input unit 54 by the operator, and arranges it in the selected block area described above.

Step S29

When development tool 50 determines that the generation of the sequence has completed in step S28 (Yes in step S28), it further determines whether the flow of the entire generated sequence is permitted. For example, assume the second function block is arranged before or after the first function block in the sequence, but a combination rule applicable to apparatus 20, such as a washing machine, does not permit the combination of the first and second function blocks. In such a case, development tool 50 determines that the flow of the entire generated sequence is not permitted. Alternatively, assume a combination rule applicable to apparatus 20, such as a washing machine, requires that the second function block be arranged before or after that first function block. In such a case, development tool 50 determines that the flow of the entire generated sequence is permitted.

Step S30

If development tool 50 determines that the flow of the entire sequence is not permitted in step S29 (No in step S29), it performs an arrangement support process. In this arrangement support process, development tool 50 performs an error presentation process to present an error to the operator or perform an automatic function block arrangement correction process. Then, development tool 50 repeats the processes from step S22.

If the processing of step S22 is performed after automatic connection arrangement processing is performed in step S30, in step S22, development tool 50 displays the two or more function blocks that have been rearranged by the automatic arrangement correction processing in the selected block area. If the process of step S22 is repeated from step S30, development tool 50 may skip the processes of steps S23 through S25 after step S22 because the parameters of the function block have already been set within the permissible range. Development tool 50 may skip also steps S26 and S27 because the connection of the function block is already permitted. Development tool 50 may additionally skip step S28.

Figure 24:
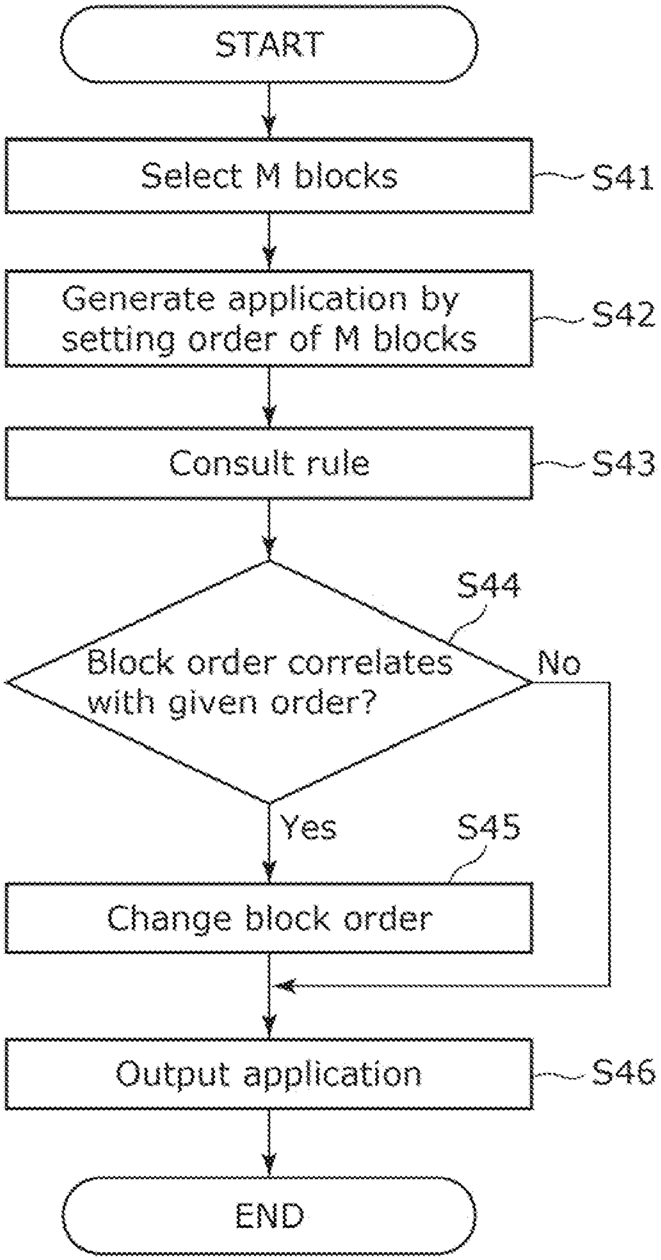
FIG. 24 is a flowchart illustrating an example of an automatic connection correction process according to Embodiment 5.

FIG. 24 is a flowchart illustrating one example of an automatic connection correction process.

In the example illustrated in FIG. 23, each time a single function block is selected and arranged, a decision is made and an automatic correction process is performed for the connection of that function block. However, the present disclosure is not limited to this example; development tool 50 may perform each process according to the flowchart illustrated in FIG. 24.

Step S41

Development tool 50 selects, from among N (N is an integer greater than or equal to 2) function blocks for driving apparatus 20, such as a washing machine, M (M is an integer greater than or equal to 2 and less than or equal to N) function blocks, in accordance with an input operation performed on input unit 54 by the operator. Stated differently, development tool 50 selects each of the M function blocks as a selected block from among the N function blocks for driving at least one of actuator 22 or heater 23 included in apparatus 20, which is the device to be controlled, in accordance with an input operation performed on input unit 54 by the operator.

Step S42

Next, development tool 50 generates the sequence, i.e., the application by arranging the M selected function blocks in order in the selected block area described above. Stated differently, development tool 50 sets the order in which each of the at least M selected blocks is executed in accordance with an input operation performed on input unit 54 by the operator, thereby generating an application that includes at least the M selected blocks and includes information about the order of the blocks. Each of the M selected blocks in this application may include a parameter for driving at least one of actuator 22 or heater 23.

Step S43

Next, if each of the M function blocks is a block for driving a washing machine, development tool 50 refers to a rule that applies to a washing machine. For example, development tool 50 refers to generic rule R400 if the application generated in step S42 applies to a plurality of types of washing machines. If the application generated in step S42 is applicable to a given model of washing machine, development tool 50 consults a rule associated with that model of washing machine among dedicated rules R41 through R43. Stated differently, development tool 50 determines whether the application generated in step S42 is an application dedicated to the device to be controlled or a general-purpose application applicable to the device to be controlled and devices other than the device to be controlled. Development tool 50 then, as the above-described rule, consults a rule candidate that corresponds to the determination result of the application, from among a plurality of rule candidates that prohibit two or more given blocks from being executed in a given order.

Step S44

Next, development tool 50 determines whether the order of the M function blocks set in step S42 correlates with a non-permissible block order indicated in the rule. Stated differently, development tool 50 determines whether the order of the M function blocks included in the application correlates with a given order indicated in the rule.

Step S45

Here, if development tool 50 determines that the order of its M function blocks correlates with a non-permissible block order (Yes in step S44), it changes the order of its M function blocks. Stated differently, development tool 50 consults a rule that prohibits two or more given blocks from being executed in a given order, and if the order information included in the application correlates with the given order, then development tool 50 changes the application by changing the order in which each of the M selected blocks is executed. Changing the order in which each of the M selected blocks is executed means (1) adding a new block between the first and second blocks, (2) removing the first or second block, or (3) changing the order of the first or second block to achieve an order in which the first block comes after the second block or an order in which another block is between the first and second blocks. The method used to change the order may be defined in the rule.

Step S46

Development tool 50 then outputs the modified application.

Figure 25:
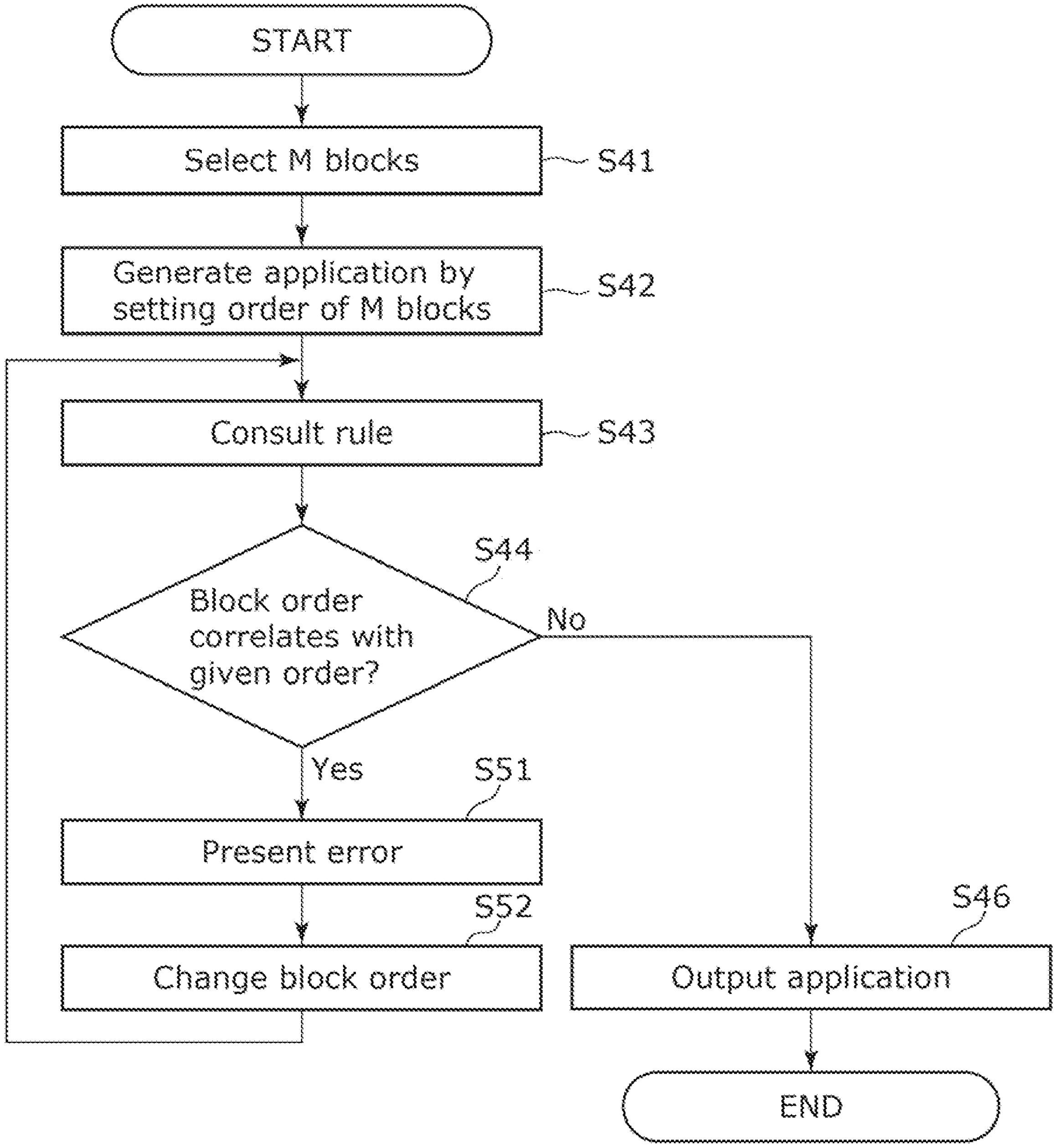
FIG. 25 is a flowchart illustrating an example of a connection error presentation process according to Embodiment 5.

FIG. 25 is a flowchart illustrating one example of a connection error presentation process.

In the example illustrated in FIG. 23, each time a single function block is selected and arranged, a decision is made and an error presentation process is performed for the connection of that function block. However, the present disclosure is not limited to this example; development tool 50 may perform each process according to the flowchart illustrated in FIG. 25.

Steps S41 through S44

Development tool 50 performs steps S41 through S44, just like in the example illustrated in FIG. 24.

Step S51

If, in step S44, development tool 50 determines that the order of its M function blocks correlates with a non-permissible block order (Yes in step S44), it displays an error on display 53 without automatically changing the M function blocks. This presents an error to the operator. Stated differently, in steps S43, S44, and S51, development tool 50 presents errors by consulting a rule. More specifically, development tool 50 consults a rule that prohibits two or more given blocks from being executed in a given order, and presents an error to the operator if the order information included in the application correlates with that given order.

In addition to presenting the error, development tool 50 may also present a plurality of solutions to the operator and prompt the operator to select a solution. In such cases, development tool 50 may present to the operator the differences in output performance for each of the plurality of solutions. In such cases, development tool 50 may also present at least two or more of the following solutions: a first solution of adding a new function block, a second solution of removing a selected block, and a third solution of changing the order of two or more function blocks. This presents the solutions to the operator, who is a developer of the application, for example. As a result, the operator, who is a developer of the application who has seen those solutions can easily change the order set in step S42, based on those solutions, by performing an input operation on input unit 54 of development tool 50.

Step S52

The operator who sees the error changes the order set in step S42 by performing an input operation on input unit 54 of development tool 50. When each of the plurality of solutions is presented to the operator as a choice, the operator selects any of the solutions from among those choices by performing an input operation. As a result, development tool 50 changes the order of the M function blocks. Stated differently, development tool 50 modifies the application by changing the order in which each of the M selected blocks is executed in accordance with an input operation performed by the operator presented with the error. Then, development tool 50 repeats the processes from step S43.

Step S46

If development tool 50 determines in step S44 that the order of the M function blocks does not correlate with a non-permissible block order (No in step S44), the application is output. At this time, if the application has been modified in step S52, the modified application is output. If, however, the application has not been modified in step S52, the application generated in step S42 is output.

When the process of step S51 is repeated, development tool 50 may present a solution for handling the error based on the number of times step S51 has been repeated. For example, if development tool 50 presents an error K or more times (K is an integer greater than or equal to 2), it may present a plurality of solutions for handling the error. Stated differently, if the number of times the error has been presented is K or more, development tool 50 presents at least two solutions to the operator from among the first, second, and third solutions described above.

5.3 Display Example

Figure 26:
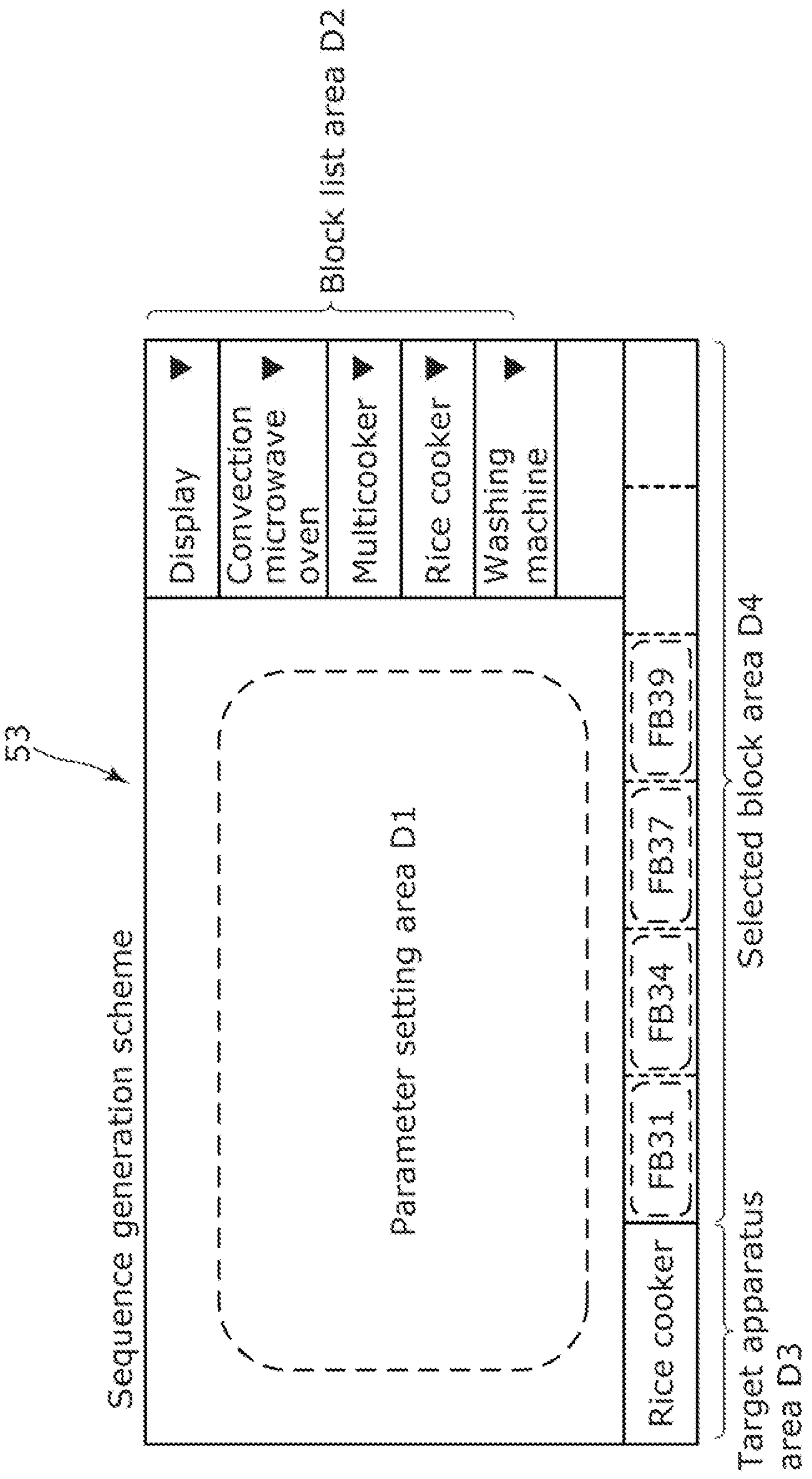
FIG. 26 illustrates one example of a sequence generation screen according to Embodiment 5.

FIG. 26 illustrates one example of a sequence generation screen.

Development tool 50 displays the sequence generation screen described above on display 53. The sequence generation screen includes parameter setting area D1, block list area D2, target apparatus area D3, and selected block area D4.

Parameter setting area D1 displays a reception image for accepting the parameter content to be used for a function block.

Block list area D2 displays a block list for each of a plurality of types of apparatuses 20. These block lists include function blocks that have been downloaded from block database 41 and installed in development tool 50.

Target apparatus area D3 displays the name of the type of apparatus 20 selected from the plurality of types of apparatuses 20.

Function blocks selected from the block lists displayed in block list area D2 are arranged and displayed in selected block area D4. The function blocks are displayed as icons, for example.

For example, the operator determines the name of the type of apparatus 20 to which the application is applicable by performing an input operation on input unit 54 of development tool 50. Development tool 50 displays the determined name of the type of apparatus 20 in target apparatus area D3. For example, "rice cooker" is displayed as the determined name of the type of apparatus 20. The operator then selects a function block for driving apparatus 20 corresponding to the determined type named "rice cooker" from the block list displayed in block list area D2 by performing an input operation. The operator then arranges the selected function block, i.e., the selected block, in selected block area D4 by performing an input operation. The selection and arrangement of this function block may be done by dragging and dropping the function block. The one or more function blocks arranged in selected block area D4 may be executed in the order in which they are arranged. For example, the function blocks are executed in sequence from left to right in FIG. 26. Stated differently, the application includes information on the order in which each of the M selected blocks arranged in selected block area D4 is to be executed and information on the timing at which each of the M selected blocks is to be executed.

When a function block is arranged in selected block area D4, development tool 50 displays a reception image of the parameters to be used for that function block in parameter setting area D1.

Figure 27:
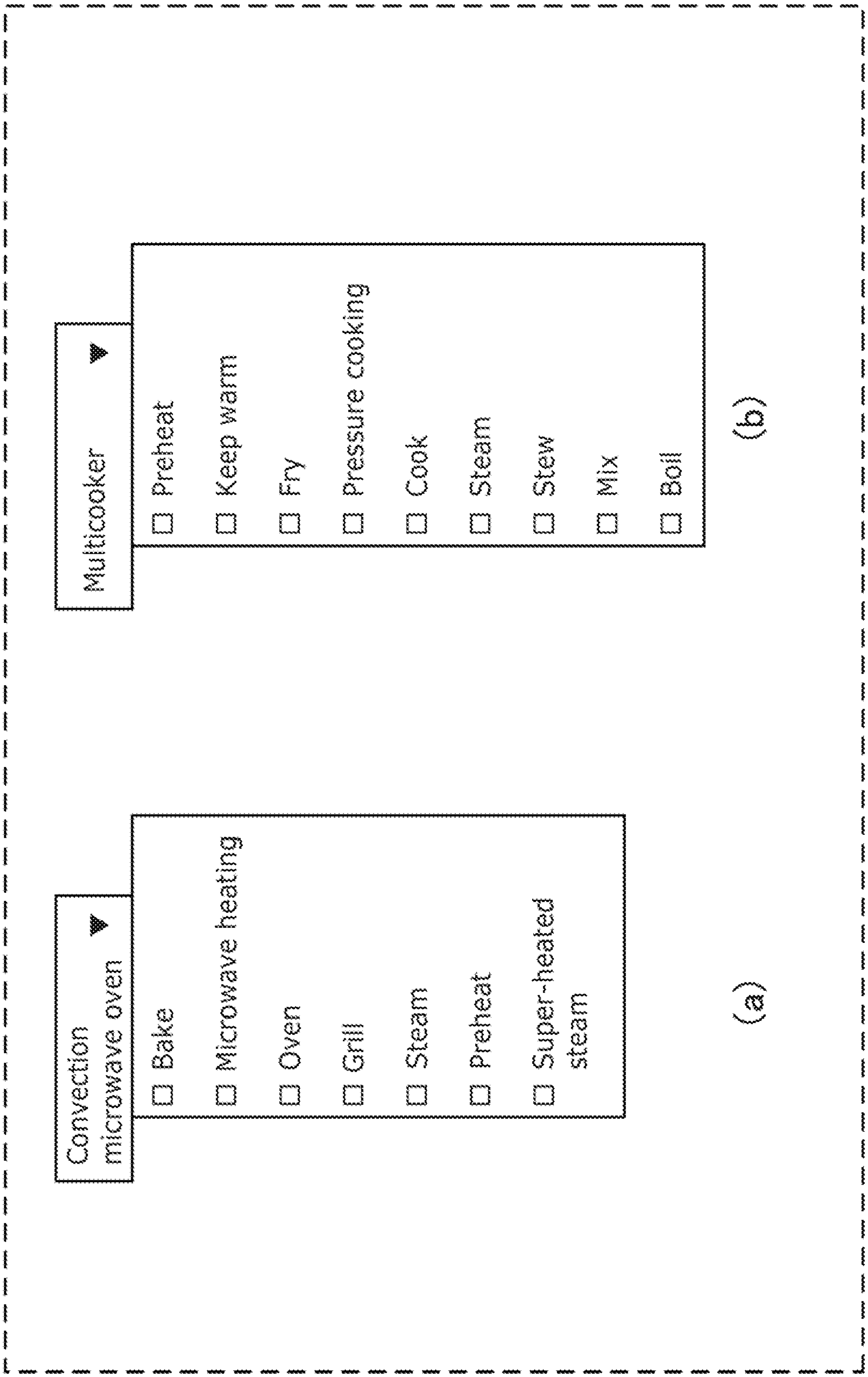
FIG. 27 illustrates examples of how a block list is displayed according to Embodiment 5.

FIG. 27 illustrates examples of how a block list is displayed.

The operator selects the name of the type of apparatus 20 to which the application to be generated is applicable from among the names of the types of apparatuses 20 displayed in block list area D2 illustrated in FIG. 26, by performing an input operation on input unit 54. Development tool 50 displays a block list corresponding to the selected type of name of apparatus 20, as shown, for example, in (a) and (b) in FIG. 27. For example, as illustrated in (a) in FIG. 27, when a convection microwave oven is selected, development tool 50 displays a block list for the convection microwave oven. For example, the block list includes function blocks that perform the respective functions of baking, microwave heating, oven, grilling, steaming, preheating, and super-heated steam. As illustrated in (b) in FIG. 27, when a multicooker is selected, development tool 50 displays a block list for the multicooker. For example, the block list includes function blocks for preheating, keeping warm, frying, pressure cooking, cooking, steaming, stewing, mixing, and boiling, respectively.

The operator selects a function block from the block list displayed in this manner by performing an input operation on input unit 54, and arranges the selected function block in selected block area D4 illustrated in FIG. 26. Stated differently, development tool 50 performs the process of step S22 illustrated in FIG. 23, i.e., the process of arranging the function block, in accordance with such an input operation.

Figure 28:
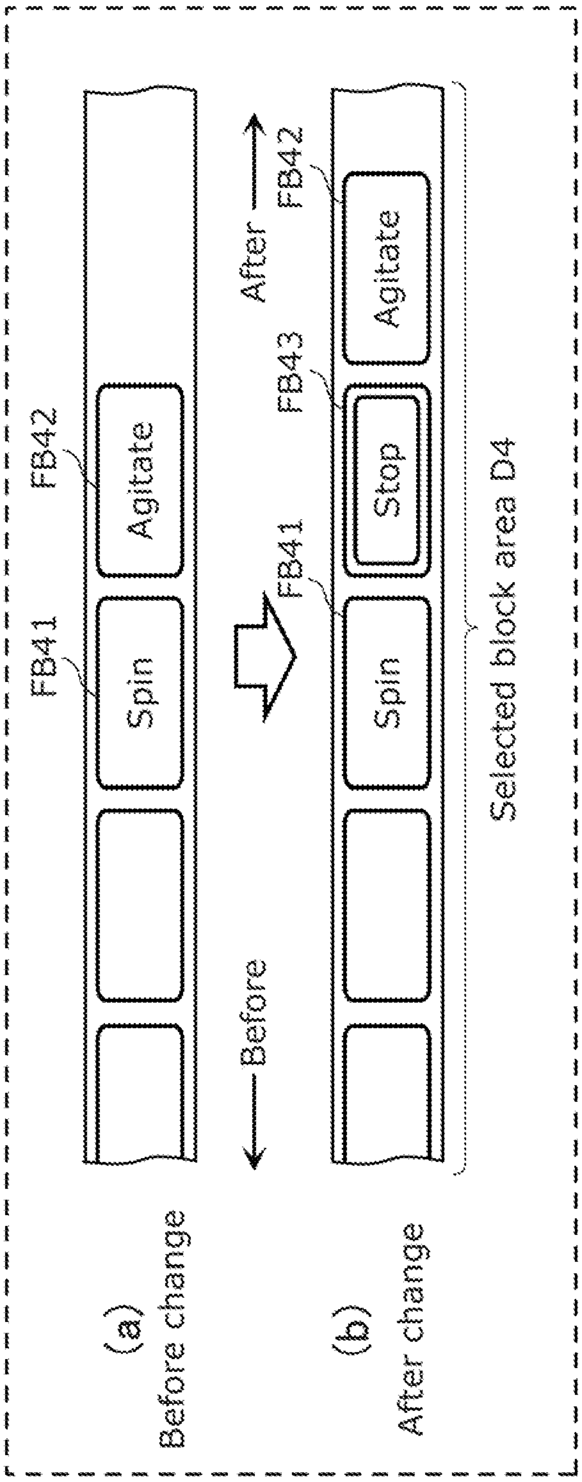
FIG. 28 illustrates one example of the process of arranging a function block and the automatic connection correction process according to Embodiment 5.

FIG. 28 illustrates one example of the process of arranging a function block and the automatic connection correction process.

Development tool 50 displays the function blocks dragged and dropped from the block list and arranged in selected block area D4 as icons, for example, as illustrated in (a) in FIG. 28. More specifically, development tool 50 arranges the "agitate" function block FB42 after the "spin" function block FB41 in accordance with an input operation performed on input unit 54 by the operator. In this way, development tool 50 performs the process of arranging a function block in step S22 illustrated in FIG. 23 in accordance with an input operation performed by the operator.

After the "agitate" function block FB42 is arranged, development tool 50 determines whether the connection between that function block FB42 and the already arranged function block FB41 is permitted, as in step S26 in FIG. 23. Stated differently, development tool 50 uses rules to make decisions regarding the connection of function block FB42. Development tool 50 then performs the automatic connection correction process.

More specifically, development tool 50 first consults a washing machine rule corresponding to function block FB42. For example, development tool 50 identifies rule group 42*d* for washing machines in rule database 42 illustrated in (b) in FIG. 20, and consults any one rule in that rule group 42*d*. That rule may be generic rule R400, dedicated rule R41, etc.

If development tool 50 determines that the order of function blocks FB41 and FB42 correlates with a non-permissible block order indicated in the rule, it changes the order of function blocks FB41 and FB42. For example, development tool 50 changes the order of function blocks FB41 and FB42 by adding "stop" function block FB43 between function blocks FB41 and FB42, as illustrated in (b) in FIG. 28. This modifies the washing machine application.

Thus, in the present embodiment, when the order information included in the application correlates with a given order, development tool 50 changes the order in which each of the M selected blocks is executed by adding a new block between the first block and the second block. For example, in the example in FIG. 28, the first block is function block FB41 and the second block is function block FB42. The new block is function block FB43. Development tool 50 may also change the order in which each of the M selected blocks is executed by changing the order to an order in which another block is between the first and second blocks. The other block mentioned above may be, for example, function block FB43 that has already been arranged in selected block area D4.

Figure 29A:
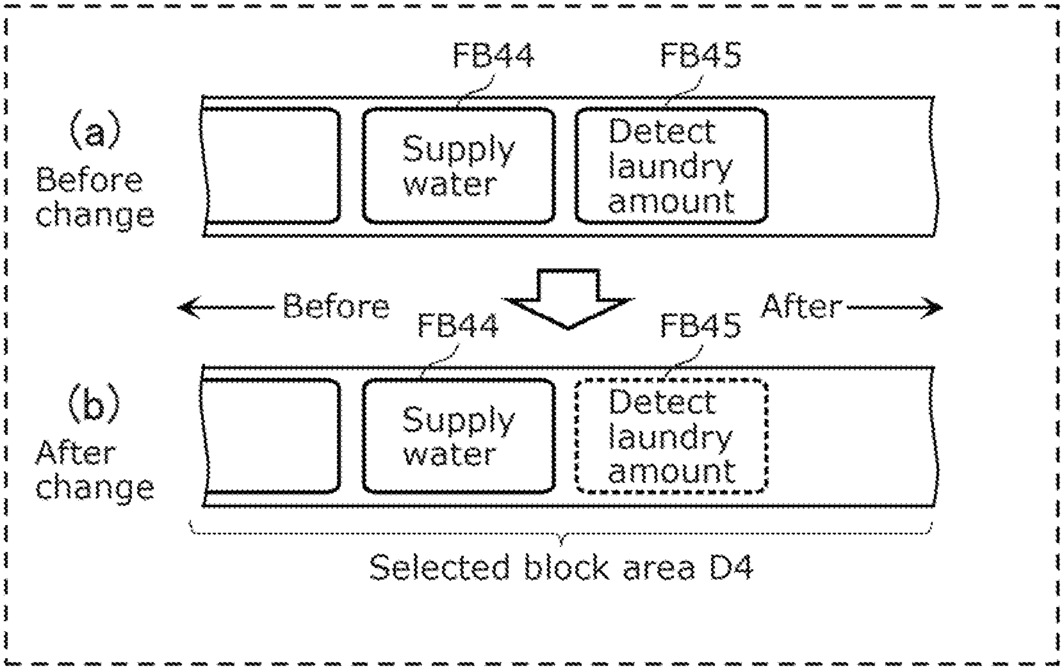
FIG. 29A illustrates another example of the process of arranging a function block and the automatic connection correction process according to Embodiment 5.

FIG. 29A illustrates another example of the process of arranging a function block and the automatic connection correction process.

Development tool 50 displays the function blocks dragged and dropped from the block list and arranged in selected block area D4 as icons, for example, as illustrated in (a) in FIG. 29A. More specifically, development tool 50 arranges the "detect laundry amount" function block FB45 after the "supply water" function block FB44 in accordance with an input operation performed on input unit 54 by the operator. In this way, development tool 50 performs the process of arranging a function block in step S22 illustrated in FIG. 23 in accordance with an input operation performed by the operator.

After the "detect laundry amount" function block FB45 is arranged, development tool 50 determines whether the connection between that function block FB45 and the already arranged function block FB44 is permitted, as in step S26 in FIG. 23. Stated differently, development tool 50 uses rules to make decisions regarding the connection of function block FB45. Development tool 50 then performs the automatic connection correction process.

More specifically, development tool 50 first consults a washing machine rule corresponding to function block FB45. For example, development tool 50 identifies rule group 42*d* for washing machines in rule database 42 illustrated in (b) in FIG. 20, and consults any one rule in that rule group 42*d*. That rule may be generic rule R400, dedicated rule R41, etc.

If development tool 50 determines that the order of function blocks FB44 and FB45 correlates with a non-permissible block order indicated in the rule, it changes the order of function blocks FB44 and FB45. For example, development tool 50 changes the order of function blocks FB44 and FB45 by removing function block FB45, as illustrated in (b) in FIG. 29A.

Thus, in the present embodiment, when the order information included in the application correlates with a given order, development tool 50 changes the order in which each of the M selected blocks is executed by removing the first or second block. For example, in the example in FIG. 29A, the first or second block to be removed is function block FB45.

Figure 29B:
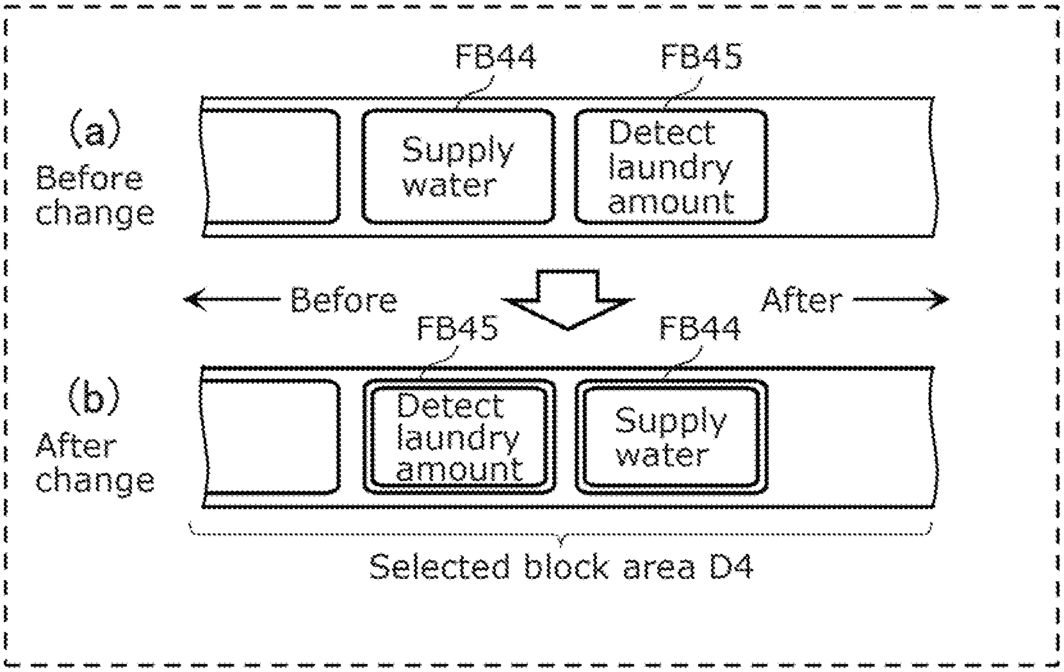
FIG. 29B illustrates yet another example of the process of arranging a function block and the automatic connection correction process according to Embodiment 5.

FIG. 29B illustrates yet another example of the process of arranging a function block and the automatic connection correction process.

As illustrated in (a) in FIG. 29B, development tool 50 arranges the "detect laundry amount" function block FB45 after the "supply water" function block FB44, just as in the example illustrated in (a) in FIG. 29A.

After the "detect laundry amount" function block FB45 is arranged, development tool 50 determines whether the connection between that function block FB45 and the already arranged function block FB44 is permitted. In other words, development tool 50 determines whether the order of function blocks FB44 and FB45 correlates with a non-permissible block order indicated in the rule. If development tool 50 consequently determines that the order of function blocks FB44 and FB45 correlates with a non-permissible block order indicated in the rule, it changes the order of function blocks FB44 and FB45. For example, development tool 50 changes the order of function blocks FB44 and FB45 by swapping the order of function blocks FB44 and FB45, as illustrated in (b) in FIG. 29B.

Thus, in the present embodiment, when the order information included in the application correlates with a given order, development tool 50 changes the order in which each of the M selected blocks is executed by changing the order of the first or second block to achieve an order in which the first block comes after the second block. For example, in the example in FIG. 29B, the first block is function block FB44 and the second block is function block FB45.

As in FIG. 28 through FIG. 29B, in the present embodiment, the automatic connection correction process is performed. Therefore, if the operator, i.e., a developer of the application incorrectly arranges the order of the M function blocks in a non-permissible block order, the order will be automatically rearranged in a different order than the non-permissible block order. This can ensure safe operation of the washing machine.

Figure 30:
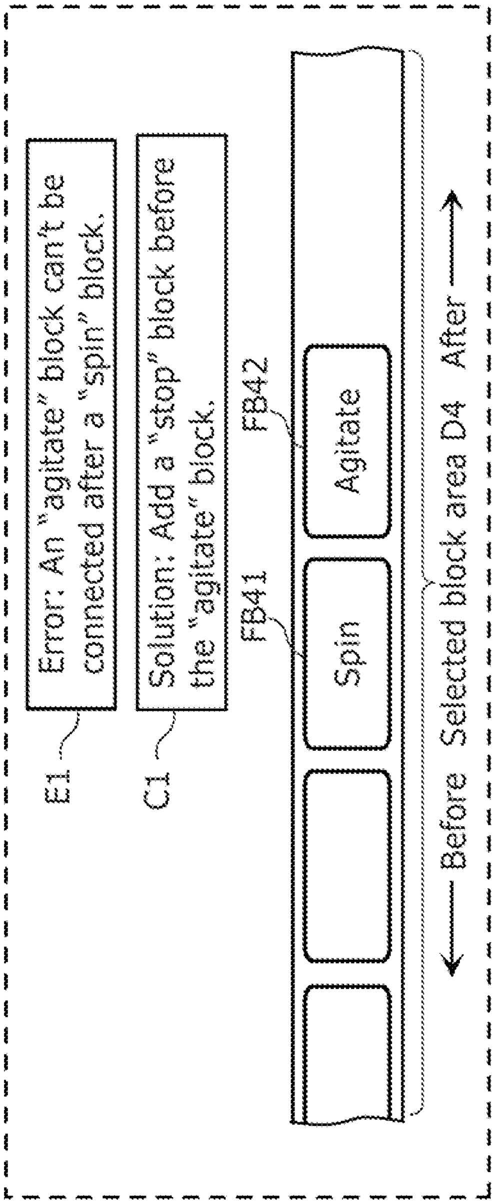
FIG. 30 illustrates one example of the connection error presentation process according to Embodiment 5.

FIG. 30 illustrates one example of a connection error presentation process.

As illustrated in FIG. 30, development tool 50 arranges the "agitate" function block FB42 after the "spin" function block FB41, just as with the example in FIG. 28. After the "agitate" function block FB42 is arranged, development tool 50 determines whether the connection between that function block FB42 and the already arranged function block FB41 is permitted. In other words, development tool 50 determines whether the order of function blocks FB41 and FB42 correlates with a non-permissible block order indicated in the rule. If development tool 50 consequently determines that the order of function blocks FB41 and FB42 correlates with a non-permissible block order indicated in the rule, it performs an error presentation process. More specifically, development tool 50 displays error message E1 as an error, as illustrated in FIG. 30. This error message E1 states that the "spin" function block cannot be connected after the "agitate" function block. Such an error presentation process is performed, for example, in step S51 in FIG. 25.

In the present embodiment, development tool 50 consults a rule that prohibits two or more given blocks from being executed in a given order, and presents an error to the operator if the order information included in the application correlates with that given order. Development tool 50 modifies the application by changing the order in which each of the M selected blocks is executed in accordance with an input operation performed by the operator presented with the error.

By presenting such an error, the operator, i.e., a developer of the application can easily rearrange the M function blocks that were arranged in the non-permissible block order into a different order than the non-permissible block order. This can ensure safe operation of the washing machine.

In the error presentation process, development tool 50 may further display a solution for handling the error indicated by error message E1. For example, development tool 50 displays solution C1, as illustrated in FIG. 30. This solution C1 states that the error can be resolved by adding a "stop" function block before the "agitate" function block.

By presenting such a solution, the operator, i.e., a developer of the application can more easily rearrange the M function blocks that were arranged in the non-permissible block order into a different order than the non-permissible block order. This can ensure safe operation of the washing machine.

Figure 31:
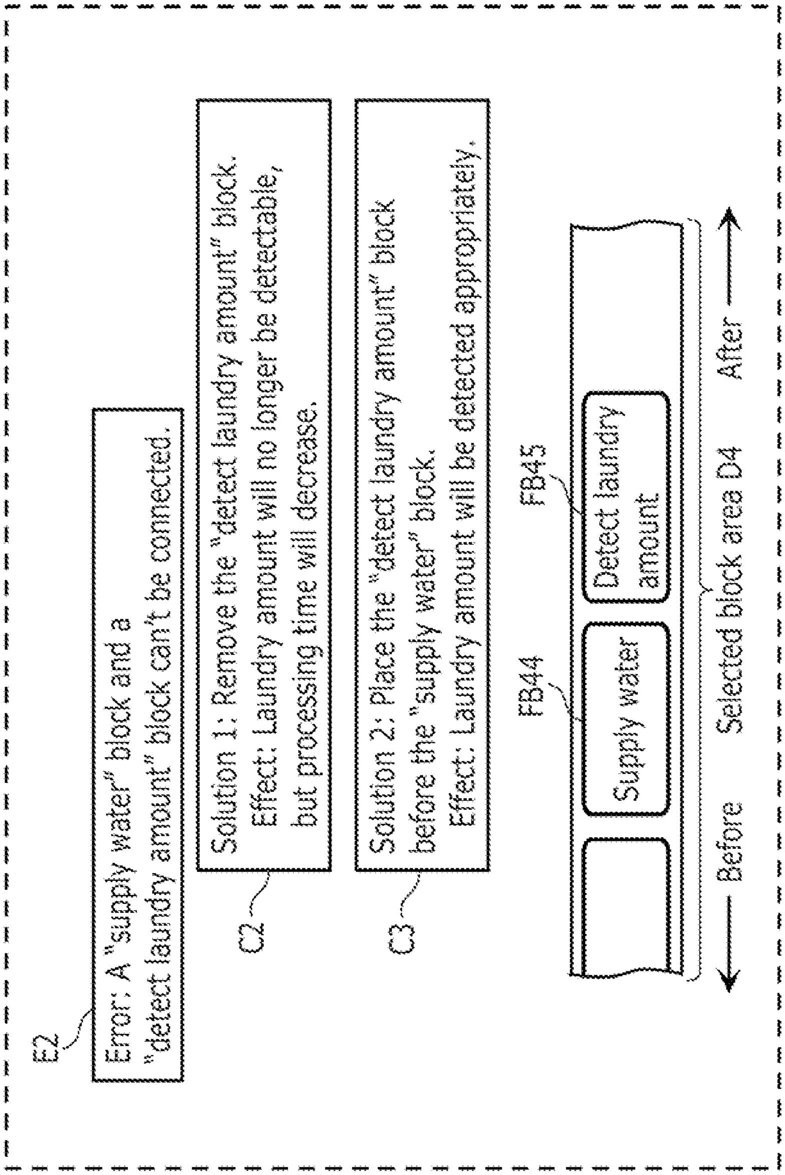
FIG. 31 illustrates another example of the connection error presentation process according to Embodiment 5.

FIG. 31 illustrates another example of a connection error presentation process.

As illustrated in FIG. 31, development tool 50 arranges the "detect laundry amount" function block FB45 after the "supply water" function block FB44, just as in the example illustrated in FIG. 29A or FIG. 29B. If development tool 50 determines that the order of function blocks FB44 and FB45 correlates with a non-permissible block order indicated in the rule, it performs an error presentation process. More specifically, development tool 50 displays error message E2 as an error, as illustrated in FIG. 31. This error message E2 states that the "detect laundry amount" function block cannot be connected after the "supply water" function block.

By presenting such an error, the operator, i.e., a developer of the application can easily rearrange the M function blocks that were arranged in the non-permissible block order into a different order than the non-permissible block order. This can ensure safe operation of the washing machine.

In the error presentation process, development tool 50 may further display a plurality of solutions for handling the error indicated by error message E2. For example, development tool 50 displays solutions C2 and C3, as illustrated in FIG. 31. Solution C2 states that the error can be resolved by removing the "detect laundry amount" function block. Development tool 50 may further display the effect of implementing solution C2 along with the display of solution C2. For example, development tool 50 may display, as the effect of implementing solution C2, that although the laundry amount will no longer be detectable, the processing time for the entire washing process will be reduced by the amount of time saved by omitting the detect laundry amount process. Solution C3 states that the error can be resolved by arranging the "detect laundry amount" function block before the "supply water" function block. Development tool 50 may further display the effect of implementing solution C3 along with the display of solution C3, just like described above. For example, development tool 50 may display, as the effect of implementing solution C3, that the detection of the laundry amount will be performed appropriately.

Thus, in the present embodiment, development tool 50 presents a plurality of solutions to handle errors. Development tool 50 modifies the application by changing the order in which each of the M selected blocks is executed in accordance with an input operation performed by the operator presented with the error and the plurality of solutions.

For example, the plurality of solutions include at least two of the first, second, and third solutions listed below. As described above, the rule prohibits two or more given blocks from being executed in a given order. For example, the two or more given blocks include a first block and a second block, and the given order indicates that the second block comes after the first block. In such a case, the above-described first solution is to add a new block between the first and second blocks. More specifically, as illustrated in FIG. 28, the first solution is to add a new "stop" function block FB43 between the "spin" function block FB41 and the "agitate" function block FB42. The above-described second solution is to remove the first or second block. More specifically, as illustrated in FIG. 29A, the second solution is to remove the "supply water" function block FB44 or the "detect laundry amount" function block FB45. The above-described third solution is to change the order of the blocks to achieve an order in which the first block comes after the second block or an order in which another block is between the first and second blocks. More specifically, as illustrated in FIG. 29B, the third solution is to change the order in which the "detect laundry amount" function block FB45 comes after the "supply water" function block FB44 to achieve an order in which the "supply water" function block FB44 comes after the "detect laundry amount" function block FB45. Alternatively, as illustrated in FIG. 28, the third solution is to change the order in which the "agitate"

function block FB42 comes after the "spin" function block FB41 to achieve an order in which the "stop" function block FB43 is between the "spin" function block FB41 and the "agitate" function block FB42.

In the present embodiment, development tool 50 further presents, for each of the plurality of solutions, the effect of the solution, when performed, on the object acted upon by the driving of actuator 22 or heater 23, or the effect of the solution, when performed, on the application.

By presenting a plurality of solutions and the effects of the solutions, the operator, i.e., a developer of the application can more easily rearrange the M function blocks that were arranged in a non-permissible block order into a different order than the non-permissible block order. This can ensure safe operation of the washing machine.

Error messages E1 and E2 and solutions C1 through C3 may be displayed in any area of the sequence generation screen. Moreover, error messages E1 and E2 and solutions C1 through C3 may be shown respectively in association with a non-permissible block order in the rule. In the above example, error messages E1 and E2 and solutions C1 through C3 are displayed, but how they are presented is not limited to these examples; error messages E1 and E2 and solutions C1 through C3 may be presented in any manner. For example, the error or other information may be presented audibly.

If development tool 50 presents an error K or more times (K is an integer greater than or equal to 2), it may present a plurality of solutions to the operator for handling the error. Stated differently, if the process of step S51 illustrated in FIG. 25 is repeated, development tool 50 may change how the error is presented according to the number of times step S51 has been repeated. More specifically, if the number of times an error is presented is less than K times, development tool 50 presents the error and does not present a solution, and if the number of times the error is presented is K or more, a solution is also displayed with the error.

Figure 32:
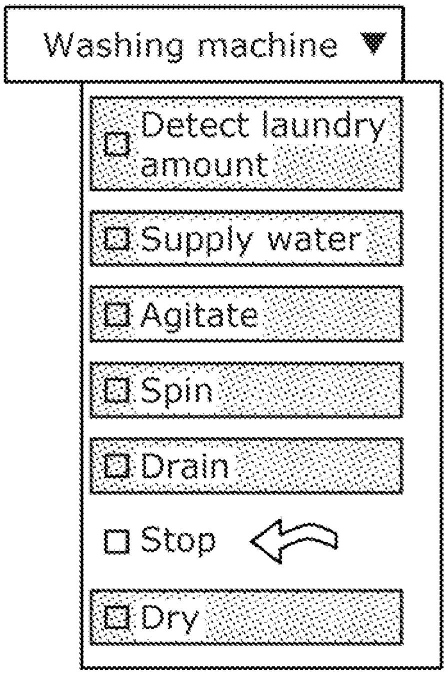
FIG. 32 illustrates another presentation example of a solution according to Embodiment 5.

FIG. 32 illustrates another presentation example of a solution.

In the example above, the solution is presented as a message, but development tool 50 may present the solution in other ways, as illustrated in FIG. 32. For example, development tool 50 presents the solution in such a way that the function block that should be added to avoid the error can be easily selected from the block list. Stated differently, if development tool 50 determines that the connection of the function block that was selected immediately before and arranged in selected block area D4 is not permitted, it displays the block list as illustrated in FIG. 32. In this block list, only the function block that should be added immediately before the function block for which the connection is determined to be not permitted is displayed in a different manner from the other function blocks in that block list. More specifically, in the block list for the washing machine, only the "stop" function block that should be added immediately before is shown brightly, while the other function blocks are shaded. This makes it easier for the operator, i.e., a developer of the application to select the "stop" function block and add it to selected block area D4, enhancing the operability of modifying the application.

Figure 33:
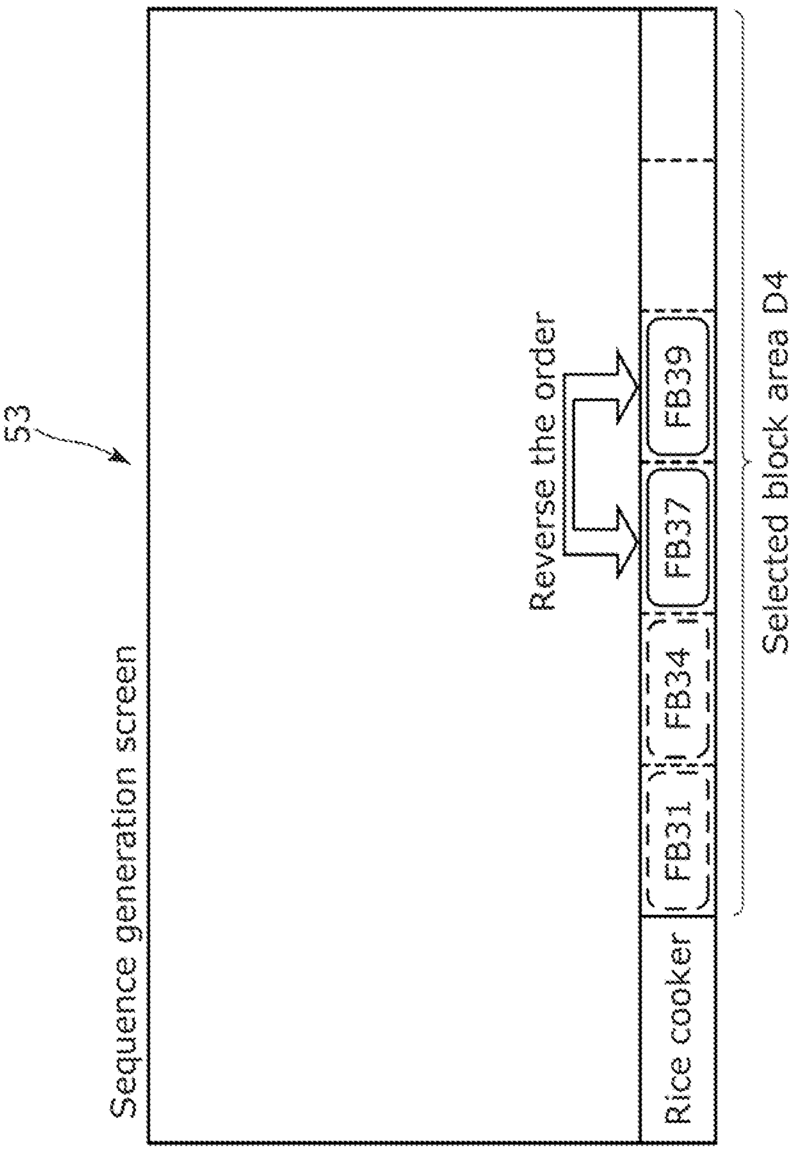
FIG. 33 illustrates yet another presentation example of a solution according to Embodiment 5.

FIG. 33 illustrates yet another presentation example of a solution.

In the example above, the solution is presented only via a message, but development tool 50 may present the solution using an object such as an arrow, as illustrated in FIG. 33. For example, if development tool 50 determines that the order of function blocks FB37 and FB39 correlates with a non-permissible block order, it will present a solution of reversing the order of those function blocks in the form of a message and arrows. This makes it easier for the operator, i.e., a developer of the application to avoid an error by reversing the order of the function blocks, enhancing the operability of modifying the application.

In the present embodiment, the order in which the M function blocks included in the application are executed is explained using the order of two function blocks that are executed consecutively as an example, but the present disclosure is not limited to this example; the order may be of two or more function blocks that are executed inconsecutively.

5.4 Advantageous Effects, Etc.

As described above, the present embodiment can provide an environment in which a wide variety of safe applications can be developed, by using an application including blocks, and a rule database. Thus, for applications freely developed in that environment, actuator 22, which physically moves, or heater 23, which outputs thermal energy, can be safely driven. As a result, for example, the development of a wide variety of applications with a high degree of freedom and the development of a rule database to ensure safety can be created in parallel, enabling the early development of a wide variety of safe applications.

If the present embodiment and any one of Embodiments 1 through 4 are combined, even after the application is provided, the rule database can be modified to make the application more secure. In addition, even if a manufacturer needs to improve a situation that was not anticipated beforehand, the rule database is defined independently from the applications, so all applications can be supported by updating the rule database, without having to change a wide variety of applications themselves.

More specifically, the information processing method according to the present embodiment is an information processing method executed by a computer system such as development tool 50. The information processing method includes: (a) selecting M blocks as M selected blocks from among N blocks for driving at least one of actuator 22 or heater 23 included in apparatus 20, which is a device to be controlled, in accordance with an input operation performed by an operator, where N is an integer greater than or equal to two, and M is an integer greater than or equal to two and less than or equal to N; (b) generating an application including at least the M selected blocks and including information on an order in which each of the at least M selected blocks is executed, by setting the order in accordance with an input operation performed by the operator; (c) consulting a rule that prohibits two or more given blocks from being executed in a given order, and when the information on the order correlates with the given order, modifying the application by changing the order in which each of the M selected blocks is executed; and (d) outputting the modified application.

This allows actuator 22 and/or heater 23 to be driven based on an application defined by M blocks. It is therefore possible to develop applications using blocks that abstract the control of apparatus 20, allowing a wide variety of applications to be developed not only by the manufacturer but also by third parties, and these applications can be easily executed on apparatus 20. Furthermore, during the development, if an application includes two or more given blocks that are executed in a prohibited order, the application is modified by automatically changing the order of the M selected blocks. As a result, the application can be automatically modified to an application that does not include two or more given blocks that are executed in a prohibited order. Accordingly, it is possible to prohibit the two or more given blocks from being executed in the given order. Stated differently, if the operator, i.e., a developer of the application incorrectly sets the order in which each of the M selected blocks is executed to a prohibited order, it is still possible to inhibit the generation of an application that cannot safely control apparatus 20. Thus, the application developer can ensure and improve the safety of apparatus 20 controlled by the application, even if the application is created or generated with an emphasis on suitability for the user of actuator 22 and/or heater 23.

The two or more given blocks may include a first block and a second block, the given order may indicate that the second block comes after the first block, and in (c), when the information on the order correlates with the given order, the order in which each of the M selected blocks is executed may be changed by adding a new block between the first block and the second block. More specifically, the given order may indicate that the second block comes immediately after the first block. Each of the M selected blocks may include a parameter for driving at least one of actuator 22 or heater 23.

The two or more given blocks may include a first block and a second block, the given order may indicate that the second block comes after the first block, and in (c), when the information on the order correlates with the given order, the order in which each of the M selected blocks is executed may be changed by removing the first block or the second block.

The two or more given blocks may include a first block and a second block, the given order may indicate that the second block comes after the first block, and in (c), when the information on the order correlates with the given order, the order in which each of the M selected blocks is executed may be changed by changing an order of the first block or the second block to achieve an order in which the first block comes after the second block or an order in which another block is between the first block and the second block.

With these, during development of the application, a new block can be added, the first or second block can be removed, or the order of the first or second block can be changed to prevent the second block from being executed after the first block. Accordingly, a developer of the application or a developer of the software that is incorporated in apparatus 20 that controls actuator 22 and heater 23 can prevent the execution of a plurality of blocks in an unacceptable order without having to check the safety of each and every application every time.

The first rule may prohibit the at least one of actuator 22 or heater 23 from reaching a maximum withstand temperature as a result of the two or more given blocks being executed in the given order.

This makes it possible to inhibit actuator 22 and/or heater 23 from reaching its maximum withstand temperature when the application is executed, which makes it possible to improve the safety of apparatus 20 controlled by the application.

Apparatus 20, which is the device to be controlled, may include enclosure 21 including an interior space, and the rule may prohibit the interior space from reaching a maximum withstand temperature as a result of the two or more given blocks being executed in the given order.

This makes it possible to inhibit the interior space of enclosure 21 from reaching its maximum withstand temperature when the application is executed, which makes it possible to improve the safety of apparatus 20 controlled by the application.

Step (c) may include: determining whether the application generated is an application dedicated to the device to be controlled or a general-purpose application applicable to the device to be controlled and a device other than the device to be controlled; and consulting, as the rule, a rule candidate that corresponds to a result of the determining of the application, from among a plurality of rule candidates that prohibit two or more given blocks from being executed in a given order.

This allows for more variation in applications, such as dedicated and general-purpose applications. Furthermore, since rules appropriate for those variations are consulted, in each of those variations, the application can be modified appropriately.

The information processing method according to the present embodiment may be an information processing method executed by a computer system such as development tool 50, and may present an error. The information processing method includes: (a) selecting M blocks as M selected blocks from among N blocks for driving at least one of actuator 22 or heater 23 included in apparatus 20, which is a device to be controlled, in accordance with an input operation performed by an operator, where N is an integer greater than or equal to two, and M is an integer greater than or equal to two and less than or equal to N; (b) generating an application including at least the M selected blocks and including information on an order in which each of the at least M selected blocks is executed, by setting the order in accordance with an input operation performed by the operator; (c) consulting a rule that prohibits two or more given blocks from being executed in a given order, and when the information on the order correlates with the given order, presenting an error to the operator; (d) modifying the application by changing the order in which each of the M selected blocks is executed, in accordance with an input operation performed by the operator presented with the error; and (e) outputting the application modified.

With this, if the operator, i.e., a developer of the application incorrectly sets the order in which each of the M selected blocks is executed to an order that is not permitted, an error is presented, thereby inhibiting the generation of an application that cannot safely control apparatus 20. Stated differently, the same advantageous effect can be achieved as when the application is automatically changed as described above.

Step (c) may further include presenting a plurality of solutions for handling the error, and in (d), the application may be modified by changing the order in which each of the M selected blocks is executed, in accordance with an input operation performed by the operator presented with the error and the plurality of solutions. Stated differently, the information processing method according to the present embodiment may be an information processing method executed by a computer system such as development tool 50, and may present a plurality of solutions at the same time as presenting the error.

This reduces the time and effort required for the operator who has seen the presentation of the error to change the order in which each of the M selected blocks is executed.

The two or more given blocks include a first block and a second block, and the given order indicates that the second block comes after the first block. In such cases, the plurality of solutions may include at least two of the following: a first solution of adding a new block between the first block and the second block; a second solution of removing the first block or the second block; and a third solution of changing an order of the first block or the second block to achieve an order in which the first block comes after the second block or an order in which another block is between the first block and the second block.

This allows the operator to change the order in which each of the M selected blocks is executed, while appropriately avoiding errors, according to any one of a plurality of solutions. In addition, when the operator selects a solution, the operator can select an option (i.e., a solution) that satisfies their intention of creating the application.

Step (c) may further include presenting, for each of the plurality of solutions, the effect of the solution, when performed, on the object acted upon by the driving of actuator 22 or heater 23, or the effect of the solution, when performed, on the application. Stated differently, the information processing method according to the present embodiment may be an information processing method executed by a computer system such as development tool 50, and may present a solution for handling the error and simultaneously present an effect that implementing the solution has on the application.

This allows the operator to intuitively select a solution in accordance with their intention of creating the application.

In the information processing method, after (d), execution of (c) and (d) may be repeated. The information processing method may further include (f) presenting a plurality of solutions for handling the error to the operator when the error has been presented K or more times, where K is an integer greater than or equal to two.

With this, since a plurality of solutions are presented if an error is repeatedly presented, the operator can easily change the order in which each of the M selected blocks is executed according to the solutions, making it easier to generate a safe application.

Embodiment 6

In Embodiments 1 through 4, one or more parameters of a block included in an application that has already been delivered are changed before the application is executed. In Embodiment 5, one or more blocks included in an application are changed before the application is delivered, i.e., in the development or production stage of the application. In the present embodiment, however, one or more blocks included in an application that has already been delivered are changed when the application is executed. Note that the above-mentioned block is a function block. Hereinafter, the present embodiment will be described in detail with a focus on the points of difference from Embodiments 1 through 5. Elements in the present embodiment that are the same as those in Embodiments 1 through 5 are given the same reference signs as in Embodiments 1 through 5, and repeated detailed description thereof will be omitted.

6.1 Configuration

Figure 34:
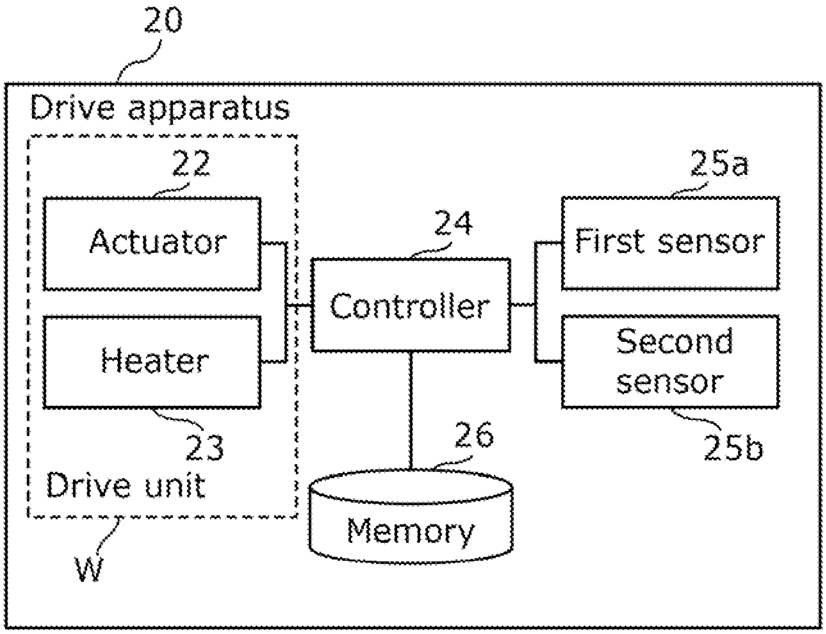
FIG. 34 is a block diagram illustrating one example of an apparatus according to Embodiment 6.

FIG. 34 is a block diagram illustrating one example of apparatus 20 according to Embodiment 6.

Apparatus 20 according to the present embodiment is one example of a drive apparatus, and includes controller 24, drive unit W, first sensor 25*a*, second sensor 25*b*, and memory 26.

Drive unit W includes actuator 22 and heater 23. In the example illustrated in FIG. 34, drive unit W includes both actuator 22 and heater 23, but drive unit W may include at least one of actuator 22 or heater 23.

Controller 24 obtains an application that includes a plurality of function blocks and stores the obtained application in memory 26. For example, controller 24 obtains the application from sequence manager 100 or device manager 200, as in Embodiment 1 through 4. Controller 24 further executes the application to control drive unit W according to the plurality of function blocks of the application. In the present embodiment, each of the plurality of function blocks includes an end condition for ending the driving of drive unit W by the function block. These function blocks are the "blocks" in Embodiments 1 through 5.

Memory 26 is a recording medium for storing, for example, applications, and is, specifically, Random Access Memory (RAM), Read Only Memory (ROM), or semiconductor memory. Such memory 26 may be volatile or non-volatile.

First sensor 25*a* detects a first driving state of drive unit W. For example, first sensor 25*a* is a timer. Stated differently, when drive unit W is being driven in accordance with a first function block among the plurality of function blocks, first sensor 25*a* detects, as the first driving state, the duration spent driving drive unit W in accordance with the first function block. For example, first sensor 25*a* is a measuring instrument such as a scale or flow meter. When drive unit W is being driven in accordance with a first function block among the plurality of function blocks, first sensor 25*a* detects, as the first driving state, an amount of a substance (for example, detergent) moved from one location (for example, the detergent holding tank) to another location (for example, the wash tank) by drive unit W being driven in accordance with the first function block.

Second sensor 25*b* detects a second driving state of drive unit W. For example, second sensor 25*b* detects, as the second driving state, the temperature, the rotation speed, the number of boilovers, the water level, or the electrical conductivity resulting from the driving of drive unit W.

Here, if a predetermined condition is met during execution of the application, controller 24 according to the present embodiment inserts a function block not included in the original application. Drive unit W is then controlled in accordance with the unexecuted function blocks in the application, including the inserted function block. A predetermined condition being met refers to when, during execution of a first function block among the plurality of function blocks, the first driving state detected by first sensor 25*a* meets the end condition of the first function block, and the second driving state detected by second sensor 25*b* meets a block insertion condition. In such cases, controller 24 inserts a new function block so that the order of execution (sequence) of one or more subsequent function blocks to be consecutively executed after the first function block among the plurality of function blocks is a given order.

The given order is, for example, an order in which the inserted new function block is executed before a specific function block, which is a subsequent block, among a plurality of subsequent function blocks, that does not allow the driving of drive unit W in a situation in which the second driving state meets the block insertion condition. Accordingly, when there are a plurality of subsequent function blocks and there is a subsequent function block before the specific function block, a new function block is inserted at least one of before or after the subsequent function block that is before the specific function block. When a plurality of new function blocks are to be inserted, each new function block may be inserted in a different position. The specific function block described above may be referred to as a specific block, a second function block, or simply a second block.

In an application where the first function block and the second function block are contiguous, the new function block is inserted in the position immediately after the first function block and immediately before the second function block. After the end of the first block, controller 24 controls drive unit W in accordance with one or more subsequent blocks and new blocks, including the new function block inserted as described above, in a given order.

In this way, in the present embodiment, when the driving of drive unit W in accordance with the first function block ends, if the second driving state meets the block insertion condition, a new function block is inserted after the first function block and before the second function block. For example, in cases in which it may be hazardous to drive drive unit W in accordance with the second function block in the second driving state of drive unit W, a new function block that could improve the driving state can be automatically inserted. Since this second driving state varies depending on how the user uses apparatus 20, it may be difficult to, during application development, configure settings so that such drive states do not arise.

However, in the present embodiment, during execution of an application, the second driving state is detected, and a new function block is inserted according to the second driving state, and thus the occurrence of hazards can be adequately inhibited. As a result, even when a wide variety of applications are obtained and drive unit W is controlled in accordance with those applications, the safety of apparatus 20 controlled by those applications can be ensured and their safety can be improved.

6.2 Processes

Figure 35:
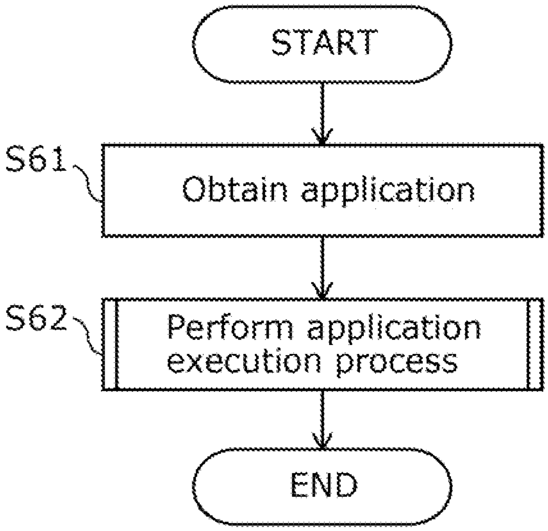
FIG. 35 is a flowchart illustrating one example of processing operations of the apparatus according to Embodiment 6.

FIG. 35 is a flowchart illustrating one example of processing operations of apparatus 20 according to the present embodiment.

Step S61

First, controller 24 of apparatus 20 obtains an application.

Step S62

Next, controller 24 of apparatus 20 performs an application execution process. Stated differently, controller 24 executes each function block included in the obtained application.

Figure 36:
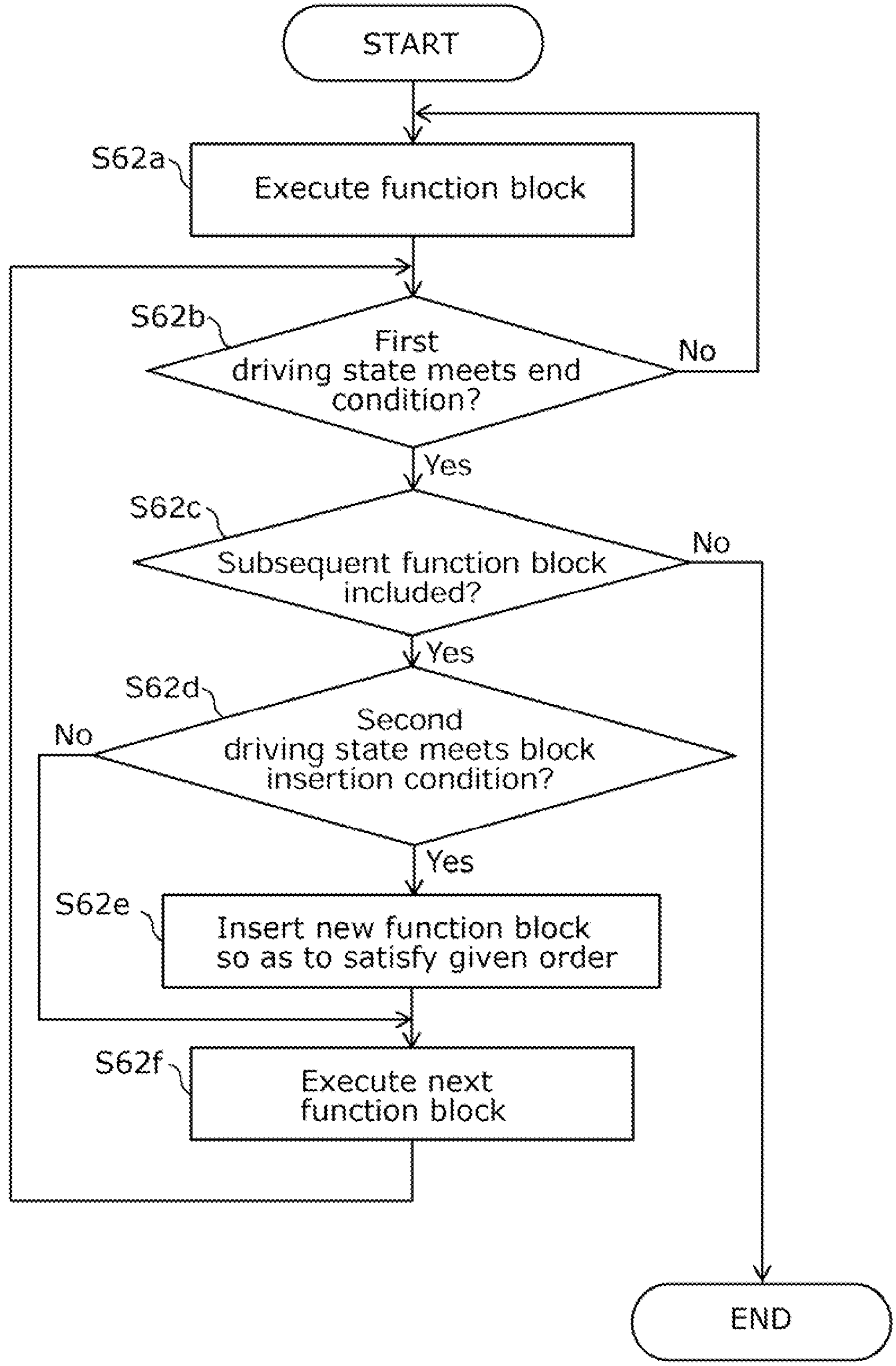
FIG. 36 is a flowchart illustrating one example of an application execution process performed by the apparatus according to Embodiment 6.

FIG. 36 is a flowchart illustrating one example of an application execution process performed by apparatus 20 according to the present embodiment.

Step S62*a*

First, controller 24 executes a function block included in the application to control drive unit W in accordance with the function block. In other words, control 24 drives drive unit W.

Step S62*b*

Next, controller 24 obtains the first driving state detected by first sensor 25*a* and determines whether the first driving state meets the end condition of the function block executed in step S62. If controller 24 determines that the first driving state does not meet the end condition (No in step S62*b*), it continues with the process of step S62*a*.

Step S62*c*

If controller 24 determines that the first driving state meets the end condition (Yes in step S62*b*), it determines whether the application includes a subsequent function block that follows the function block executed in step S62. If controller 24 determines that the application does not include a subsequent function block (No in step S62*c*), it ends the application execution process.

Step S62*d*

If controller 24 determines that the application does include a subsequent function block (Yes in step S62*c*), it obtains a second driving state detected by second sensor 25*b*. Controller 24 then determines whether or not the second driving state meets the block insertion condition. If controller 24 determines that the second driving state does not meet the block insertion condition (No in step S62*d*), it performs the processing in step S62*f*.

Step S62*e*

If controller 24 determines that the second driving state meets the block insertion condition (Yes in step S62*d*), it inserts the above-described new function block. Here, the new function block is inserted such that the order of the new function block and the subsequent function block satisfies the above-described given order.

Step S62*f*

After the processing in step S62*e*, controller 24 executes the function block coming next in the given order after the function block executed in step S62*a*. If controller 24 determines in step S62*d* that the second driving state does not meet the block insertion condition (No in step S62*d*), it executes the next function block (i.e., the function block to be executed earliest among subsequent function blocks).

In this way, in the present embodiment, the inserted function block does not need to be inserted next in order after the function block whose end condition was checked, and may be inserted after the function block whose end condition was checked. Stated differently, the function block whose end condition was checked is the function block executed in step S62*a*, which is the first function block described above. Moreover, so long as the function block to be inserted is inserted so as to be executed before the above-described second function block, the function block to be inserted does not need to be inserted immediately after.

6.3 Specific Examples

Figure 37:
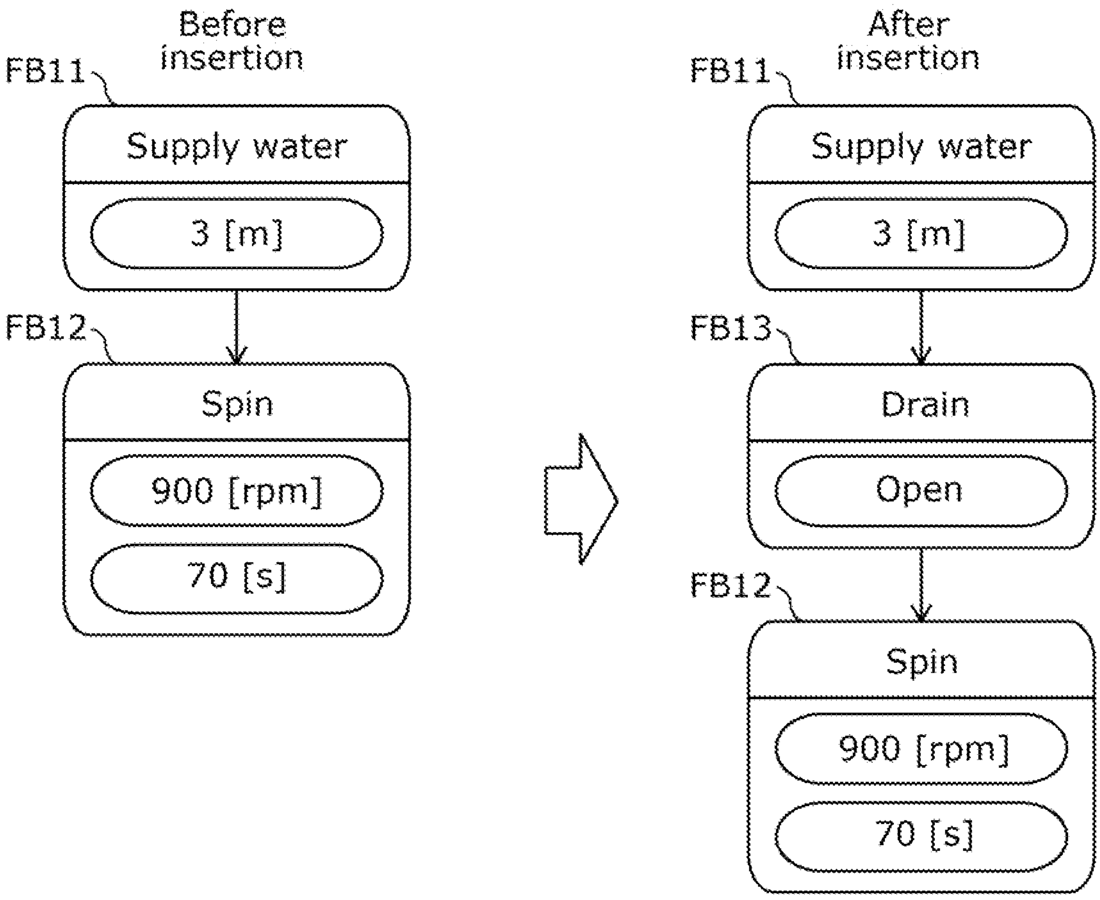
FIG. 37 illustrates one example of the insertion of a function block according to Embodiment 6.

FIG. 37 illustrates one example of the insertion of a function block according to present embodiment. In the example illustrated in FIG. 37, apparatus 20 is a washing machine.

For example, as illustrated in FIG. 37, the application includes a “supply water” function block FB11 and a “spin” function block FB12. Controller 24 causes drive unit W to supply water and then spin by executing function block FB11 and function block FB12 in the listed order.

Here, when controller 24 starts executing function block FB11, first sensor 25*a*, which is, for example, a timer, detects, as the first driving state, the duration spent supplying water by drive unit W in accordance with function block FB11. Second sensor 25*b* detects the water level in the wash tank of apparatus 20 as the second driving state. In the example illustrated in FIG. 37, the end condition is that the duration spent supplying water by drive unit W reaches a projected time to completion of the supplying of water by drive unit W in accordance with function block FB11. For example, the projected time to completion of the supplying of water is 3 minutes. The block insertion condition is that the water level is a threshold or higher. The threshold is, for example, 5 mm. In reality, water is never completely drained, so an appropriate threshold may be set within a range of a few millimeters to several tens of millimeters or so, taking such an error range into account.

If a predetermined condition is met after the start of the execution of function block FB11, controller 24 inserts new function block FB13 before drive unit W performs the spin operation in accordance with function block FB12. In the example illustrated in FIG. 37, a position that is after function block FB11 and before function block FB12 is only the position that is between them, but function block FB13 may be inserted anywhere so long as it is before function block FB12. Stated differently, if there is another function block between function block FB11 and function block FB12, function block FB13 may be inserted before or after said other function block. However, as in this example, new function block FB13 may be inserted before function block FB12, which is contiguous to function block FB11. This is also true for the other examples described below.

During the execution of function block FB11, controller 24 determines whether the duration spent supplying water by drive unit W as detected by first sensor 25*a* meets the end condition of function block FB11. More specifically, controller 24 determines whether the duration spent supplying water by drive unit W has reached the projected time to completion of the supplying of water by drive unit W in accordance with function block FB11. If controller 24 determines that the duration spent supplying water by drive unit W meets the end condition, i.e., that the duration has reached the projected time to completion, it determines whether the water level in the wash tank of apparatus 20 detected by second sensor 25*b* at that point in time meets the block insertion condition. More specifically, controller 24 determines whether the water level is 5 mm or less. If controller 24 determines that the water level meets the block insertion condition, i.e., that the water level is 5 mm or less, it inserts function block FB13. Stated differently, controller 24 updates the application by inserting function block FB13 before function block FB12, which follows function block FB11, among the plurality of function blocks in the application. In the example illustrated in FIG. 37, function block FB13 is a function block that drains water. For example, controller 24 inserts function block FB13 to drain water before the spin operation. Then, after function block FB21 ends, controller 24 controls drive unit W in accordance with function block FB12 and function block FB13.

In this way, in the present embodiment, in cases in which driving drive unit W so as to perform the spin operation of function block FB12 at a water level greater than or equal to the threshold may be hazardous, water can be automatically drained before the spin operation. Since the water level of apparatus 20 varies depending on the amount of water the clothes loaded in apparatus 20 absorb, it may be difficult to realize a non-hazardous water level in advance during application development. However, in the present embodiment, since, during execution of the application, the water level is detected and a water draining operation is inserted and executed according to the water level, the occurrence of hazards can be adequately inhibited. Stated differently, the water level can be sufficiently lowered by draining the water.

Figure 38:
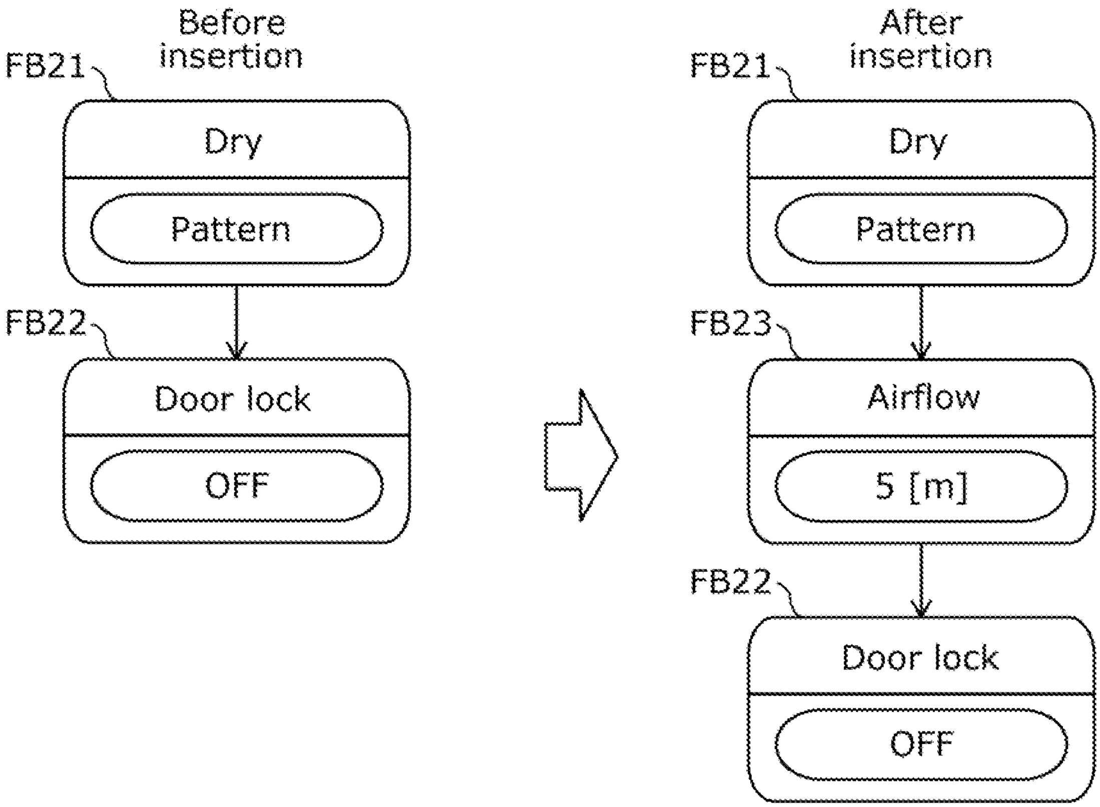
FIG. 38 illustrates another example of the insertion of a function block according to Embodiment 6.

FIG. 38 illustrates another example of the insertion of a function block according to the present embodiment. In the example illustrated in FIG. 38, apparatus 20 is a clothes dryer, but apparatus 20 may be a washing machine or any other device so long as it includes the function of a clothes dryer.

For example, as illustrated in FIG. 38, the application includes a “dry” function block FB21 and a “door lock” function block FB22. Controller 24 causes drive unit W to execute drying and then unlock the door lock (i.e., unlock the door) by executing function block FB21 and function block FB22 in the listed order.

Here, when controller 24 starts executing function block FB21, first sensor 25*a*, which is, for example, a timer, detects, as the first driving state, the duration spent drying clothes by drive unit W in accordance with function block FB21. Second sensor 25*b* detects the internal temperature of apparatus 20 as the second driving state. In the example illustrated in FIG. 38, the end condition is that the duration spent drying clothes by drive unit W reaches a projected time to completion of the drying of the clothes by drive unit W in accordance with function block FB21. For example, the projected time to completion of the drying is one hour. The block insertion condition is that the internal temperature is a threshold or higher. The threshold is, for example, 70° C.

If a predetermined condition is met after the start of the execution of function block FB21, controller 24 inserts new function block FB23 before drive unit W unlocks the door lock in accordance with function block FB22. Stated differently, during the execution of function block FB21, controller 24 determines whether the duration spent drying clothes by drive unit W as detected by first sensor 25*a* meets the end condition of function block FB21. More specifically, controller 24 determines whether the duration spent drying clothes by drive unit W has reached the projected time to completion of the drying of the clothes by drive unit W in accordance with function block FB21.

If controller 24 determines that the duration spent drying clothes by drive unit W meets the end condition, i.e., that the duration has reached the projected time to completion, it determines whether the internal temperature of apparatus 20 detected by second sensor 25*b* at that point in time meets the block insertion condition. More specifically, controller 24 determines whether the internal temperature is 70° C. or higher. If controller 24 determines that the internal temperature meets the block insertion condition, i.e., that the internal temperature is 70° C. or higher, it inserts function block FB23. Stated differently, controller 24 updates the application by inserting function block FB23 before function block FB22, which follows function block FB21, among the plurality of function blocks in the application. In the example illustrated in FIG. 38, function block FB23 is a function block that performs an airflow operation. For example, controller 24 inserts function block FB23 to perform an airflow operation before unlocking the door lock. Then, after function block FB21 ends, controller 24 controls drive unit W in accordance with function block FB22 and function block FB23.

In this way, in the present embodiment, in cases in which driving drive unit W so as to unlock the door lock in accordance with function block FB22 while the internal temperature is the threshold or higher may be hazardous, an airflow operation can be automatically executed before the door lock is unlocked. Since the internal temperature of apparatus 20 varies depending on the amount of clothes loaded in apparatus 20, it may be difficult to realize a non-hazardous internal temperature in advance during application development. However, in the present embodiment, since, during execution of the application, the internal temperature is detected and an airflow operation is inserted according to the internal temperature, the occurrence of hazards can be adequately inhibited. Stated differently, the internal temperature can be sufficiently lowered by airflow.

Figure 39:
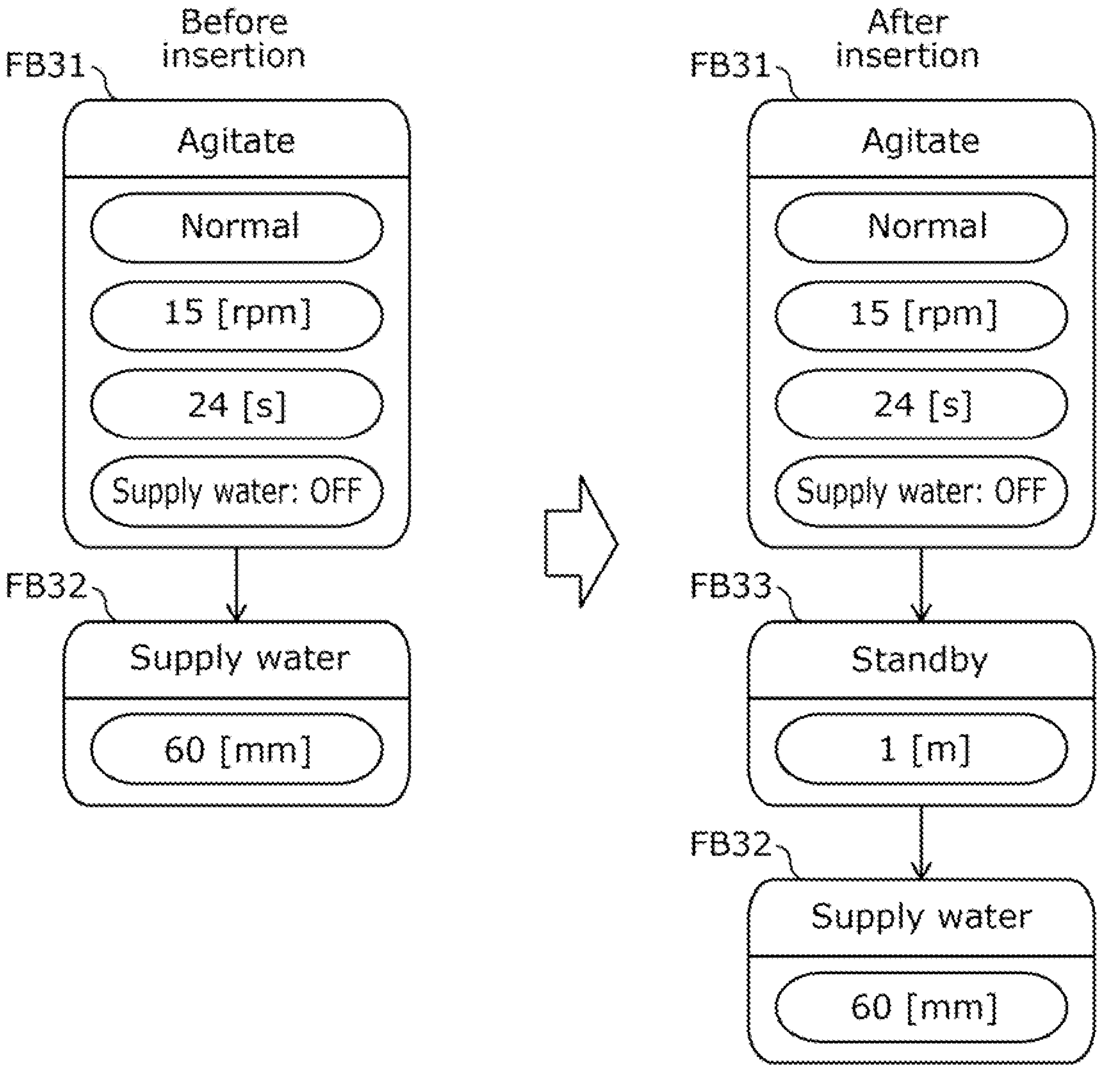
FIG. 39 illustrates yet another example of the insertion of a function block according to Embodiment 6.

FIG. 39 illustrates yet another example of the insertion of a function block according to Embodiment 6. In the example illustrated in FIG. 39, apparatus 20 is a washing machine.

For example, as illustrated in FIG. 39, the application includes an "agitate" function block FB31 and a "supply water" function block FB32. Controller 24 causes drive unit W to agitate and then supply water by executing function block FB31 and function block FB32 in the listed order. The following description can achieve the same operations in an application including a function block that drains water instead of function block FB32 that supplies water. Stated differently, the following explains that the same operation is performed so long as the subsequent function block is for supplying water or draining water. Here, as one example, an example in which the subsequent function block supplies water will be given.

Here, when controller 24 starts executing function block FB31, first sensor 25*a*, which is, for example, a timer, detects, as the first driving state, the duration spent agitating by drive unit W in accordance with function block FB31. Second sensor 25*b* detects the rotation speed of the agitating as the second driving state. The rotation speed of the agitating is, for example, the rotation speed of the wash tank or drum. In the example illustrated in FIG. 39, the end condition is that the duration spent agitating by drive unit W reaches a projected time to completion of the agitating by drive unit W in accordance with function block FB31. For example, the projected time to completion of the agitating is 24 seconds. The block insertion condition is that the rotation speed is a threshold or higher. The threshold is, for example, 3 rpm.

If a predetermined condition is met after the start of the execution of function block FB31, controller 24 inserts new function block FB33 before drive unit W supplies water in accordance with function block FB32. Stated differently, during the execution of function block FB31, controller 24 determines whether the duration spent agitating by drive unit W as detected by first sensor 25*a* meets the end condition of function block FB31. More specifically, controller 24 determines whether the duration spent agitating by drive unit W has reached the projected time to completion of the agitating by drive unit W in accordance with function block FB31. If controller 24 determines that the duration spent agitating by drive unit W meets the end condition, i.e., that the duration has reached the projected time to completion, it determines whether the rotation speed of the agitating detected by second sensor 25*b* at that point in time meets the block insertion condition. More specifically, controller 24 determines whether the rotation speed of the agitating is 3 rpm or higher. If controller 24 determines that the rotation speed of the agitating meets the block insertion condition, i.e., that the rotation speed of the agitating is 3 rpm or higher, it inserts function block FB33. Stated differently, controller 24 updates the application by inserting function block FB33 before function block FB32, which follows function block FB31, among the plurality of function blocks in the application. In the example illustrated in FIG. 39, function block FB33 is a function block that performs a standby operation (i.e., does not allow driving of drive unit W). For example, controller 24 inserts function block FB33 to perform a standby operation before supplying the water. Then, after function block FB31 ends, controller 24 controls drive unit W in accordance with function block FB32 and function block FB33.

In this way, in the present embodiment, in cases in which driving drive unit W so as to supply water in accordance with function block FB32 at a rotation speed greater than or equal to the threshold may be hazardous, a standby operation can be automatically executed before supplying the water. When the agitation according to function block FB31 ends, the drum, etc., of the washing machine may still be rotating due to inertia. Since the rotation speed thereof varies depending on, for example, the amount of clothes loaded in apparatus 20, it may be difficult to realize a non-hazardous rotation speed in advance during application development. However, in the present embodiment, when the agitation according to function block FB31 ends but a rotation speed greater than or equal to the threshold is detected, a standby operation according to the rotation speed is inserted, and thus the occurrence of hazards can be adequately inhibited. Stated differently, the inertial rotation speed can be sufficiently lowered by waiting in standby.

Figure 40:
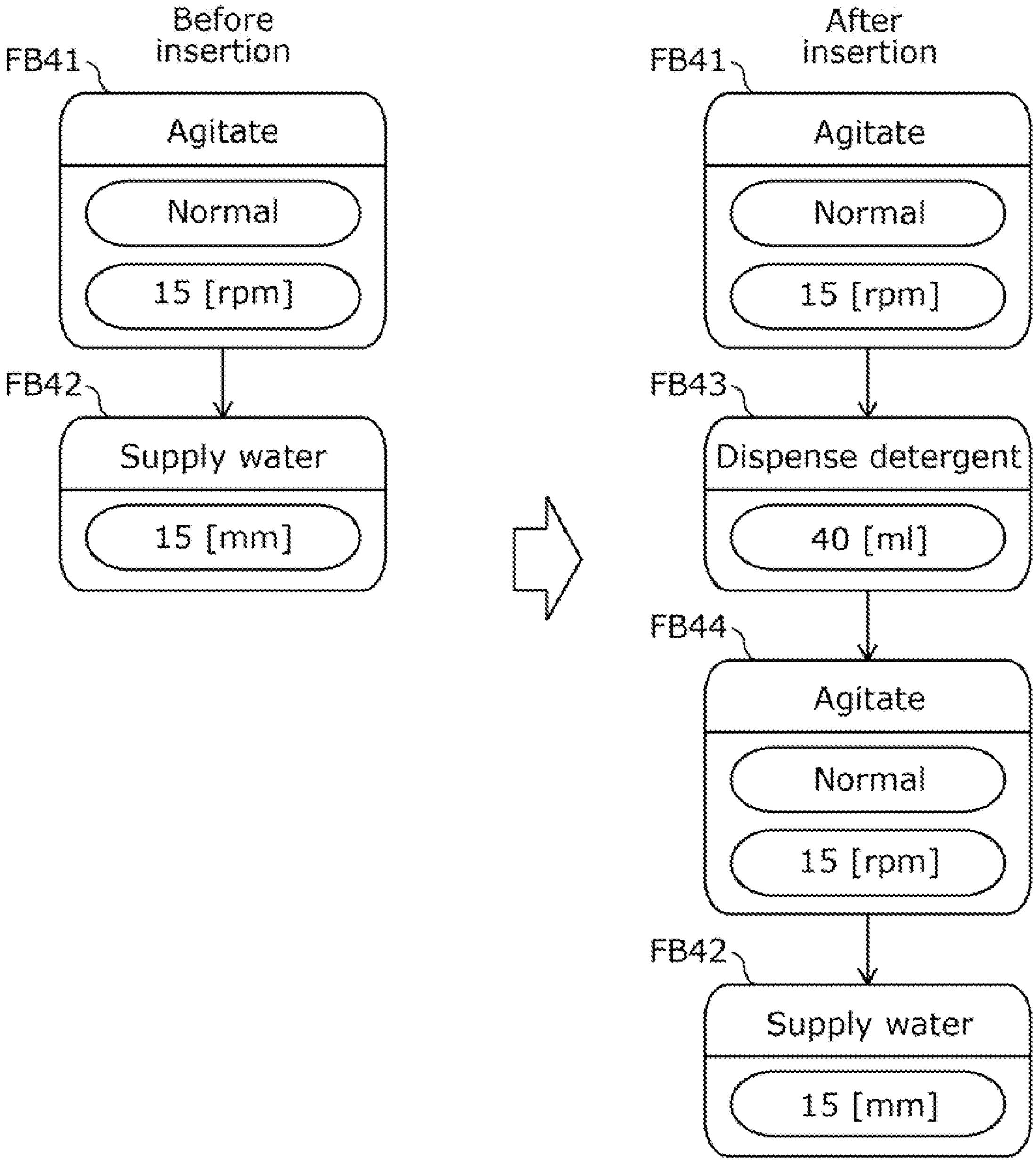
FIG. 40 illustrates yet another example of the insertion of a function block according to Embodiment 6.

FIG. 40 illustrates yet another example of the insertion of a function block according to Embodiment 6. In the example illustrated in FIG. 40, apparatus 20 is a washing machine.

For example, as illustrated in FIG. 40, the application includes an "agitate" function block FB41 and a "supply water" function block FB42. Controller 24 causes drive unit W to agitate and then supply water by executing function block FB41 and function block FB42 in the listed order. The following description can achieve the same operations in an application including a function block that drains water instead of function block FB42 that supplies water. Stated differently, the following explains that the same operation is performed so long as the subsequent function block supplies water or drains water. Here, as one example, an example in which the subsequent function block supplies water will be given.

Here, when controller 24 starts executing function block FB41, first sensor 25*a*, which is, for example, a timer, detects, as the first driving state, the duration spent agitating by drive unit W in accordance with function block FB41. Second sensor 25*b* detects the electrical conductivity as the second driving state. Electrical conductivity is, for example, the electrical conductivity of water stored in the wash tank or drum. In the example illustrated in FIG. 40, the end condition is that the duration spent agitating by drive unit W reaches a projected time to completion of the agitating by drive unit W in accordance with function block FB41. For example, the projected time to completion of the agitating is 10 minutes. The block insertion condition is that the electrical conductivity is a threshold or higher. The threshold is, for example, 6 mS/cm. Electrical conductivity corresponds to the dirtiness of the clothes being washed; the higher the electrical conductivity, the dirtier the clothes are.

If a predetermined condition is met after the start of the execution of function block FB41, controller 24 inserts new function blocks FB43 and FB44 before drive unit W supplies water in accordance with function block FB42. Stated differently, during the execution of function block FB41, controller 24 determines whether the duration spent agitating by drive unit W as detected by first sensor 25*a* meets the end condition of function block FB41. More specifically, controller 24 determines whether the duration spent agitating by drive unit W has reached the projected time to completion of the agitating by drive unit W in accordance with function block FB41. If controller 24 determines that the duration spent agitating by drive unit W meets the end condition, i.e., that the duration has reached the projected time to completion, it determines whether the electrical conductivity detected by second sensor 25*b* at that point in time meets the block insertion condition. More specifically, controller 24 determines whether the electrical conductivity is 6 mS/cm or higher. If controller 24 determines that the electrical conductivity meets the block insertion condition, i.e., that the electrical conductivity is 6 mS/cm or higher, it inserts function blocks FB43 and FB44. Stated differently, controller 24 updates the application by inserting function blocks FB43 and FB44 before function block FB42, which follows function block FB41, among the plurality of function blocks in the application. In the example illustrated in FIG. 40, function block FB43 is a function block that dispenses detergent. In the example illustrated in FIG. 40, function block FB44 is a function block that performs an agitation operation. For example, controller 24 inserts function blocks FB43 and FB44 to dispense detergent and agitate before supplying water. Then, after function block FB41 ends, controller 24 controls drive unit W in accordance with function blocks FB42, FB43, and FB44.

In this way, in the present embodiment, if the stain removal operation is insufficient based on the electrical conductivity detected being the threshold or higher, operations for dispensing detergent and agitating can be automatically executed before driving drive unit W to, for example, supply water as per subsequent function block FB42. When the agitation operation of function block FB41 ends, the washing process usually proceeds as if the stain removal operation was successfully completed, but the stain removal operation may be insufficient depending on the type and level of dirtiness. However, in the present embodiment, since, during execution of the application, the electrical conductivity is detected and detergent dispensing and agitation operations are inserted and executed according to the electrical conductivity, the stain removal operation can be adequately executed. In other words, the soiling indicated by the electrical conductivity can be sufficiently removed by dispensing detergent and agitating.

The above explanation describes an example in which "dispense detergent" and "agitate" function blocks are inserted to more reliably remove stains, but depending on the level of dirtiness, the "agitate" function block may be inserted without dispensing detergent. An increase in electrical conductivity can also occur if the agitation by drive unit W in accordance with function block FB41 is simply not sufficient. As mentioned above, there is no need to insert a function block for dispensing detergent if the insertion of an "agitate" function block alone would be sufficient. Another threshold for the value of electrical conductivity may be used to determine whether or not to insert a function block for dispensing detergent. However, in cases in which only an agitation block is inserted, a function block may be inserted that differs in type of agitation from the agitation by function block FB41, such as agitation at a greater rotation speed or a longer agitation time than the agitation performed by drive unit W in accordance with function block FB41.

Figure 41:
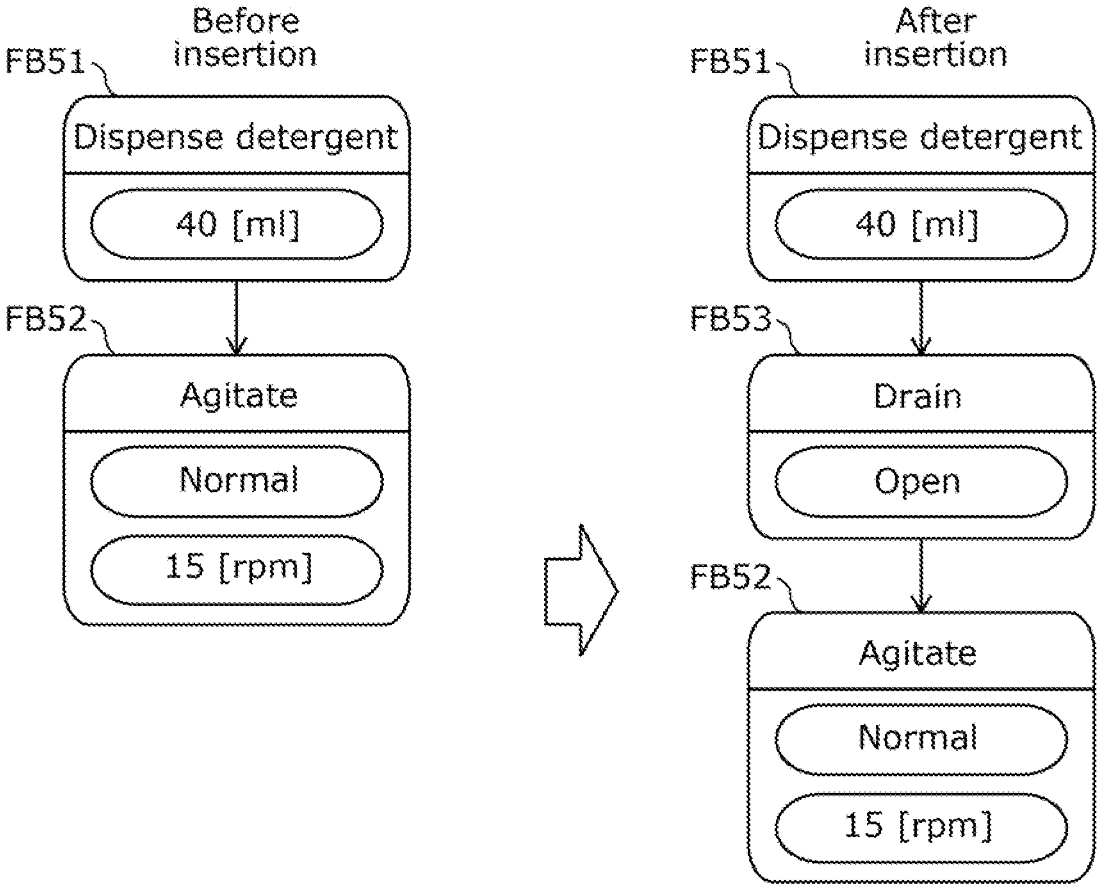
FIG. 41 illustrates yet another example of the insertion of a function block according to Embodiment 6.

FIG. 41 illustrates yet another example of the insertion of a function block according to Embodiment 6. In the example illustrated in FIG. 41, apparatus 20 is a washing machine.

For example, as illustrated in FIG. 41, the application includes a "dispense detergent" function block FB51 and an "agitate" function block FB52. Controller 24 causes drive unit W to dispense detergent and then agitate by executing function block FB51 and function block FB52 in the listed order.

Here, when controller 24 starts executing function block FB51, first sensor 25*a*, which is, for example, a measuring instrument, detects, as the first driving state, the amount of detergent dispensed in the dispensing of detergent by drive unit W in accordance with function block FB51. Second sensor 25*b* detects the water level as the second driving state. In the example illustrated in FIG. 41, the end condition is that the amount of detergent dispensed by driving drive unit W in accordance with function block FB51 reaches the intended amount. For example, the intended amount of detergent to be dispensed is 40 mL. The block insertion condition is that the water level is a threshold or higher. The threshold is, for example, a height corresponding to 60% of the height of the wash tank. If apparatus 20, which is a washing machine in this example, is a front-load washing machine, the threshold value is, for example, a height corresponding to 20% of the height of the drum. Such a threshold is set according to the agitation performed by drive unit W in accordance with function block FB52, since the threshold corresponds to a position reached by bubbles generated by the agitation performed by drive unit W in accordance with function block FB52.

If a predetermined condition is met after the start of the execution of function block FB51, controller 24 inserts new function block FB53 before drive unit W performs the agitation operation in accordance with function block FB52. Stated differently, during the execution of function block FB51, controller 24 determines whether the amount of detergent dispensed by drive unit W as detected by first sensor 25*a* meets the end condition of function block FB51. More specifically, controller 24 determines whether the amount of detergent dispensed by driving drive unit W in accordance with function block FB51 has reached the intended amount. If controller 24 determines that the amount of detergent dispensed meets the end condition, i.e., that the amount of detergent dispensed has reached the intended amount, it determines whether the water level detected by second sensor 25*b* at that point in time meets the block insertion condition. More specifically, controller 24 determines whether the water level is a height corresponding to 60% of the height of the wash tank or higher. If controller 24 determines that the water level meets the block insertion condition, i.e., that the water level is a height corresponding to 60% of the height of the wash tank or higher, it inserts function block FB53. Stated differently, controller 24 updates the application by inserting function block FB53 before function block FB52, which follows function block FB51, among the plurality of function blocks in the application. In the example illustrated in FIG. 41, function block FB53 is a function block that drains water. For example, controller 24 inserts function block FB53 to drain the water before the agitation operation. Then, after function block FB51 ends, controller 24 controls drive unit W in accordance with function block FB52 and function block FB53.

In this way, in the present embodiment, in cases in which driving drive unit W so as to perform the agitation operation of function block FB52 at a water level greater than or equal to the threshold may be hazardous, water can be automatically drained before the agitation operation. Since the water level of apparatus 20 varies depending on the amount of water the clothes loaded in apparatus 20 absorb, it may be difficult to realize a non-hazardous water level in advance during application development. However, in the present embodiment, since, during execution of the application, the water level is detected and a water draining operation is inserted and executed according to the water level, the occurrence of hazards can be adequately inhibited. Stated differently, the water level can be sufficiently lowered by draining the water.

Figure 42:
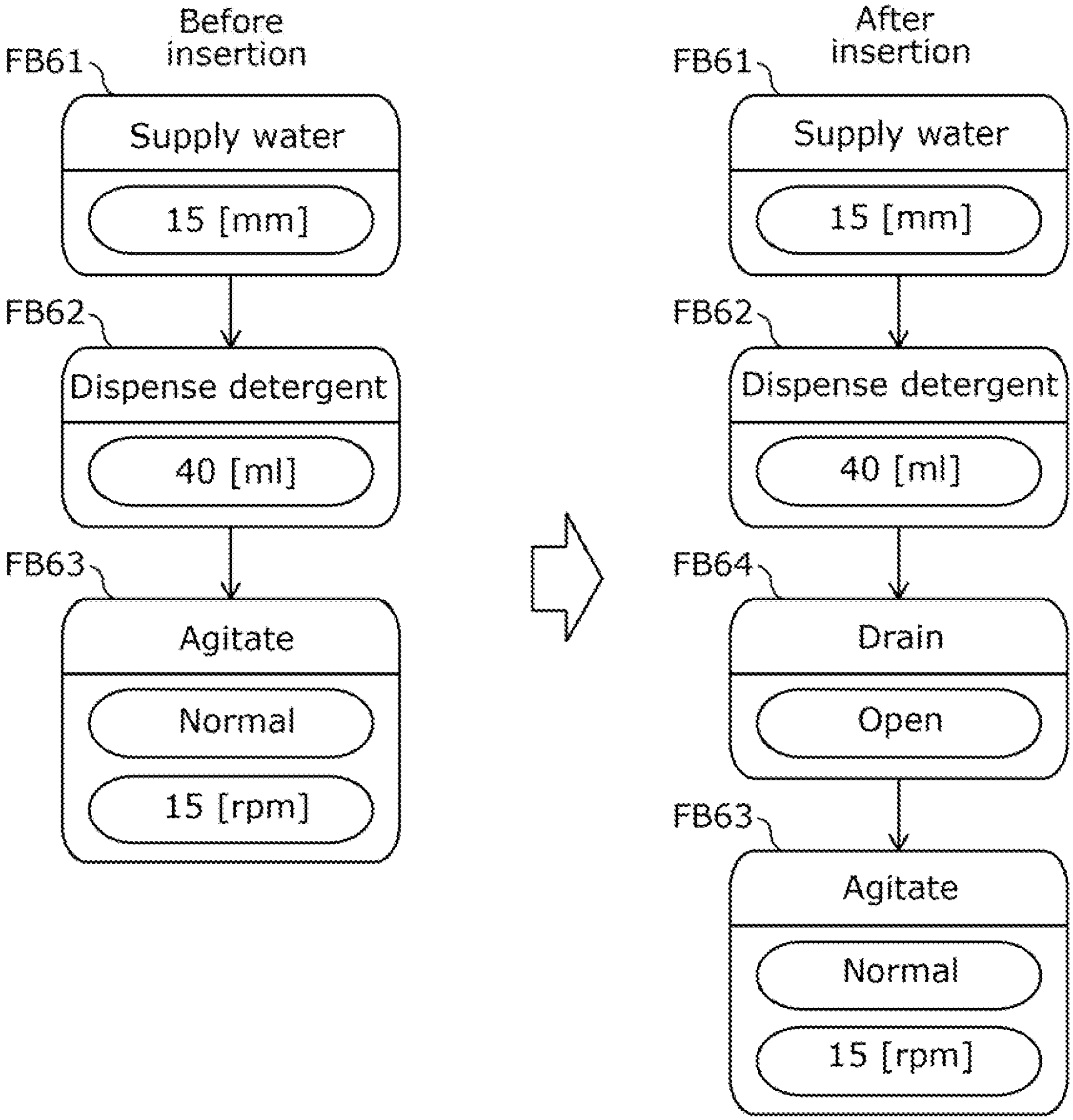
FIG. 42 illustrates yet another example of the insertion of a function block according to Embodiment 6.

FIG. 42 illustrates yet another example of the insertion of a function block according to Embodiment 6. In the example illustrated in FIG. 42, apparatus 20 is a washing machine.

For example, as illustrated in FIG. 42, the application includes a "supply water" function block F61, a "dispense detergent" function block FB62, and an "agitate" function block FB63. Controller 24 causes drive unit W to supply water, then dispense detergent, and then agitate by executing function block FB61, function block FB62, and function block FB63 in the listed order.

Here, when controller 24 starts executing function block FB61, first sensor 25*a*, which is, for example, a timer, detects, as the first driving state, the duration spent supplying water by drive unit W in accordance with function block FB61. Second sensor 25*b* detects the water level in the wash tank of apparatus 20 as the second driving state. In the example illustrated in FIG. 42, the end condition is that the duration spent supplying water by drive unit W reaches a projected time to completion of the supplying of water by drive unit W in accordance with function block FB61. For example, the projected time to completion of the supplying of water is 3 minutes. The block insertion condition is that the water level is a threshold or higher. The threshold is, for example, a height corresponding to 60% of the height of the wash tank. If apparatus 20, which is a washing machine in this example, is a front-load washing machine, the threshold value is, for example, a height corresponding to 20% of the height of the drum. Such a threshold is set according to the agitation performed by drive unit W in accordance with function block FB63, since the threshold corresponds to a position reached by bubbles generated by the agitation performed by drive unit W in accordance with function block FB63.

If a predetermined condition is met after the start of the execution of function block FB61, controller 24 inserts new function block FB64 before drive unit W performs the agitation operation in accordance with function block FB63. In other words, during the execution of function block FB61, controller 24 determines whether the duration spent supplying water by drive unit W as detected by first sensor 25*a* meets the end condition of function block FB61. More specifically, controller 24 determines whether the duration spent supplying water by drive unit W has reached the projected time to completion of the supplying of water by drive unit W in accordance with function block FB61. If controller 24 determines that the duration spent supplying water by drive unit W meets the end condition, i.e., that the duration has reached the projected time to completion, it determines whether the water level detected by second sensor 25*b* at that point in time meets the block insertion condition. More specifically, controller 24 determines whether the water level is a height corresponding to 60% of the height of the wash tank or higher. If controller 24 determines that the water level meets the block insertion condition, i.e., that the water level is a height corresponding to 60% of the height of the wash tank or higher, it inserts function block FB64. Stated differently, controller 24 updates the application by inserting function block FB64 before function block FB63, which follows function block FB61, among the plurality of function blocks in the application. In the example illustrated in FIG. 42, function block FB64 is a function block that drains water. For example, controller 24 inserts function block FB64 to drain water before the agitation operation. Then, after function block FB61 ends, controller 24 controls drive unit W in accordance with function blocks FB62, FB63, and FB64.

In the example illustrated in FIG. 42, function block FB64 is inserted between function blocks FB62 and FB63, which follow function block FB61. Therefore, after function block FB61 ends, each function block is executed in the order of function block 62, function block 64, and function block 63. However, function block FB64 may be inserted at any position before function block FB63, which is the specific block, with respect to function blocks FB62 and FB63, which are one example of the subsequent blocks that follow function block FB61. For example, function block FB64 may be inserted before function block FB62. In such cases, after function block FB61 ends, each function block is executed in the order of function block 64, function block 62, and function block 63.

In this way, in the present embodiment, in cases in which driving drive unit W so as to perform the agitation operation of function block FB63 at a water level greater than or equal to the threshold may be hazardous, water can be automatically drained before the agitation operation. Since the water level of apparatus 20 varies depending on the amount of water the clothes loaded in apparatus 20 absorb, it may be difficult to realize a non-hazardous water level in advance during application development. However, in the present embodiment, since, during execution of the application, the water level is detected and a water draining operation is inserted and executed according to the water level, the occurrence of hazards can be adequately inhibited. Stated differently, the water level can be sufficiently lowered by draining the water.

Figure 43:
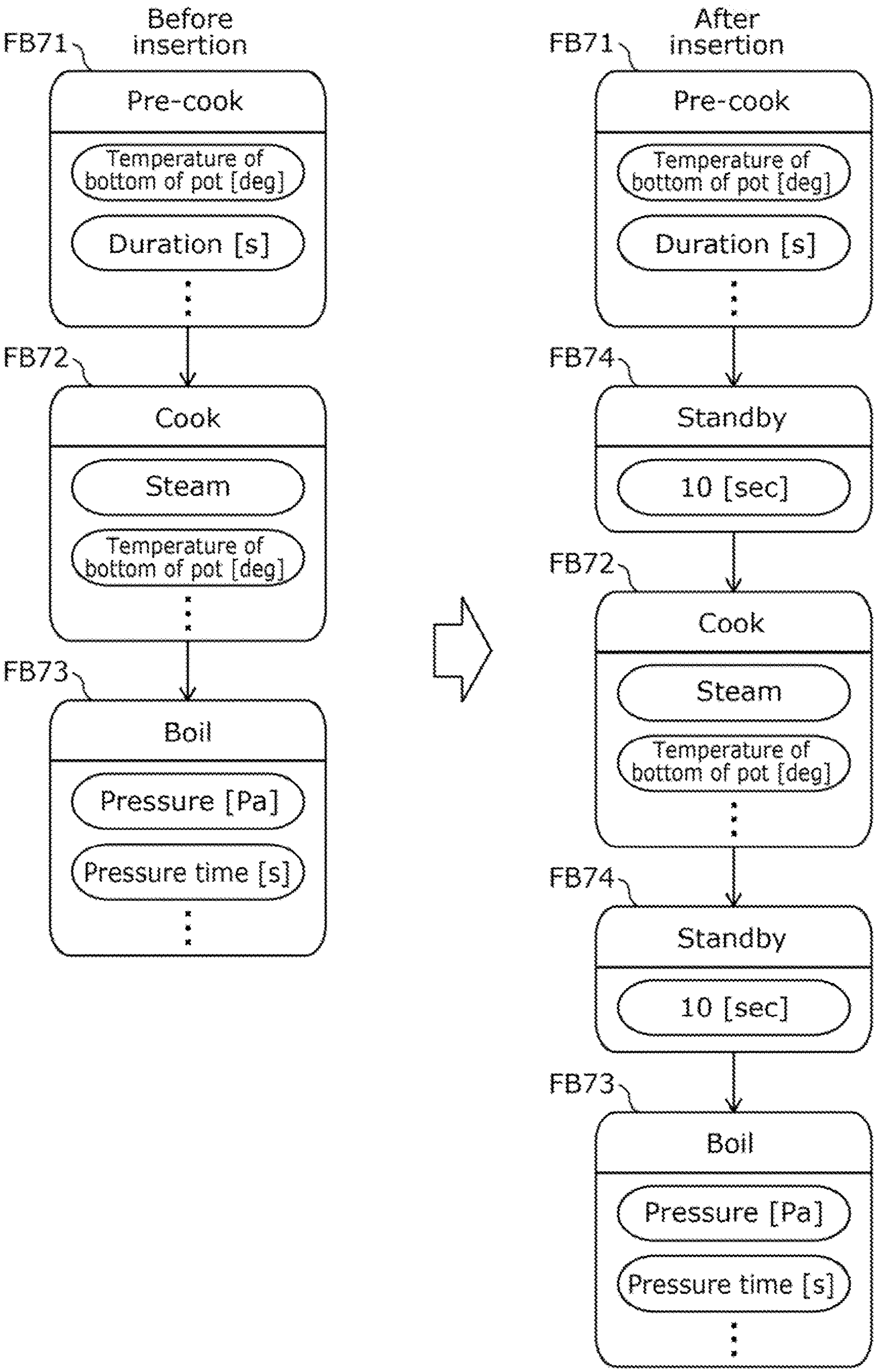
FIG. 43 illustrates yet another example of the insertion of a function block according to Embodiment 6.

FIG. 43 illustrates yet another example of the insertion of a function block according to Embodiment 6. In the example illustrated in FIG. 43, apparatus 20 is a rice cooker.

For example, as illustrated in FIG. 43, the application includes a "pre-cook" function block FB71, a "cook" function block FB72, and a "boil" function block FB73. Controller 24 causes drive unit W to pre-cook, then cook, then boil by executing function block FB71, function block FB72, function block FB73 in the listed order. Pre-cooking refers to a soaking process in which water is soaked into the rice, cooking refers to a process in which the rice is brought to its boiling point with high heat to, and boiling refers to a process in which the boiling is maintained at optimum heating power.

Here, when controller 24 starts executing function block FB71, first sensor 25*a*, which is, for example, a timer, detects, as the first driving state, the duration spent pre-cooking by drive unit W in accordance with function block FB71. Second sensor 25*b* detects the number of boilovers as the second driving state. For example, second sensor 25*b* includes a boil-over sensor that detects boilovers and a counter that counts the number of boilovers detected by the boil-over sensor. The boil-over sensor includes, for example, a PTC thermistor, which detects a boilover by the drop in temperature caused by, for example, bubbles from the boilover contacting the PTC thermistor. In the example illustrated in FIG. 43, the end condition is that the duration spent pre-cooking by drive unit W reaches a projected time to completion of the pre-cooking by drive unit W in accordance with function block FB71. For example, the projected time to completion of the pre-cooking is 30 minutes. The block insertion condition is that the number of boilovers during the pre-cooking is a threshold or higher. The threshold is, for example, one time.

If a predetermined condition is met after the start of the execution of function block FB71, controller 24 inserts new function block FB74 before drive unit W performs the cook operation in accordance with function block FB72. Stated differently, during the execution of function block FB71, controller 24 determines whether the duration spent pre-cooking by drive unit W as detected by first sensor 25*a* meets the end condition of function block FB71. More specifically, controller 24 determines whether the duration spent pre-cooking by drive unit W has reached the projected time to completion of the pre-cooking by drive unit W in accordance with function block FB71. If controller 24 determines that the duration spent pre-cooking by drive unit W meets the end condition, i.e., that the duration has reached the projected time to completion, it determines whether the number of boilovers detected by second sensor 25*b* at that point in time meets the block insertion condition. More specifically, controller 24 determines whether the number of boilovers is one or higher. If controller 24 determines that the number of boilovers meets the block insertion condition, i.e., that the number of boilovers is one or higher, it inserts function block FB74. Stated differently, controller 24 updates the application by inserting function block FB74 before function block FB72, which follows function block FB71, among the plurality of function blocks in the application. In the example illustrated in FIG. 43, function block FB74 is a function block that performs a standby operation. For example, controller 24 inserts function block FB74 to perform a standby operation before the cook operation. Then, after function block FB71 ends, controller 24 controls drive unit W in accordance with function blocks FB72, FB73, and FB74.

In this way, in the present embodiment, in cases in which driving drive unit W to cook in accordance with function block FB72 when there have been a threshold number of boilovers or more may be hazardous, a standby operation can be automatically executed before the cook operation. Since the number of boilovers varies depending on the amount of rice and water loaded in apparatus 20, and furthermore the temperature thereof, it may be difficult to realize a non-hazardous number of boilovers in advance during application development. However, in the present embodiment, when a threshold number of boilovers or more is detected, a standby operation is inserted according to the number of boilovers, and thus the occurrence of hazards can be adequately inhibited.

Furthermore, if a predetermined condition is met after the start of the execution of function block FB72, controller 24 may insert new function block FB74 before drive unit W performs the boil operation in accordance with function block FB73. Stated differently, during the execution of function block FB72, controller 24 determines whether the duration spent cooking by drive unit W as detected by first sensor 25*a* meets the end condition of function block FB72. More specifically, controller 24 determines whether the duration spent cooking by drive unit W has reached the projected time to completion of the cooking by drive unit W in accordance with function block FB72. If controller 24 determines that the duration spent cooking by drive unit W meets the end condition, i.e., that the duration has reached the projected time to completion, it determines whether the number of boilovers detected by second sensor 25*b* at that point in time meets the block insertion condition. More specifically, controller 24 determines whether the number of boilovers during the cooking is one or higher. If controller 24 determines that the number of boilovers meets the block insertion condition, i.e., that the number of boilovers is one or higher, it inserts function block FB74. Stated differently, controller 24 updates the application by inserting function block FB74 before function block FB73, which follows function block FB72, among the plurality of function blocks in the application. For example, controller 24 inserts function block FB74 to perform a standby operation before the boil operation. Then, after function block FB72 ends, controller 24 controls drive unit W in accordance with function block FB73 and function block FB74.

Accordingly, the a standby operation can be automatically executed between function blocks FB72 and FB73 as well, just like between function blocks FB71 and FB72, to adequately inhibit the occurrence of hazards.

Figure 44:
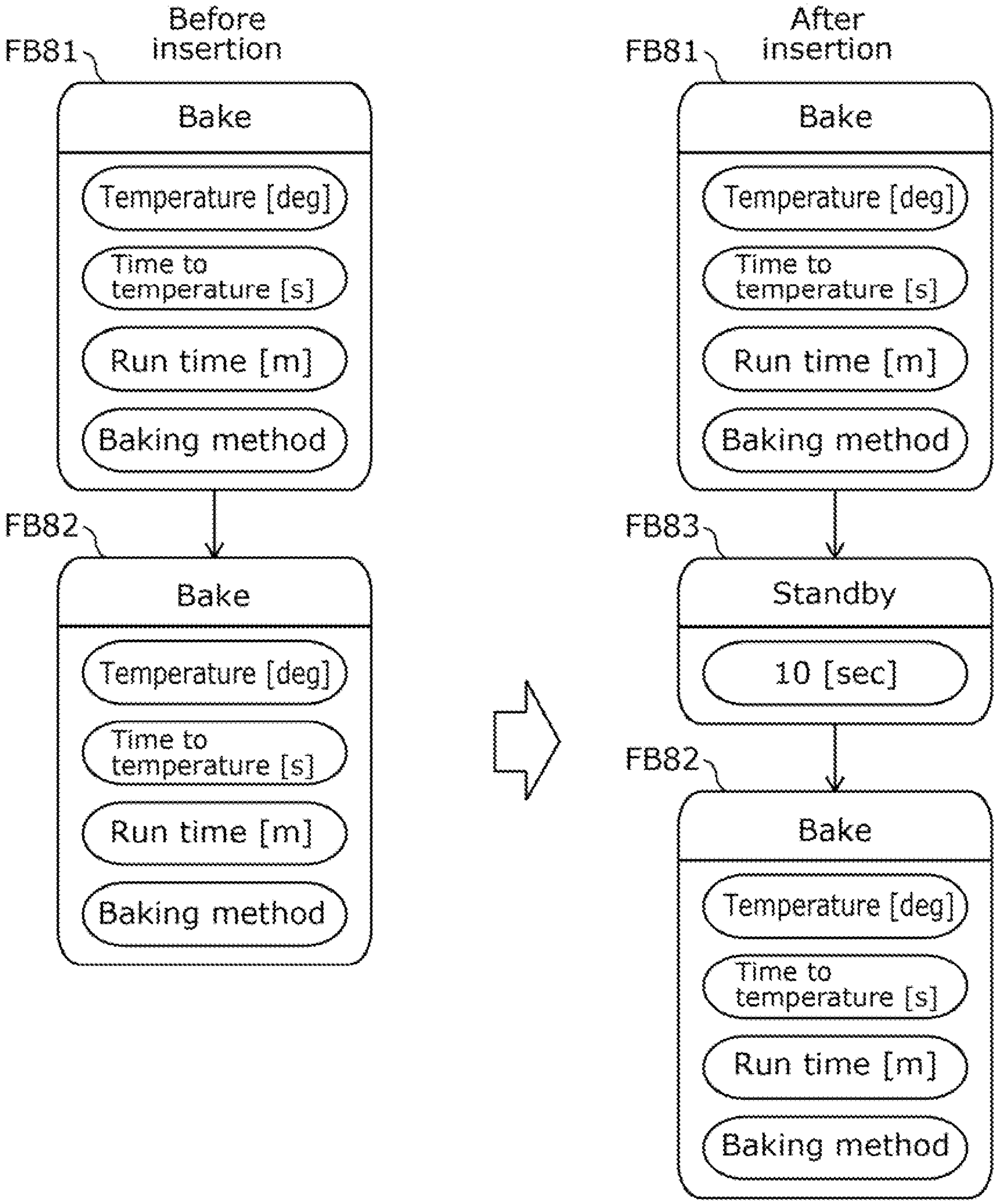
FIG. 44 illustrates yet another example of the insertion of a function block according to Embodiment 6.

FIG. 44 illustrates yet another example of the insertion of a function block according to Embodiment 6. In the example illustrated in FIG. 44, apparatus 20 is an oven, but apparatus 20 may be a convection microwave oven or any other device so long as it includes the function of an oven.

For example, as illustrated in FIG. 44, the application includes a baking process function block FB81, and another baking process function block FB82. Controller 24 causes drive unit W to execute the baking process in a first mode, then further execute the baking process in a second mode, by executing function block FB81 and function block FB82 in the listed order. The first and second modes may be the same or different. The baking process refers to the process of baking food placed inside apparatus 20 with a heater.

Here, when controller 24 starts executing function block FB81, first sensor 25*a*, which is, for example, a timer, detects, as the first driving state, the duration spent performing the baking process by drive unit W in accordance with function block FB81. Second sensor 25*b* detects the inside temperature of apparatus 20 as the second driving state. Note that the inside temperature is the internal temperature of apparatus 20. In the example illustrated in FIG. 44, the end condition is that the duration spent performing the baking process by drive unit W reaches a projected time to completion of the baking process by drive unit W in accordance with function block FB81. For example, the projected time to completion of the baking process is 40 minutes. Note that this projected time to completion is also referred to as "run time". The block insertion condition is that the difference between the projected rise in temperature from drive unit W performing the baking process of the food in accordance with function block FB82 and the temperature limit of apparatus 20 is less than or equal to the inside temperature of apparatus 20. For example, the projected rise in temperature is 60° C. and the temperature limit is 250° C. The above-described difference between the projected rise in temperature and the temperature limit is also hereinafter referred to simply as the "differential temperature".

If a predetermined condition is met after the start of the execution of function block FB81, controller 24 inserts new function block FB83 before drive unit W performs the baking process in accordance with function block FB82. Stated differently, during the execution of function block FB81, controller 24 determines whether the duration spent performing the baking process by drive unit W as detected by first sensor 25*a* meets the end condition of function block FB81. More specifically, controller 24 determines whether the duration spent performing the baking process by drive unit W has reached the projected time to completion of the baking process by drive unit W in accordance with function block FB81. If controller 24 determines that the duration spent on the baking process by drive unit W meets the end condition, i.e., that the duration has reached the projected time to completion, it determines whether the inside temperature detected by second sensor 25*b* at that point in time meets the block insertion condition. More specifically, controller 24 determines whether the inside temperature is the differential temperature or higher. If controller 24 determines that the inside temperature meets the block insertion condition, i.e., that the inside temperature is the differential temperature or higher, it inserts function block FB83. Stated differently, controller 24 updates the application by inserting function block FB83 before function block FB82, which follows function block FB81, among the plurality of function blocks in the application. In the example illustrated in FIG. 44, function block FB83 is a function block that performs a standby operation. For example, controller 24 inserts function block FB83 to perform a standby operation before the baking process in the second mode. Then, after function block FB81 ends, controller 24 controls drive unit W in accordance with function block FB82 and function block FB83.

In this way, in the present embodiment, in cases in which driving drive unit W so as to perform the baking process of function block FB82 at an inside temperature greater than or equal to the differential temperature may be hazardous, a standby operation can be automatically executed before the baking process. Since the inside temperature varies depending on the food placed in apparatus 20 and the environment, it may be difficult to realize a non-hazardous inside temperature in advance during application development. If the inside temperature at the end of the baking process performed according to function block FB81 is the differential temperature or higher, the inside temperature may reach the temperature limit or higher during the baking process performed according to function block FB82. However, in the present embodiment, since, during execution of the application, the inside temperature is detected and a standby operation is inserted and executed according to the inside temperature, the occurrence of hazards can be adequately inhibited.

6.4 Advantageous Effects, Etc.

As described above, apparatus 20, which is the drive apparatus according to the present embodiment, includes: drive unit W including at least one of actuator 22 or heater 23; controller 24 that obtains an application including a plurality of function blocks, and executes the application to control the drive unit in accordance with the plurality of function blocks; first sensor 25*a* that detects a first driving state of drive unit W; and second sensor 25*b* that detects a second driving state of drive unit W. Each of the plurality of function blocks includes an end condition for ending driving of drive unit W by the function block. When, during execution of a first function block among the plurality of function blocks, the first driving state detected by first sensor 25*a* meets the end condition of the first function block and the second driving state detected by second sensor 25*b* meets a block insertion condition, controller 24: inserts a new function block so that the order relative to one or more subsequent function blocks after the first function block in the application is a given order; and after the first function block ends, controls drive unit W in accordance with the one or more subsequent function blocks and the new function block arranged in the given order.

With this, drive unit W can be controlled based on an application defined by a plurality of function blocks. It is therefore possible to develop applications using blocks that abstract the control of apparatus 20, allowing a wide variety of applications to be developed not only by the manufacturer but also by third parties, and these applications can be easily executed on apparatus 20.

Furthermore, when the driving of drive unit W in accordance with the first function block ends, if the second driving state meets the block insertion condition, a new function block is inserted before a subsequent function block that follows the first function block. Drive unit W is then controlled in accordance with the inserted function block. With this, in cases in which it could be hazardous or inefficient (hereinafter also simply "hazardous, etc." or "hazards, etc.") to drive drive unit W in accordance with the subsequent function block in the second driving state of drive unit W, it is possible to automatically perform evasive actions. Since this second driving state varies depending on how the user uses apparatus 20, it may be difficult avoid such hazards, etc., in advance during application development. However, in the present embodiment, during execution of an application, the second driving state is detected, and a function block is inserted according to the second driving state, and thus the occurrence of hazards, etc., can be adequately inhibited. As a result, even when a wide variety of applications are obtained and drive unit W is controlled in accordance with those applications, the safety or efficiency (hereinafter also simply "safety, etc.") of apparatus 20 controlled by those applications can be ensured and their safety, etc., can be improved.

In the present embodiment, the given order is an order in which the new function block is placed before a specific function block, which is a subsequent function block, among one or more subsequent blocks, that does not allow the driving of drive unit W in a situation in which the second driving state meets the block insertion condition.

Since a new function block that can avoid hazards, etc., is inserted before execution of a specific function block that does not allow the driving of drive unit W in a situation in which the second driving state meets the block insertion condition because it is hazardous, etc., even when a wide variety of applications are obtained and drive unit W is controlled in accordance with those applications, the safety, etc., of apparatus 20 controlled by those applications can be more certainly ensured and their safety, etc., can be improved.

In the present embodiment, the first driving state detected by first sensor 25*a* is the during spent driving drive unit W in accordance with the first function block.

With this, by comparing the duration spent driving drive unit W with the projected time to completion of the first function block, it is possible to properly determine whether the first driving state meets the end condition, i.e., whether the driving of drive unit W in accordance with the first function block is finished.

In the present embodiment, the second driving state detected by second sensor 25*b* is a temperature, a rotation speed, a number of boilovers, a water level, or an electrical conductivity resulting from the driving of drive unit W.

With this, it is possible to properly determine whether or not a parameter of the second function block should be changed based on the second driving state related to the safety of apparatus 20.

In the present embodiment, apparatus 20 is, for example, a washing machine. In such cases, first sensor 25*a* detects, as the first driving state, a duration spent supplying water by drive unit W in accordance with the first function block, and second sensor 25*b* detects, as the second driving state, a water level of apparatus 20. The end condition is that the duration spent supplying the water reaches a projected time to completion of the supplying of the water by drive unit W. The block insertion condition is that the water level is a threshold or higher. In such cases, in the inserting of the new function block, controller 24 inserts, as the new function block, a function block that drains water, before drive unit W performs a spin operation of apparatus 20.

With this, in cases in which driving drive unit W so as to perform the spin operation of function block FB12 at a water level greater than or equal to the threshold may be hazardous, water can be automatically drained before the spin operation. Since the water level of apparatus 20 varies depending on the amount of water the clothes loaded in apparatus 20 absorb, it may be difficult to realize a non-hazardous water level in advance during application development. However, in the present embodiment, since, during execution of the application, the water level is detected and a water draining operation is inserted and executed according to the water level, the occurrence of hazards can be adequately inhibited. As a result, even when a wide variety of applications are obtained and drive unit W is controlled in accordance with those applications, the safety of apparatus 20 controlled by those applications can be ensured and their safety can be improved.

In the present embodiment, apparatus 20 is, for example, a clothes dryer. In such cases, first sensor 25*a* detects, as the first driving state, a duration spent drying clothes by drive unit W in accordance with the first function block, and second sensor 25*b* detects, as the second driving state, an internal temperature of drive apparatus 20. The end condition is that the duration spent drying the clothes reaches a projected time to completion of the drying of the clothes by drive unit W. The block insertion condition is that the internal temperature is a threshold or higher. In such cases, in the inserting of the new function block, controller 24 inserts, as the new function block, a function block that performs an airflow operation, before drive unit W unlocks a door lock of apparatus 20.

With this, in cases in which driving drive unit W so as to unlock the door lock in accordance with function block FB22 while the internal temperature is the threshold or higher may be hazardous, an airflow operation can be automatically executed before the door lock is unlocked. Since the internal temperature of apparatus 20 varies depending on the amount of clothes loaded in apparatus 20, it may be difficult to realize a non-hazardous internal temperature in advance during application development. However, in the present embodiment, since, during execution of the application, the internal temperature is detected and an airflow operation is inserted according to the internal temperature, the occurrence of hazards can be adequately inhibited. As a result, even when a wide variety of applications are obtained and drive unit W is controlled in accordance with those applications, the safety of apparatus 20 controlled by those applications can be ensured and their safety can be improved.

In the present embodiment, apparatus 20 is, for example, a washing machine. In such cases, first sensor 25*a* detects, as the first driving state, a duration spent agitating by drive unit W in accordance with the first function block, and second sensor 25*b* detects, as the second driving state, a rotation speed of the agitating. The end condition is that the duration spent agitating reaches a projected time to completion of the agitating by drive unit W. The block insertion condition is that the rotation speed is a threshold or higher. In such cases, in the inserting of the new function block, controller 24 inserts, as the new function block, a function block that performs a standby operation, before drive unit W drains water from or supplies water to apparatus 20.

With this, in cases in which driving drive unit W so as to supply water in accordance with function block FB32 at a rotation speed greater than or equal to the threshold may be hazardous, a standby operation can be automatically executed before supplying the water. When the agitation according to function block FB31 ends, the drum, etc., of the washing machine may still be rotating due to inertia. Since the rotation speed thereof varies depending on, for example, the amount of clothes loaded in apparatus 20, it may be difficult to realize a non-hazardous rotation speed in advance during application development. However, in the present embodiment, when the agitation according to function block FB31 ends but a rotation speed greater than or equal to the threshold is detected, a standby operation according to the rotation speed is inserted, and thus the occurrence of hazards can be adequately inhibited. As a result, even when a wide variety of applications are obtained and drive unit W is controlled in accordance with those applications, the safety of apparatus 20 controlled by those applications can be ensured and their safety can be improved.

In the present embodiment, apparatus 20 is, for example, a washing machine. In such cases, first sensor 25*a* detects, as the first driving state, a duration spent agitating by drive unit W in accordance with the first function block, and second sensor 25*b* detects, as the second driving state, an electrical conductivity. The end condition is that the duration spent agitating reaches a projected time to completion of the agitating by drive unit W. The block insertion condition is that the electrical conductivity is a threshold or higher. In such cases, in the inserting of the new function block, controller 24 inserts, as the new function block, a function block that performs another agitation operation, before drive unit W supplies water to apparatus 20.

In the present embodiment, in the inserting of the new function block, controller 24 inserts, as new function blocks, a function block that dispenses detergent and the function block that performs another agitation operation, before drive unit W supplies water to apparatus 20.

With this, if the stain removal operation is insufficient based on the electrical conductivity detected being the threshold or higher, operations for dispensing detergent and agitating can be automatically executed before driving drive unit W to, for example, supply water as per subsequent function block FB42. When the agitation operation of function block FB41 ends, the washing process usually proceeds as if the stain removal operation was successfully completed, but the stain removal operation may be insufficient depending on the type and level of dirtiness. However, in the present embodiment, since, during execution of the application, the electrical conductivity is detected and detergent dispensing and agitation operations are inserted and executed according to the electrical conductivity, the stain removal operation can be adequately executed. As a result, even when a wide variety of applications are obtained and drive unit W is controlled in accordance with those applications, the efficiency of apparatus 20 controlled by those applications can be ensured and improved.

In the present embodiment, apparatus 20 is, for example, a washing machine. In such cases, first sensor 25*a* detects, as the first driving state, an amount of detergent dispensed by drive unit W in accordance with the first function block, and second sensor 25*b* detects, as the second driving state, a water level. The end condition is that the amount of detergent dispensed by drive unit W reaches an intended amount. The block insertion condition is that the water level is a threshold or higher. In such cases, in the inserting of the new function block, controller 24 inserts, as the new function block, a function block that drains water, before drive unit W performs an agitation operation of apparatus 20.

With this, in cases in which driving drive unit W so as to perform the agitation operation of function block FB52 at a water level greater than or equal to the threshold may be hazardous, water can be automatically drained before the agitation operation. Since the water level of apparatus 20 varies depending on the amount of water the clothes loaded in apparatus 20 absorb, it may be difficult to realize a non-hazardous water level in advance during application development. However, in the present embodiment, since, during execution of the application, the water level is detected and a water draining operation is inserted and executed according to the water level, the occurrence of hazards can be adequately inhibited. As a result, even when a wide variety of applications are obtained and drive unit W is controlled in accordance with those applications, the safety of apparatus 20 controlled by those applications can be ensured and their safety can be improved.

In the present embodiment, apparatus 20 is, for example, a washing machine. In such cases, first sensor 25*a* detects, as the first driving state, a duration spent supplying water by drive unit W in accordance with the first function block, and second sensor 25*b* detects, as the second driving state, a water level of apparatus 20. The end condition is that the duration spent supplying the water reaches a projected time to completion of the supplying of the water by drive unit W. The block insertion condition is that the water level is a threshold or higher. In such cases, in the inserting of the new function block, controller 24 inserts, as the new function block, a function block that drains water, before drive unit W performs a spin operation of apparatus 20.

With this, in cases in which driving drive unit W so as to perform the agitation operation of function block FB63 at a water level greater than or equal to the threshold may be hazardous, water can be automatically drained before the agitation operation. Since the water level of apparatus 20 varies depending on the amount of water the clothes loaded in apparatus 20 absorb, it may be difficult to realize a non-hazardous water level in advance during application development. However, in the present embodiment, since, during execution of the application, the water level is detected and a water draining operation is inserted and executed according to the water level, the occurrence of hazards can be adequately inhibited. As a result, even when a wide variety of applications are obtained and drive unit W is controlled in accordance with those applications, the safety of apparatus 20 controlled by those applications can be ensured and their safety can be improved.

In the present embodiment, drive apparatus 20 is, for example, a rice cooker. In such cases, first sensor 25*a* detects, as the first driving state, a duration spent pre-cooking by drive unit W in accordance with the first function block, and second sensor 25*b* detects, as the second driving state, a number of boilovers from apparatus 20. The end condition is that the duration spent pre-cooking reaches a projected time to completion of the pre-cooking by drive unit W. The block insertion condition is that the number of boilovers is a threshold or higher. In such cases, in the inserting of the new function block, controller 24 inserts, as the new function block, a function block that performs a standby operation, before drive unit W performs a cook operation in accordance with the second function block.

With this, in cases in which driving drive unit W to cook in accordance with function block FB72 when there have been a threshold number of boilovers or more may be hazardous, a standby operation can be automatically executed before the cook operation. Since the number of boilovers varies depending on the amount of rice and water loaded in apparatus 20, and furthermore the temperature thereof, it may be difficult to realize a non-hazardous number of boilovers in advance during application development. However, in the present embodiment, when a threshold number of boilovers or more is detected, a standby operation is inserted according to the number of boilovers, and thus the occurrence of hazards can be adequately inhibited. As a result, even when a wide variety of applications are obtained and drive unit W is controlled in accordance with those applications, the safety of apparatus 20 controlled by those applications can be ensured and their safety can be improved.

In the present embodiment, drive apparatus 20 is, for example, an oven. In such cases, first sensor 25*a* detects, as the first driving state, a duration spent performing a baking process of food by drive unit W in accordance with the first function block. Second sensor 25*b* detects, as the second driving state, an internal temperature of apparatus 20. The end condition is that the duration spent performing the baking process reaches a projected time to completion of the baking process by drive unit W. The block insertion condition is that a difference between a projected rise in temperature from drive unit W performing the baking process of the food in accordance with the second function block and a temperature limit of apparatus 20 is less than or equal to the internal temperature. In such cases, in the inserting of the new function block, controller 24 inserts, as the new function block, a function block that performs a standby operation, before drive unit W performs the baking process of the food in accordance with the second function block.

With this, in cases in which driving drive unit W so as to perform the baking process of function block FB82 at an internal temperature greater than or equal to the threshold may be hazardous, a standby operation can be automatically executed before the baking process. Since the inside temperature varies depending on the food placed in apparatus 20 and the environment, it may be difficult to realize a non-hazardous inside temperature in advance during application development. If the inside temperature at the end of the baking process performed according to function block FB81 is the differential temperature or higher, the inside temperature may reach the temperature limit or higher during the baking process performed according to function block FB82. However, in the present embodiment, since, during execution of the application, the inside temperature is detected and a standby operation is inserted and executed according to the inside temperature, the occurrence of hazards can be adequately inhibited. As a result, even when a wide variety of applications are obtained and drive unit W is controlled in accordance with those applications, the safety of apparatus 20 controlled by those applications can be ensured and their safety can be improved.

Although first sensor 25*a* according to the present embodiment is a timer, first sensor 25*a* may be a different type of sensor. For example, if apparatus 20 is an oven, first sensor 25*a* may be a temperature sensor that detects the inside temperature as the first driving state. In such cases, the inside temperature detected by first sensor 25*a* meets the end condition of the first function block when the inside temperature reaches a target temperature. When the end condition is met, controller 24 then determines whether or not the second driving state detected by second sensor 25*b* meets a block insertion condition. Similarly, first sensor 25*a* may detect the rotation speed of the agitating as the first driving state.

Second sensor 25*b* according to the present embodiment may, in the case that apparatus 20 is a washing machine, detect weight balance as the second driving state. Stated differently, second sensor 25*b* may detect the bias of the clothes placed in the washing machine. In such cases, controller 24 may insert a function block according to the detected bias of the clothes.

The block insertion conditions according to the present embodiment may also be used for the rules described in Embodiment 1 through 5. Stated differently, the rule stipulates that a new function block must be inserted before the second function block if the second driving state detected by second sensor 25*b* meets the block insertion condition. Controller 24 inserts function blocks according to the rules.

The block insertion conditions according to the present embodiment may include a function or table for deriving a parameter or the like for the inserted function block. For example, the function may be a mathematical expression that takes the first driving state and the second driving state before the change as inputs and derives a numerical value for the parameter of the inserted function block.

OTHER EMBODIMENTS

Hereinbefore, a system according to one or more aspects of the present disclosure has been described based on exemplary embodiments, but the present disclosure is not limited to the above exemplary embodiments. Those skilled in the art will readily appreciate that many modifications are possible in the exemplary embodiments without materially departing from the novel teachings and advantages of the present disclosure. Accordingly, all such modifications are intended to be included within one or more aspects of the present disclosure.

In the above exemplary embodiments, sequence manager 100 and device manager 200 are described as, but not limited to, being included in cloud server 10. Sequence manager 100 and/or device manager 200 may be included in apparatus 20. Similarly, although UI 400 is described as being included in terminal 30, UI 400 may be included in apparatus 20.

In the above exemplary embodiments, the application may be modified based on the degradation information. For example, device 300 may consult parameter conversion information that associates a plurality of degradation levels with a plurality of parameter conversion methods, obtain the conversion method corresponding to the degradation level, and convert a parameter included in the block using the obtained conversion method. The conversion method may be defined, for example, by the value after conversion or by the coefficients applied to the value before conversion.

In the above exemplary embodiments, the application is described as, but not limited to, being modified in the pre-execution check and then executed. For example, when the state of device 300 is different than expected, the application may not be modified and device manager 200 and/or sequence manager 100 may be notified of the aborted execution (error).

The rules are not limited to the rules used in the above exemplary embodiments. For example, a second rule, which is the amount of heat generated by the execution of each of a plurality of blocks, may be used. In such cases, controller 24 may determine whether at least part of apparatus 20 will reach the maximum withstand temperature if the application is executed. If controller 24 determines that at least part of apparatus 20 will reach the maximum withstand temperature, controller 24 may modify the application by changing the order in which each of the plurality of blocks is executed. If each of the plurality of blocks includes a parameter for driving at least one of actuator 22 and heater 23, controller 24 may consult the second rule, the plurality of blocks included in the application, and the parameters included in the plurality of blocks, and calculate the temperature that at least part of apparatus 20 will be upon completion of the plurality of blocks.

INDUSTRIAL APPLICABILITY

The present disclosure can be used in home appliances or other products that can execute an application defined by a plurality of function blocks.

The invention claimed is:

1. A drive apparatus comprising:

a drive unit that includes at least one of an actuator or a heater, and drives energy conversion that is at least one of conversion of electrical energy into physical motion by the actuator or conversion of electrical energy into thermal energy by the heater;

a controller programmed to execute an application including a plurality of blocks of programming code, and to execute the application to control the drive unit in accordance with the plurality of blocks of programming code;

a first sensor that measures physical quantities related to an end condition of a first block among the plurality of blocks for ending driving of the drive unit by the first block and detects a first driving state of the drive unit; and a second sensor that measures physical quantities of the drive apparatus related to a block insertion condition and detects a second driving state of the drive apparatus, wherein the block insertion condition is met when the measured physical quantity is a threshold or higher, wherein each of the plurality of blocks includes an end condition for ending driving of the drive unit by the block, the controller starts execution of the first block among the plurality of blocks including driving the energy conversion of the drive unit, and when, during execution of the first block among the plurality of blocks, the first driving state detected by the first sensor meets the end condition of the first block and the second driving state detected by the second sensor meets the block insertion condition, the controller:

reconstructs the application by inserting a new block with a specified function to adjust one or more control parameters related to the second driving state of the drive apparatus for preventing the second driving state from meeting the block insertion condition so that an order relative to one or more subsequent blocks after the first block in the application is a given order;

after the first block ends, the one or more subsequent blocks and the new block arranged in the given order to control the drive unit in accordance with the one or more subsequent blocks and the new block arranged in the given order; and continues to execute the reconstructed application, wherein the drive apparatus is directed to driving devices including home appliances.

2. The drive apparatus according to claim 1, wherein the given order is an order in which the new block is placed before a specific block, which is a subsequent block, among the one or more subsequent blocks, that does not allow driving of the drive unit in a situation in which the second driving state meets the block insertion condition.

3. The drive apparatus according to claim 1, wherein the first driving state detected by the first sensor is a duration spent driving the drive unit in accordance with the first block.

4. The drive apparatus according to claim 1, wherein the second driving state detected by the second sensor is a temperature, a rotation speed, a number of boilovers, a water level, or an electrical conductivity resulting from driving of the drive unit.

5. The drive apparatus according to claim 2, wherein the drive apparatus is a washing machine, the first sensor detects, as the first driving state, a duration spent supplying water by the drive unit in accordance with the first block, the second sensor detects, as the second driving state, a water level after supplying the water, the end condition is that the duration spent supplying the water reaches a projected time to completion of the supplying of the water by the drive unit, the block insertion condition is that the water level after supplying the water is a threshold or higher, and in the inserting of the new block, the controller inserts, as the new block, a block that drains water, before the drive unit performs a spin operation in accordance with the specific block.

6. The drive apparatus according to claim 2, wherein the drive apparatus is a clothes dryer, the first sensor detects, as the first driving state, a duration spent drying clothes by the drive unit in accordance with the first block, the second sensor detects, as the second driving state, an internal temperature of the drive apparatus, the end condition is that the duration spent drying the clothes reaches a projected time to completion of the drying of the clothes by the drive unit, the block insertion condition is that the internal temperature is a threshold or higher, and in the inserting of the new block, the controller inserts, as the new block, a block that performs an airflow operation, before the drive unit unlocks a door lock of the clothes dryer in accordance with the specific block.

7. The drive apparatus according to claim 2, wherein the drive apparatus is a washing machine, the first sensor detects, as the first driving state, a duration spent agitating by the drive unit in accordance with the first block, the second sensor detects, as the second driving state, a rotation speed of the agitating, the end condition is that the duration spent agitating reaches a projected time to completion of the agitating by the drive unit, the block insertion condition is that the rotation speed is a threshold or higher, and in the inserting of the new block, the controller inserts, as the new block, a block that does not allow driving of the drive unit, before the drive unit drains or supplies water in accordance with the specific block.

8. The drive apparatus according to claim 2, wherein the drive apparatus is a washing machine, the first sensor detects, as the first driving state, a duration spent agitating by the drive unit in accordance with the first block, the second sensor detects, as the second driving state, an electrical conductivity after the agitating, the end condition is that the duration spent agitating reaches a projected time to completion of the agitating by the drive unit, the block insertion condition is that the electrical conductivity is a threshold or higher, and in the inserting of the new block, the controller inserts, as the new block, a block that performs another agitation operation, before the drive unit supplies water in accordance with the specific block.

9. The drive apparatus according to claim 8, wherein in the inserting of the new block, the controller inserts, as new blocks, a block that dispenses detergent and the block that performs another agitation operation, before the drive unit supplies water in accordance with the specific block.

10. The drive apparatus according to claim 2, wherein the drive apparatus is a washing machine, the first sensor detects, as the first driving state, an amount of detergent dispensed by the drive unit in accordance with the first block, the second sensor detects, as the second driving state, a water level after dispensing the detergent, the end condition is that the amount of detergent dispensed by the drive unit reaches an intended amount, the block insertion condition is that the water level is a threshold or higher, and in the inserting of the new block, the controller inserts, as the new block, a block that drains water, before the drive unit performs an agitation operation in accordance with the specific block.

11. The drive apparatus according to claim 2, wherein the drive apparatus is a washing machine, the first sensor detects, as the first driving state, a duration spent supplying water by the drive unit in accordance with the first block, the second sensor detects, as the second driving state, a water level after supplying the water, the end condition is that the duration spent supplying the water reaches a projected time to completion of the supplying of the water by the drive unit, the block insertion condition is that the water level is a threshold or higher, and in the inserting of the new block, the controller inserts, as the new block, a block that drains water, after at least one subsequent block other than the specific block among the one or more subsequent blocks, and before the specific block.

12. The drive apparatus according to claim 2, wherein the drive apparatus is a rice cooker, the first sensor detects, as the first driving state, a duration spent pre-cooking by the drive unit in accordance with the first block, the second sensor detects, as the second driving state, a number of boilovers from the drive apparatus, the end condition is that the duration spent pre-cooking reaches a projected time to completion of the pre-cooking by the drive unit, the block insertion condition is that the number of boilovers is a threshold or higher, and in the inserting of the new block, the controller inserts, as the new block, a standby block that does not allow driving of the drive unit, before the drive unit performs a cook operation in accordance with the specific block.

13. The drive apparatus according to claim 2, wherein the drive apparatus is an oven, the first sensor detects, as the first driving state, a duration spent performing a baking process of food by the drive unit in accordance with the first block, the second sensor detects, as the second driving state, an internal temperature of the drive apparatus, the end condition is that the duration spent performing the baking process reaches a projected time to completion of the baking process by the drive unit, the block insertion condition is that a difference between a projected rise in temperature from the drive unit performing the baking process of the food in accordance with the specific block and a temperature limit of the drive apparatus is less than or equal to the internal temperature, and in the inserting of the new block, the controller inserts, as the new block, a standby block that does not allow driving of the drive unit, before the drive unit performs the baking process of the food in accordance with the specific block.

* * * * *